United States Patent
Oishi et al.

(10) Patent No.: US 11,479,834 B2
(45) Date of Patent: Oct. 25, 2022

(54) FREE-CUTTING COPPER ALLOY AND METHOD FOR MANUFACTURING FREE-CUTTING COPPER ALLOY

(71) Applicant: MITSUBISHI MATERIALS CORPORATION, Tokyo (JP)

(72) Inventors: Keiichiro Oishi, Sakai (JP); Kouichi Suzaki, Sakai (JP); Hiroki Goto, Sakai (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

(21) Appl. No.: 17/426,164

(22) PCT Filed: Dec. 11, 2019

(86) PCT No.: PCT/JP2019/048438
§ 371 (c)(1),
(2) Date: Jul. 28, 2021

(87) PCT Pub. No.: WO2020/261603
PCT Pub. Date: Dec. 30, 2020

(65) Prior Publication Data
US 2022/0090249 A1    Mar. 24, 2022

(30) Foreign Application Priority Data

Jun. 25, 2019 (JP) .............................. JP2019-116914
Jul. 12, 2019 (JP) .............................. JP2019-130143
(Continued)

(51) Int. Cl.
C22C 9/04    (2006.01)
C21D 9/00    (2006.01)
C22F 1/08    (2006.01)

(52) U.S. Cl.
CPC ............... *C22C 9/04* (2013.01); *C21D 9/00* (2013.01); *C22F 1/08* (2013.01)

(58) Field of Classification Search
CPC ................................... C22F 1/08; C23C 9/04
See application file for complete search history.

(56) References Cited

U.S. PATENT DOCUMENTS 4,055,445 A    10/1977    Pops
4,259,124 A    3/1981     Smith et al.
(Continued)

FOREIGN PATENT DOCUMENTS

CN    1969052 A       5/2007
CN    101298643 A    11/2008
(Continued)

OTHER PUBLICATIONS

Office Action dated Jul. 13, 2021, issued for the Taiwan Patent Application No. 109143360 and English translation of the Search Report.
(Continued)

*Primary Examiner* — John A Hevey
(74) *Attorney, Agent, or Firm* — Locke Lord LLP; James E. Armstrong, IV; Nicholas J. DiCeglie, Jr.

(57) ABSTRACT

This free-cutting copper alloy includes Cu: more than 61.0% and less than 65.0%, Si: more than 1.0% and less than 1.5%, Pb: 0.003% to less than 0.20%, and P: more than 0.003% and less than 0.19%, with the remainder being Zn and unavoidable impurities, a total content of Fe, Mn, Co, and Cr is less than 0.40%, a total content of Sn and Al is less than 0.40%, a relationship of $56.5 \leq f1 = [Cu] - 4.5 \times [Si] + 0.5 \times [Pb] - [P] \leq 59.5$ is satisfied, constituent phases of a metallographic structure have relationships of $20 \leq (\alpha) \leq 80$, $15 \leq (\beta) \leq 80$, $0 \leq (\gamma) < 8$, $18 \times (\gamma)/(\beta) < 9$, $20 \leq (\gamma)^{1/2} \times 3 + (\beta) \times ([Si])^{1/2} \leq 88$, and $33 \leq$
(Continued)

$(\gamma)^{1/2} \times 3 + (\beta) \times ([Si])^{1/2} + ([Pb])^{1/2} \times 35 + ([P])^{1/2} \times 15$, and a compound including P is present in β phase.

9 Claims, 2 Drawing Sheets

(30) Foreign Application Priority Data

Jul. 31, 2019 (JP) .............................. JP2019-141096
Sep. 9, 2019 (JP) .............................. JP2019-163773

(56) References Cited

U.S. PATENT DOCUMENTS

| | | | |
|---|---|---|---|
| 6,165,246 A | 12/2000 | Kira et al. | |
| 2004/0159375 A1 | 8/2004 | Yamagishi | |
| 2004/0241038 A1 | 12/2004 | Hofmann et al. | |
| 2005/0039827 A1 | 2/2005 | Yamagishi et al. | |
| 2007/0158002 A1 | 7/2007 | Oishi | |
| 2007/0169854 A1 | 7/2007 | Oishi | |
| 2009/0263272 A1 | 10/2009 | Uchida | |
| 2009/0297390 A1 | 12/2009 | Hidenobu et al. | |
| 2010/0135848 A1* | 6/2010 | Xu | C22C 9/04 420/471 |
| 2014/0248175 A1 | 9/2014 | Lee et al. | |
| 2014/0251488 A1 | 9/2014 | Oishi et al. | |
| 2015/0132179 A1 | 5/2015 | Oishi | |
| 2016/0068931 A1 | 3/2016 | Xu et al. | |
| 2016/0215366 A1 | 7/2016 | Uchida | |
| 2019/0256960 A1 | 8/2019 | Oishi et al. | |
| 2020/0157658 A1 | 5/2020 | Oishi et al. | |
| 2020/0181739 A1 | 6/2020 | Oishi et al. | |
| 2022/0042141 A1* | 2/2022 | Oishi | C22F 1/08 |

FOREIGN PATENT DOCUMENTS

| | | | |
|---|---|---|---|
| CN | 101476056 A | 7/2009 | |
| CN | 104004940 A | 8/2014 | |
| CN | 104480344 A | 4/2015 | |
| CN | 105624463 A | 6/2016 | |
| CN | 103282524 B | 8/2016 | |
| CN | 106893883 A | 6/2017 | |
| CN | 107937752 A | 4/2018 | |
| CN | 107974573 A | 5/2018 | |
| CN | 109563567 A | 4/2019 | |
| CN | 109563568 A | 4/2019 | |
| CN | 109563569 A | 4/2019 | |
| CN | 109642272 A | 4/2019 | |
| EP | 0947592 A1 | 10/1999 | |
| EP | 0947592 A1 * | 10/1999 | C22C 9/04 |
| EP | 1790742 A1 | 5/2007 | |
| EP | 2634275 A1 | 9/2013 | |
| EP | 3050982 A1 | 8/2016 | |
| EP | 3498870 A1 | 6/2019 | |
| IN | 201917005548 | 4/2019 | |
| JP | 2000-119774 A | 4/2000 | |
| JP | 2000-119775 A | 4/2000 | |
| JP | 2000-355746 A | 12/2000 | |
| JP | 2004-244672 A | 9/2004 | |
| JP | 2004-263301 A | 9/2004 | |
| JP | 3999676 B2 | 10/2007 | |
| JP | 2010-242184 A | 10/2010 | |
| JP | 2013-104071 A | 5/2013 | |
| JP | 5865548 B2 | 2/2016 | |
| JP | 2016-511792 A | 4/2016 | |
| JP | 2016-145411 A | 8/2016 | |
| JP | 2016-194123 A | 11/2016 | |
| JP | 2018-048397 A | 3/2018 | |
| JP | 2018-172725 A | 11/2018 | |
| JP | 2019-508584 A | 3/2019 | |
| TW | 200722536 A | 6/2007 | |
| TW | 200930822 A | 7/2009 | |
| TW | 201107501 A1 | 3/2011 | |
| TW | 201335391 A1 | 9/2013 | |
| TW | I467036 B | 1/2015 | |
| TW | 201527559 A | 7/2015 | |
| TW | 201910525 A | 3/2019 | |
| TW | 201910526 A | 3/2019 | |
| TW | 201910527 A | 3/2019 | |
| WO | 2005/093108 A1 | 10/2005 | |
| WO | 2006/016442 A1 | 2/2006 | |
| WO | 2006/016624 A1 | 2/2006 | |
| WO | 2006/016630 A1 | 2/2006 | |
| WO | 2007/034571 A1 | 3/2007 | |
| WO | 2008/081947 A1 | 7/2008 | |
| WO | 2009/048008 A1 | 4/2009 | |
| WO | 2012/057055 A1 | 5/2012 | |
| WO | 2013/065830 A1 | 5/2013 | |
| WO | 2015/046421 A1 | 4/2015 | |
| WO | 2017/127284 A1 | 7/2017 | |
| WO | 2017/204252 A1 | 11/2017 | |
| WO | 2019/035225 A1 | 2/2019 | |

OTHER PUBLICATIONS

Supplementary European Search Report dated Dec. 21, 2021, issued for European Patent Application No. 19935321.0.
Requirement for Restriction/Election dated Dec. 27, 2021, issued for U.S. Appl. No. 17/426,140.
Office Action dated Dec. 28, 2021, issued for Chinese Patent Application No. 201980090321.6 and English partial Translation (Search Report only).
Office Action dated Dec. 28, 2021, issued for Chinese Patent Application No. 201980090313.1 and English partial Translation (Search Report only).
Genjiro Mima et al., "About Copper-Silicon-Zinc Ternary Phase Diagram" Journal of the Japan Copper and Brass Research Association, vol. 2, No. 1, 1963, pp. 62-77. (partial translation; discussed in the spec).
International Search Report dated Mar. 3, 2020, issued for PCT/JP2019/048438 and English translation thereof.
International Search Report dated Mar. 3, 2020, issued for PCT/JP2019/048455 and English translation thereof.
International Search Report dated May 12, 2020, issued for PCT/JP2020/006037 and English translation thereof.
International Search Report dated Jun. 16, 2020, issued for PCT/JP2020/011343 and English translation thereof.
International Search Report dated Mar. 3, 2020, issued for PCT/JP2019/050255 and English translation thereof.
International Search Report dated Feb. 9, 2021, issued for PCT/JP2020/044418 and English translation thereof.
Office Action dated Sep. 15, 2020, issued for the Taiwan Patent Application No. 108145211 and English translation of the Search Report.
Office Action dated Jan. 8, 2021, issued for the Taiwan Patent Application No. 108145219 and English translation of the Search Report.
Office Action dated Nov. 30, 2020, issued for the Taiwan Patent Application No. 109105097 and English translation of the Search Report.
Office Action dated Jul. 14, 2020, issued for the Taiwan Patent Application No. 108147337 and English translation of the Search Report.
Office Action dated Feb. 28, 2022, issued for Indian Patent Application No. 202117033588.
Office Action dated Mar. 14, 2022, issued for Chinese Patent Application No. 201980096002.6 and English translation of the Search Report.
Office Action issued in Chinese Patent Application No. CN 202080038596.8, dated Apr. 1, 2022.
Office Action issued in Indian Patent Application No. 202217022390, dated Aug. 12, 2022.

* cited by examiner

"FREE-CUTTING COPPER ALLOY AND METHOD FOR MANUFACTURING FREE-CUTTING COPPER ALLOY"

CROSS REFERENCE TO RELATED APPLICATIONS

This application is related to co-pending application: "FREE-CUTTING COPPER ALLOY AND METHOD FOR PRODUCING FREE-CUTTING COPPER ALLOY" filed even date herewith in the names of Keiichiro OISHI, Kouichi SUZAKI and Hiroki GOTO as a national phase entry of PCT/JP2019/048455, which application is assigned to the assignee of the present application and is incorporated by reference herein.

TECHNICAL FIELD

The present invention relates to a free-cutting copper alloy having a high strength and a significantly reduced Pb content and a method for producing a free-cutting copper alloy. The present invention relates to a free-cutting copper alloy used for automobile components, electrical and electronic apparatus components, mechanical components, stationaries, toys, sliding components, measuring instrument components, precision mechanical components, medical components, drink-related devices and components, devices and components for water drainage, industrial plumbing components, or components relating to liquid or gas such as drinking water, industrial water, drainage water, or hydrogen, and a method for producing the free-cutting copper alloy. Examples of specific component names include valves, joints, cocks, faucets, gears, axles, bearings, shafts, sleeves, spindles, sensors, bolts, nuts, flare nuts, pen points, insert nuts, cap nuts, nipples, spacers, and screws. The present invention relates to a free-cutting copper alloy used for the components that are made by machining, and a method for producing the free-cutting copper alloy.

The present application claims priority on Japanese Patent Application No. 2019-116914 filed on Jun. 25, 2019, Japanese Patent Application No. 2019-130143 filed on Jul. 12, 2019, Japanese Patent Application No. 2019-141096 filed on Jul. 31, 2019, and Japanese Patent Application No. 2019-163773 filed on Sep. 9, 2019, the contents of which are incorporated herein by reference.

BACKGROUND ART

Conventionally, a Cu—Zn—Pb alloy (so-called a free-cutting brass bar, brass for forging, or brass for casting) or a Cu—Sn—Zn—Pb alloy (so-called bronze casting: gunmetal) having excellent machinability has been generally used for components such as valves, joints, gears, sensors, nuts, or screws that are specific component names of automobile components, electrical, home appliance, and electronic apparatus components, mechanical components, stationaries, precision mechanical components, medical components, or devices and components relating to liquid or gas such as drinking water, industrial water, drainage water, or hydrogen.

A Cu—Zn—Pb alloy includes 56% to 65 mass % Cu, 1% to 4 mass % Pb, and the balance being Zn. A Cu—Sn—Zn—Pb alloy includes 80% to 88 mass % Cu, 2% to 8 mass % Sn, 1% to 8 mass % Pb, and the balance being Zn.

Pb added to copper alloy has a tremendous effect particularly in a hole-making process particularly using a drill. Recently, the dimensions of various devices and components have decreased, and the necessity of drilling tiny holes on such components has increased. It is expected that a reduction in the size of various industrial components such as home information appliances, medical devices, or automobile components will be accelerated.

However, recently, Pb's influence on human body and the environment is becoming a concern, and momentum to regulate Pb is increasing in various countries. For example, a regulation for reducing the Pb content in drinking water supply devices to be 0.25 mass % or lower came into force in January 2010 in California, the United States. In countries other than the United States also, such regulation is rapidly being established, and development of a copper alloy material that meets the requirements of the regulation on Pb content is in demand.

In addition, in other industrial fields such as those of automobiles, electrical and electronic apparatuses, and machines, for example, in ELV regulations and RoHS regulations of the Europe, free-cutting copper alloys are exceptionally allowed to include maximum 4 mass % Pb. However, like in the field of drinking water, strengthening of regulations on Pb content including elimination of exemptions has been actively discussed.

While there is a trend to strengthen Pb regulations for free-cutting copper alloys, alloys like (1) a Cu—Zn—Bi alloy or Cu—Zn—Bi—Se alloy including Bi having machinability (machining performance, machinability-improvement function) or, in some cases, including not only Bi but also Se instead of Pb, (2) a Cu—Zn alloy including a high concentration of Zn in which the amount of β phase is increased to improve machinability, (3) a Cu—Zn—Si alloy or Cu—Zn—Sn alloy including large amounts of γ phase and κ phase having machinability instead of Pb, (4) a Cu—Zn—Sn—Bi alloy including a large amount of γ phase and Bi, etc. are proposed.

Patent Document 1 discloses a method of improving machinability and corrosion resistance by adding 0.7% to 2.5 mass % Sn to a Cu—Zn—Bi alloy such that γ phase precipitates.

However, alloys including Bi instead of Pb have many problems. For example, Bi has lower machinability than Pb. Bi may be harmful to human body like Pb. Bi has a resourcing problem because it is a rare metal. And, Bi embrittles a copper alloy material.

In addition, as disclosed in Patent Document 1, even when γ phase of a Cu—Zn—Sn alloy is precipitated, γ phase including Sn has poor machinability, thus requiring co-addition of Bi having machinability.

On the one hand, it is absolutely impossible to replace a free-cutting copper alloy containing lead with a Cu—Zn binary alloy including a large amount of β phase since even though β phase contributes to improvement of machinability, it has lower machinability than Pb. On the other hand, Cu—Zn—Si alloys including Si instead of Pb are proposed as free-cutting copper alloys in, for example, Patent Documents 2 to 13.

In Patent Documents 2 and 3, excellent machinability is realized without including Pb or with a small amount of Pb by the excellent machinability of γ phase, or, in some cases, κ phase formed in an alloy mainly comprising a high Cu concentration of 69% to 79 mass % and a high Si concentration of 2 to 4 mass %. By including greater than or equal to 0.3 mass % Sn and greater than or equal to 0.1 mass % Al, formation of γ phase having machinability is further increased and accelerated such that machinability can be improved. Corrosion resistance is improved by forming a large amount of γ phase.

In Patent Document 4, excellent machinability is obtained by adding an extremely small amount (0.02 mass % or lower) of Pb and simply defining the total area of γ phase and κ phase mainly in consideration of the Pb content.

Patent Documents 5 and 6 propose casting products of Cu—Zn—Si alloys in which, in order to reduce the size of crystal grains of the casting, extremely small amounts of P and Zr are included, and recite that the P/Zr ratio and the like are important.

Patent Document 7 proposes a copper alloy in which Fe is included in a Cu—Zn—Si alloy.

Patent Document 8 proposes a copper alloy in which Sn, Fe, Co, Ni, and Mn are included in a Cu—Zn—Si alloy.

Patent Document 9 proposes a Cu—Zn—Si alloy having an α phase matrix including κ phase in which area ratios of β phase, γ phase, and μ phase are limited.

Patent Document 10 proposes a Cu—Zn—Si alloy having an α phase matrix including κ phase in which area ratios of β phase and γ phase are limited.

Patent Document 11 proposes a Cu—Zn—Si alloy in which the length of the longer sides of γ phase and the length of the longer sides of μ phase are defined.

Patent Document 12 proposes a Cu—Zn—Si alloy to which Sn and Al are added.

Patent Document 13 proposes a Cu—Zn—Si alloy in which γ phase is distributed in the form of particles at a phase boundary between α phase and β phase to improve machinability.

Patent Document 15 proposes a Cu—Zn alloy to which Sn, Pb, and Si are added.

Now, as described in Patent Document 14 and Non-Patent Document 1, in Cu—Zn—Si alloys, it is known that, even when looking at only those having Cu concentration of 60 mass % or higher, a Zn concentration of 40 mass % or lower, and Si concentration of 10 mass % or lower, 10 kinds of metallic phases including α phase matrix, β phase, γ phase, δ phase, ε phase, ζ phase, η phase, κ phase, μ phase, and χ phase, in some cases, 13 kinds of metallic phases including additional phases of α', β', and γ' are present. Further, it is empirically known that, as the number of additive elements increases, the metallographic structure becomes complicated, and a new phase or an intermetallic compound may appear. In addition, it is also empirically well known that there is a large difference in the constitution of metallic phases between what an equilibrium phase diagram shows and that of an actually produced alloy. Further, it is well known that the composition of these phases changes depending on the concentrations of Cu, Zn, Si, and the like in a copper alloy and processing heat history.

Incidentally, in Cu—Zn—Pb alloys including Pb, the Cu concentration is about 60 mass % whereas in all the Cu—Zn—Si alloys described in Patent Documents 2 to 13, the Cu concentrations are 65 mass % or higher, and a reduction in the concentration of expensive Cu is desired from a viewpoint of economic efficiency.

In addition, for conventional leaded free-cutting copper alloys, it is expected that machining such as turning or drilling can be performed without troubles for at least 24 hours and without replacement of cutting tool or adjustment such as polishing of cutting edge for 24 hours. Although depending on the degree of difficulty of machining, the same level of machinability is expected for alloys containing a significantly reduced amount of Pb.

Further, in Patent Document 7, the Cu—Zn—Si alloy includes Fe, and Fe and Si form an intermetallic compound of Fe—Si which is harder and more brittle than γ phase. This intermetallic compound has problems like reducing tool life of a cutting tool during machining and generation of hard spots during polishing impairing the external appearance. In addition, since Fe combines with Si which is an additive element and Si is thus consumed as an intermetallic compound, the performance of the alloy deteriorates.

In addition, in Patent Document 8, Sn, Fe, Co, and Mn are added to a Cu—Zn—Si alloy. However, Fe, Co, and Mn all combine with Si to form a hard and brittle intermetallic compound. Therefore, such addition causes problems during machining or polishing as disclosed by Patent Document 7.

PRIOR ART DOCUMENTS

Patent Document

Patent Document 1: PCT International Publication No. WO2008/081947
Patent Document 2: Japanese Unexamined Patent Application, First Publication No. 2000-119775
Patent Document 3: Japanese Unexamined Patent Application, First Publication No. 2000-119774
Patent Document 4: PCT International Publication No. WO2007/034571
Patent Document 5: PCT International Publication No. WO2006/016442
Patent Document 6: PCT International Publication No. WO2006/016624
Patent Document 7: Published Japanese Translation No. 2016-511792 of the PCT International Publication
Patent Document 8: Japanese Unexamined Patent Application, First Publication No. 2004-263301
Patent Document 9: PCT International Publication No. WO2012/057055
Patent Document 10: Japanese Unexamined Patent Application, First Publication No. 2013-104071
Patent Document 11: PCT International Publication No. WO2019/035225
Patent Document 12: Japanese Unexamined Patent Application, First Publication No. 2018-048397
Patent Document 13: Published Japanese Translation No. 2019-508584 of the PCT International Publication
Patent Document 14: U.S. Pat. No. 4,055,445
Patent Document 15: Japanese Unexamined Patent Application, First Publication No. 2016-194123

Non-Patent Document

Non-Patent Document 1: Genjiro MIMA, Masaharu HASEGAWA, Journal of the Japan Copper and Brass Research Association, 2 (1963), p. 62 to 77

DISCLOSURE OF INVENTION

Problems to be Solved by the Invention

The present invention has been made in order to solve the above-described problems in the conventional art, and an object thereof is to provide a free-cutting copper alloy having excellent hot workability, a high strength, a good balance between strength and ductility, and excellent toughness whose Pb content has been significantly reduced, and a method for producing the free-cutting copper alloy.

In this specification, unless specified otherwise, a hot worked material includes a hot extruded material, a hot forged material, and a hot rolled material. Cold workability refers to performance of cold working such as drawing, wire drawing, rolling, crimping, or bending. Drilling refers to making holes with a drill. Unless specified otherwise, excellent machinability refers to low cutting resistance and good or excellent chip breakability during turning with a lathe or drilling. Conductivity refers to electric conductivity and thermal conductivity. In addition, β phase includes β' phase, γ phase includes γ' phase, and α phase includes α' phase. Cooling rate refers to the average cooling rate in a given temperature range. 24 hours refer to one day. "Manufacturing on the actual production line" refers to production with a mass production facility used for manufacturing products for sale. P-containing compound is a compound including P and at least either Si or Zn or both Si and Zn, in some cases, further including Cu and/or inevitable impurities such as Fe, Mn, Cr, or Co. P-containing compound can be a compound such as P—Si, P—Si—Zn, P—Zn, or P—Zn—Cu. P-containing compound also refers to a compound including P, Si, and Zn.

Solutions for Solving the Problems

In order to solve the above-described problems and to achieve the above-described object, the present inventors conducted a thorough investigation and obtained the following findings.

Patent Documents 4 and 6 disclose that in Cu—Zn—Si alloys, β phase does not substantially contribute to machinability of the alloy, but rather inhibits it. Patent Documents 2 and 3 recite that when β phase is present, β phase is changed into γ phase by heat treatment. In Patent Documents 9, 10, and 11, also, the amount of β phase is significantly limited. Patent Document 15 discloses that, in order to improve dezincification corrosion resistance of β phase, it is necessary that Sn and Si are included, that hot extrusion is performed at a temperature of 700° C. or higher, and that a heat treatment in which holding temperature is 400° C. to 600° C. and the average cooling rate from 400° C. to 200° C. is 0.2° C./sec to 10° C./sec is performed.

First, the present inventors diligently studied β phase that had been known to have no effect on machinability of a Cu—Zn—Si alloy in the conventional art, and found out the composition of β phase that has a large effect on machinability.

However, there still was a significant difference in machinability in terms of chip breakability and cutting resistance if compared with a free-cutting brass including 3 mass % Pb even if β phase contains Si, an element that has a large effect on machinability.

Therefore, in order to improve the machinability (machining performance, machinability-improvement function) of β phase itself, a compound including P and Si and/or Zn having a size of about 0.5 to 3 μm (for example, P—Si, P—Si—Zn, P—Zn, or P—Zn—Cu) was made to precipitate in β phase of a Cu—Zn—Si alloy including an appropriate amount of Si. As a result, the machinability of β phase dramatically improved.

However, β phase with improved machinability has poor ductility and toughness. In order to improve ductility without deterioration of the machinability of β phase, the amounts of β phase and α phase were controlled to appropriate levels, and distributions of α phase and β phase, and shapes of crystal grains of α phase were controlled.

A copper alloy having machinability comparable to that of a conventional copper alloy including a large amount of Pb was thus invented by making the copper alloy include β phase having further improved machinability, α phase having excellent ductility, a small amount of Pb, and optionally, a small amount of γ phase.

A free-cutting copper alloy according to a first aspect of the present invention includes: higher than 61.0 mass % and lower than 65.0 mass % of Cu; higher than 1.0 mass % and lower than 1.5 mass % of Si; higher than or equal to 0.003 mass % and lower than 0.20 mass % of Pb; and higher than 0.003 mass % and lower than 0.19 mass % of P, with the balance being Zn and inevitable impurities, in which, among the inevitable impurities, a total content of Fe, Mn, Co, and Cr is lower than 0.40 mass % and a total content of Sn and Al is lower than 0.40 mass %, when a Cu content is represented by [Cu] mass %, a Si content is represented by [Si] mass %, and a Pb content is represented by [Pb] mass %, the following relationship of $$56.5 \leq f1 = [Cu] - 4.5 \times [Si] + 0.5 \times [Pb] - [P] \leq 59.5$$

is satisfied, in constituent phases of a metallographic structure excluding non-metallic inclusions, when an area ratio of α phase is represented by (α)%, an area ratio of γ phase is represented by (γ)%, and an area ratio of β phase is represented by (β)%, the following relationships of $$20 \leq (\alpha) \leq 80,$$

$$15 \leq (\beta) \leq 80,$$

$$0 \leq (\gamma) < 8,$$

$$18 \times (\gamma)/(\beta) < 9,$$

$$20 \leq (\gamma)^{1/2} \times 3 + (\beta) \times ([Si])^{1/2} \leq 88, \text{ and}$$

$$33 \leq (\gamma)^{1/2} \times 3 + (\beta) \times ([Si])^{1/2} + ([Pb])^{1/2} \times 35 + ([P])^{1/2} \times 15$$

are satisfied, and
a P-containing compound is present in the β phase.

A free-cutting copper alloy according to a second aspect of the present invention includes: higher than or equal to 61.7 mass % and lower than or equal to 64.3 mass % of Cu; higher than or equal to 1.02 mass % and lower than or equal to 1.35 mass % of Si; higher than or equal to 0.005 mass % and lower than or equal to 0.10 mass % of Pb; and higher than or equal to 0.02 mass % and lower than or equal to 0.14 mass % of P, with the balance being Zn and inevitable impurities, in which among the inevitable impurities, a total content of Fe, Mn, Co, and Cr is lower than or equal to 0.30 mass % and a total content of Sn and Al is lower than or equal to 0.30 mass %, when a Cu content is represented by [Cu] mass %, a Si content is represented by [Si] mass %, and a Pb content is represented by [Pb] mass %, the following relationship of $$57.0 \leq f1 = [Cu] - 4.5 \times [Si] + 0.5 \times [Pb] - [P] \leq 59.0$$

is satisfied, in constituent phases of a metallographic structure excluding non-metallic inclusions, when an area ratio of α phase is represented by (α)%, an area ratio of γ phase is represented by (γ)%, and an area ratio of β phase is represented by (β)%, the following relationships of $30 \leq (\alpha) \leq 75,$ $25 \leq (\beta) \leq 70,$ $0 \leq (\gamma) < 4,$ $18 \times (\gamma)/(\beta) < 2,$ $30 \leq (\gamma)^{1/2} \times 3 + (\beta) \times ([Si])^{1/2} \leq 77,$ and $44 \leq (\gamma)^{1/2} \times 3 + (\beta) \times ([Si])^{1/2} + ([Pb])^{1/2} \times 35 + ([P])^{1/2} \times 15$ are satisfied, and a P-containing compound is present in the β phase.

A free-cutting copper alloy according to a third aspect of the present invention is the free-cutting copper alloy according to the first or second aspect of the present invention, in which a proportion of granular α phase crystal grains having an aspect ratio (longer side/shorter side) of lower than or equal to 4 is higher than or equal to 50%.

A free-cutting copper alloy according to a fourth aspect of the present invention is the free-cutting copper alloy according to any one of the first to third aspects of the present invention, in which a Si content in β phase is higher than or equal to 1.2 mass % and lower than or equal to 1.9 mass %.

A free-cutting copper alloy according to a fifth aspect of the present invention is the free-cutting copper alloy according to any one of the first to fourth aspects of the present invention, in which an electrical conductivity is higher than or equal to 13% IACS, and when a tensile strength is represented by S (N/mm²) and an elongation is represented by E (%), a relational expression S×(100+E)/100 indicating a balance between the strength and the elongation is higher than or equal to 600.

A free-cutting copper alloy according to a sixth aspect of the present invention is the free-cutting copper alloy according to any one of the first to fifth aspects of the present invention, which is used for an automobile component, an electrical or electronic apparatus component, a mechanical component, a stationery, a toy, a sliding component, a measuring instrument component, a precision mechanical component, a medical component, a drink-related device or component, a device or component for water drainage, or an industrial plumbing component.

A method for producing a free-cutting copper alloy according to a seventh aspect of the present invention is a method for producing the free-cutting copper alloy according to any one of the first to sixth aspects of the present invention, including one or more hot working steps, in which in the final hot working step among the hot working steps, hot working temperature is higher than 540° C. and lower than 675° C., and an average cooling rate in a temperature range from 530° C. to 450° C. after hot working is higher than or equal to 0.1° C./min and lower than or equal to 50° C./min.

A method for producing a free-cutting copper alloy according to an eighth aspect of the present invention is the method for producing a free-cutting copper alloy according to the seventh aspect of the present invention, further including one or more steps selected from a cold working step, a straightness correction step, and an annealing step.

A method for producing a free-cutting copper alloy according to a ninth aspect of the present invention is the method for producing a free-cutting copper alloy according to the seventh or eighth aspect of the present invention, further including a low-temperature annealing step that is performed after the final step among the hot working step, the cold working step, the straightness correction step, and the annealing step, in which in the low-temperature annealing step, holding temperature is higher than or equal to 250° C. and lower than or equal to 430° C., and holding time is longer than or equal to 10 minutes and shorter than or equal to 200 minutes.

Effects of Invention

According to one aspect of the present invention, a free-cutting copper alloy having excellent hot workability, a high strength, a good balance between strength and ductility, and excellent toughness and containing a significantly reduced amount of Pb, and a method for producing the free-cutting copper alloy can be provided.

EMBODIMENTS FOR CARRYING OUT THE INVENTION

Figure 1A:
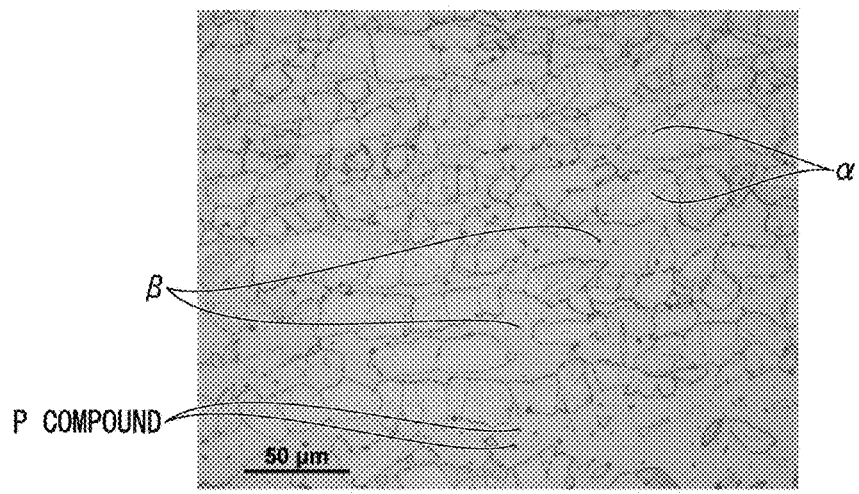
FIG. 1A is a picture showing the structure of a free-cutting copper alloy according to an embodiment, which includes 62.9 mass % Cu, 1.14 mass % Si, 0.072 mass % P, 0.009 mass % Pb, and Zn as the balance and is obtained by hot extrusion at 590° C. and cooling at an average cooling rate of 25° C./min in a temperature range from 530° C. to 450° C.

Below is a description of free-cutting copper alloys according to the embodiments of the present invention and methods for producing the free-cutting copper alloys.

The free-cutting copper alloys according to the embodiments are used for automobile components, electrical components, home appliance components, and electronic components, mechanical components, and devices and components that come in contact with liquid or gas such as drinking water, industrial water, or hydrogen. Examples of specific component names include valve, joint, gear, screws nut, sensor, and pressure vessel.

Here, in this specification, an element symbol in parentheses such as [Zn] represents the content (mass %) of the element.

In the embodiment, using this content expressing method, a composition relational expression f1 is defined as follows.

Composition relational expression $f1=[Cu]-4.5\times[Si]+0.5\times[Pb]-[P]$

Further, in the embodiment, in constituent phases of the metallographic structure excluding non-metallic inclusions, the area ratio of α phase is represented by (α)%, the area ratio of γ phase is represented by (γ)%, and the area ratio of β phase is represented by (β)%. The area ratio of each of the phases will also be referred to as "the amount of each of the phases", "the proportion of each of the phases", or "the proportion that each of the phases occupies".

In the embodiments, a plurality of metallographic structure relational expressions are defined as follows.

Metallographic Structure Relational Expression $f2=$
(α)

Metallographic Structure Relational Expression $f3=$
(β)

Metallographic Structure Relational Expression $f4=$
(γ)

Metallographic Structure Relational Expression
$f5=18\times(\gamma)/(\beta)$

Metallographic Structure Relational Expression $f6=$
$(\gamma)^{1/2}\times 3+(\beta)\times([Si])^{1/2}$ Metallographic Structure and Composition Relational Expression $f6A=(\gamma)^{1/2}\times 3+(\beta)\times([Si])^{1/2}+([Pb])^{1/2}\times 35+([P])^{1/2}\times 15$ A free-cutting copper alloy according to the first embodiment of the present invention includes: higher than 61.0 mass % and lower than 65.0 mass % Cu; higher than 1.0 mass % and lower than 1.5 mass % Si; higher than or equal to 0.003 mass % and lower than 0.20 mass % Pb; higher than 0.003 mass % and lower than 0.19 mass % P; and the balance comprising Zn and inevitable impurities, in which the total content of Fe, Mn, Co, and Cr is lower than 0.40 mass %, the total content of Sn and Al is lower than 0.40 mass %, the composition relational expression f1 is in a range of 56.5 f1≤59.5, the metallographic structure relational expression f2 is in a range of 20≤f2≤80, the metallographic structure relational expression f3 is in a range of 15≤f3≤80, the metallographic structure relational expression f4 is in a range of 0≤f4<8, the metallographic structure relational expression f5 is in a range of f5<9, the metallographic structure relational expression f6 is in a range of 20≤f6≤88, the metallographic structure and composition relational expression f6A is in a range of f6A≥33, and a P-containing compound is present in β phase.

A free-cutting copper alloy according to the second embodiment of the present invention includes: greater than or equal to 61.7 mass % and lower than or equal to 64.3 mass % Cu; greater than or equal to 1.02 mass % and lower than or equal to 1.35 mass % Si; greater than or equal to 0.005 mass % and lower than or equal to 0.10 mass % Pb; greater than or equal to 0.02 mass % and lower than or equal to 0.14 mass % P; and the balance comprising Zn and inevitable impurities, in which the total content of Fe, Mn, Co, and Cr is 0.30 mass % or lower and the total content of Sn and Al is 0.30 mass % or lower, the composition relational expression f1 is in a range of 57.0≤f1≤59.0, the metallographic structure relational expression f2 is in a range of 30≤f2≤75, the metallographic structure relational expression f3 is in a range of 25≤f3≤70, the metallographic structure relational expression f4 is in a range of 0≤f4<4, the metallographic structure relational expression f5 is in a range of f5<2, the metallographic structure relational expression f6 is in a range of 30≤f6≤77, the metallographic structure and composition relational expression f6A is in a range of f6A≥44, and a P-containing compound is present in the β phase.

Here, in the free-cutting copper alloy according to the first or second embodiment of the present invention, it is preferable that the proportion (proportion to the entirety of α phase) of granular α phase crystal grains having an aspect ratio (longer side/shorter side) of 4 or lower is 50% or higher. To be exact, the proportion of the granular α phase crystal grains refers to the proportion of the number of granular α phase crystal grains having an aspect ratio of 4 or lower as a numerator to the total number of α phase crystal grains as a denominator in one visual field, and can be expressed with: (the number of granular α phase crystal grains having an aspect ratio of 4 or lower/the total number of α phase crystal grains)×100.

In addition, in the free-cutting copper alloy according to the first or second embodiment of the present invention, it is preferable that the Si content in β phase is 1.2 mass % or higher and 1.9 mass % or lower.

Further, in the free-cutting copper alloy according to the first or second embodiment of the present invention, it is preferable that the electric conductivity is 13% IACS or higher and 18% IACS or lower, and when tensile strength is represented by S (N/mm$^2$) and elongation is represented by E (%), characteristic relational expression f7=S×(100+E)/100 indicating the balance between strength and elongation is 600 or higher.

The reasons why the component composition, the composition relational expression f1, the metallographic structure relational expressions f2, f3, f4, f5, and f6, the metallographic structure and composition relational expression f6A, the metallographic structure, the characteristic relational expression f7, and the like are defined as described above are explained below.

<Component Composition>

(Cu)

Cu is a main element of the free-cutting copper alloy according to the embodiment. In order to achieve the object of the present invention, the free-cutting copper alloy needs to contain Cu in an amount exceeding 61.0 mass % at least. When the Cu content is 61.0 mass % or lower, the proportion of β phase exceeds 80% although depending on the contents of Si, Zn, P, and Pb and the production process, and as a result, ductility of the material is poor. Accordingly, the lower limit of the Cu content is higher than 61.0 mass %, preferably 61.5 mass % or higher, more preferably 61.7 mass % or higher, and still more preferably 62.0 mass % or higher.

On the other hand, when the Cu content is 65.0 mass % or higher, the proportion of β phase decreases and the proportion of γ phase increases although depending on the contents of Si, Zn, P, and Pb and the production process. In some cases, p phase or other phases may also appear. As a result, excellent machinability cannot be obtained, and ductility and toughness are poor. Accordingly, the Cu content is lower than 65.0 mass %, preferably 64.5 mass % or lower, more preferably 64.3 mass % or lower, and still more preferably 63.8 mass % or lower.

An object of the embodiment is to provide an alloy having not only excellent machinability but also excellent mechanical characteristics such as strength and ductility. When ductility and the balance between ductility and strength are important, the lower limit of Cu is preferably 62.3 mass % or higher.

(Si)

Si is a main element of the free-cutting copper alloy according to the embodiment. Si contributes to the formation of metallic phases such as κ phase, γ phase, μ phase, β phase, and ζ phase. Si improves machinability, strength, high-temperature deformability, wear resistance, and corrosion resistance, in particular, stress corrosion cracking resistance, of the alloy according to the embodiment. Regarding machinability, the present inventors found out that β phase formed by Cu, Zn, and Si contained in the above-described ranges of amounts has excellent machinability. Examples of β phase having excellent machinability include β phase composed of about 61 mass % Cu, about 1.5 mass % Si, and about 37.5 mass % Zn. In addition, the present inventors also found out that γ phase formed by Cu, Zn, and Si contained in the above-described ranges of amounts has excellent machinability if β phase is present. However, as γ phase has a problem in ductility, its content is limited.

Examples of representative composition of α phase include about 68 mass % Cu, about 1 mass % Si, and about 31 mass % Zn. Although machinability of α phase contained in an alloy having a composition within the range of the embodiment is also improved by including Si, the degree of the improvement is far less than that of β phase.

In addition, due to inclusion of Si, α phase and β phase are strengthened by solid-solubilization. As a result, the alloy is strengthened, affecting its ductility and toughness. Even though inclusion of Si lowers the electrical conductivity of α phase, the electrical conductivity of the alloy is improved by the formation of β phase.

In order for an alloy to obtain excellent machinability and high strength, it is necessary to include Si in an amount exceeding 1.0 mass %. The Si content is preferably 1.02 mass % or higher, more preferably 1.05 mass % or higher, and still more preferably 1.07 mass % or higher.

On the other hand, when the Si content is excessively high, the amount of γ phase excessively increases. In some cases, μ phase precipitates. γ phase has lower ductility and toughness than β phase, deteriorates the ductility of the alloy, and causes cutting resistance to increase in some cases. When the amount of γ phase is excessively large, the thrust value of drilling increases. An increase in Si content (increasing of the Si content) deteriorates the electrical conductivity of the alloy. In the embodiment, in addition to high strength, obtaining excellent ductility and toughness as well as good conductivity (since electrical components and the like are included in the intended applications) is targeted. Therefore, the upper limit of the Si content is lower than 1.5 mass % and preferably 1.35 mass % or lower. When ductility and conductivity are important, the upper limit of the Si content is more preferably 1.3 mass % or lower, and still more preferably 1.25 mass % or lower. Although depending on the production process and the Cu concentration, when the Si content is lower than about 1.3 mass %, the amount of γ phase is less than about 4%. By increasing the proportion of β phase, however, excellent machinability can be maintained, and the balance between strength and ductility becomes excellent.

Regarding hot workability, by containing Si, the hot deformability of α phase and β phase improve and their hot deformation resistance deteriorates in a temperature range exceeding 500° C. As a result, the hot deformability of the alloy improves, and its deformation resistance deteriorates. In particular, when Si is contained in excess of 1.0 mass %, the effect is remarkable. The effect is saturated when the Si content is about 1.4 mass %.

In the case of a slender bar having a diameter of 5 mm or less or a plate having a thickness of 5 mm or less, whether the alloy has excellent cold wire drawability and cold rollability is important. In addition, after machining, plastic working such as crimping may be performed. Basically, the better the cold workability, the worse the machinability, and vice versa. It is preferable to further limit the Si content or the amount of γ phase, and it is preferable that the Si content is about 1.25 mass % or lower or the area ratio of γ phase is about 1% or lower.

When a base alloy of Cu—Zn binary alloy includes third and fourth elements and the contents of the third and fourth elements increase or decrease, the properties and characteristics of β phase change. As described in Patent Documents 2 to 5, β phase present in an alloy including greater than or equal to about 69 mass % Cu, greater than or equal to about 2 mass % Si, and the balance being Zn does not have the same properties or characteristics as β phase present in an alloy according to the embodiment, for example, an alloy including about 63 mass % Cu, about 1.2 mass % Si, and the balance being Zn. Further, when a large amount of inevitable impurities are included, the characteristics of β phase also change. In some cases, properties including machinability change. Likewise, the characteristics of γ phase to be present change when the amounts of main elements or the blending ratio between them are changed. Also, when a large amount of inevitable impurities are included, the characteristics of γ phase change. Further, even when the composition is the same, the kinds of phases to be present, their amounts, the distribution of each element in each phase change depending on the production conditions such as temperature.

(Zn)

Zn is a main element of the free-cutting copper alloy according to the embodiment together with Cu and Si and is an element necessary to enhance machinability, strength, high temperature properties, and castability. Zn is described as the balance in the composition, but to be specific, its content is lower than about 37.8 mass % and preferably lower than about 37.5 mass %, and is higher than about 33 mass % and preferably higher than 33.5 mass %.

(Pb)

In the embodiment, the alloy can obtain good machinability due to β phase including Si. By further including a small amount of Pb, excellent machinability can be obtained. In the composition according to the embodiment, about 0.001 mass % Pb is solid-solubilized in the matrix, and the rest of the Pb contained in the alloy is present in the form of Pb particles having a diameter of about 0.1 to 3 μm. Pb has a large effect on machinability even when its content is small. The effect is exhibited when the Pb content is 0.003 mass % or higher. The Pb content is preferably 0.005 mass % or higher, more preferably 0.01 mass % or higher, and still more preferably 0.02 mass % or higher. When machining conditions are severe, for example, when the cutting speed is high, when the feed rate is high, when the cutting depth in turning is deep, or when the diameter of a drillhole is large, the Pb content is preferably 0.04 mass % or higher and more preferably higher than 0.05 mass %. By including β phase having significantly improved machinability and a small amount of Pb, the machinability of the alloy significantly improves.

It is well known that Pb improves machinability of copper alloys. To that end, a Cu—Zn binary alloy, a representative one of which is a free-cutting brass bar C3604, needs to include about 3 mass % Pb. In the embodiment, due to β phase including Si, solid solubilization of P described below, and the presence of P-containing compounds in β phase, β phase, which is a main constituent phase of the alloy according to the embodiment, has machinability substantially comparable to that of C3604. By including a small amount of Pb and causing a small amount of Pb particles to be present in the metallographic structure, an alloy having excellent machinability is accomplished. In consideration of the fact that Pb is harmful to human body and the alloy requires high machinability, the upper limit of Pb is lower than 0.20 mass %. The Pb content is preferably 0.10 mass % or lower and, from a viewpoint of influence on human body and the environment, most preferably 0.08 mass % or lower.

(P)

Regarding P, by solid-solubilization of P in β phase, the machinability of β phase, that is, the chip breakability of β phase, can be improved, and cutting resistance can be reduced. As a result, the alloy can obtain excellent machinability. Further, by containing P and adjusting the production process, P-containing compounds having an average diameter of about 0.5 to 3 μm are formed in β phase. Due to the compounds, in the case of turning, the three force components—principal cutting force, feed force, and thrust force—decrease. In the case of drilling, the compounds significantly reduce the torque among others. The three force components during turning, the torque during drilling, and the chip shape correlate to each other. The smaller the three force components and the torque, the more breakable chips get.

P-containing compounds are not formed during hot working. P is mainly solid-solubilized in β phase during hot working. In the process of cooling after hot working, P-containing compounds precipitate in β phase or at a phase boundary between β phase and α phase at a certain critical cooling rate or lower. The amount of P-containing compounds in α phase is small. When observed with a metallographic microscope, precipitates including P appear to be granular and have an average particle size of about 0.5 to 3 μm. β phase including such precipitate can obtain more excellent machinability. Compound including P and also at least either one of or both of Si and Zn such as P—Si, P—Si—Zn, P—Zn, or P—Zn—Cu hardly affects the life of a cutting tool and does not substantially impair the ductility or toughness of the alloy. Compound including Fe, Mn, Cr or Co and Si or P contributes to improvement of the strength and wear resistance of the alloy, but consumes Si and P in the alloy, causes the cutting resistance of the alloy to increase, deteriorates chip breakability, shortens the tool life, and impairs the ductility.

In order to exhibit the above-described effects, the lower limit of the P content is higher than 0.003 mass %, preferably 0.01 mass % or higher, more preferably 0.02 mass % or higher, and still more preferably 0.03 mass % or higher.

When the P content is about 0.015 mass % or higher, P-containing compounds can be observed with a metallographic microscope. In addition, as the P content increases, the critical cooling rate up to which P-containing compounds can be formed increases, and the formation of P-containing compounds is facilitated.

Incidentally, regarding compound including P or Si, for instance, when the content of an element that easily combines with Si or P such as Mn, Fe, Cr, or Co increases, the component ratio in the composition of the compound gradually changes. That is, P-containing compound having a significant effect of improving the machinability of β phase gradually changes into a compound having a small effect on machinability. Accordingly, at least the total content of Fe, Mn, Co, and Cr needs to be limited to less than 0.40 mass % and preferably 0.30 mass % or less.

On the other hand, when the P content is 0.19 mass % or higher, precipitates enlarge, the effect on machinability is saturated, machinability deteriorates instead of improves, and ductility and toughness also deteriorate. In addition, the Si concentration in β phase may decrease. Therefore, the P content is lower than 0.19 mass %, preferably 0.14 mass % or lower, and more preferably 0.10 mass % or lower. Even when the P content is about 0.05% or lower than 0.05 mass %, a sufficient amount of the compounds are formed.

(Inevitable Impurities, in Particular, Fe, Mn, Co, and Cr; Sn and Al)

Examples of the inevitable impurities in the embodiment include Mn, Fe, Al, Ni, Mg, Se, Te, Sn, Bi, Co, Ca, Zr, Cr, Ti, In, W, Mo, B, Ag, and rare earth elements.

Conventionally, a free-cutting copper alloy, in particular, free-cutting brass including about greater or equal to 30 mass % Zn is not mainly formed of quality raw material such as electrolytic copper or electrolytic zinc but is mainly formed of recycled copper alloy. In preliminary steps (downstream step, working step) in this field of art, machining is performed on almost all the parts and components, during which a large amount of copper alloy accounting for 40 to 80% of the material is disposed of. Examples of such disposed copper alloy include chips, mill ends, burrs, runners, and products having production defects. These disposed copper alloys are the main raw material. If cutting chips, mill ends, and the like are not properly separated, Pb, Fe, Mn, Si, Se, Te, Sn, P, Sb, As, Bi, Ca, Al, Zr, Ni, and/or rare earth elements mix in raw materials from a leaded free-cutting brass, a free-cutting copper alloy not containing Pb but containing Bi or the like, a special brass alloy including Si, Mn, Fe, and Al, or other copper alloys. In addition, cutting chips include Fe, W, Co, Mo, and the like which originate from tools. Wasted materials include plated products, and thus Ni, Cr, and Sn mix in. In addition, Mg, Sn, Fe, Cr, Ti, Co, In, Ni, Se, and Te are mixed into pure copper-based scrap that is used instead of electrolytic copper. Brass-based scraps that are used instead of electrolytic copper or electrolytic zinc are often plated with Sn, resulting in contamination by a high concentration of Sn.

From a viewpoint of reuse of resources and costs, scraps including these elements are used as a raw material to the extent that there is no bad influence on the properties at least. In a leaded JIS free-cutting brass bar, C3604 (JIS H 3250), including about 3 mass % Pb as an essential element, Fe may be contained up to 0.5 mass % and Fe+Sn (the total content of Fe and Sn) may be contained up to 1.0 mass % as impurities. Actually, a high concentration of Fe or Sn can be included in a free-cutting brass bar.

Fe, Mn, Co, and Cr are solid-solubilized in α phase, β phase, and γ phase of a Cu—Zn alloy to a certain concentration. However, if Si is present then, Fe, Mn, Co, and Cr are likely to compound with Si. In some cases, Fe, Mn, Co, and Cr may combine with Si potentially resulting in consumption of Si that is effective for machinability. Fe, Mn, Co, or Cr that is compounded with Si forms a Fe—Si compound, an Mn—Si compound, a Co—Si compound, or a Cr—Si compound in the metallographic structure. Since these intermetallic compounds are extremely hard, cutting resistance increases, and the tool life decreases. Therefore, the content of each of Fe, Mn, Co, and Cr is required to be limited and is preferably lower than 0.30 mass %, more preferably lower than 0.20 mass %, and still more preferably 0.15 mass % or lower. In particular, the total content of Fe, Mn, Co, and Cr is required to be limited to lower than 0.40 mass % and is preferably 0.30 mass % or lower, more preferably 0.25 mass % or lower, and still more preferably 0.20 mass % or lower.

On the other hand, Sn and Al mixed in from free-cutting brass, plated waste products, or the like promote formation of γ phase in the alloy according to the embodiment, which is seemingly effective for machinability. However, Sn and Al change the inherent characteristics of γ phase comprising Cu, Zn, and Si. In addition, larger amounts of Sn and Al are distributed in β phase than in α phase and change characteristics of β phase. As a result, the alloy's ductility, toughness, or machinability may deteriorate. Therefore, it is necessary to limit the contents of Sn and Al. The Sn content is preferably lower than 0.30 mass %, more preferably lower than 0.20 mass %, and still more preferably 0.15 mass % or lower. The Al content is preferably lower than 0.20 mass %, more preferably lower than 0.15 mass %, and still more preferably 0.10 mass % or lower.

In particular, from a viewpoint of influence on machinability and ductility, the total content of Sn and Al is required to be limited to lower than 0.40 mass %, preferably to 0.30 mass % or lower, more preferably to 0.25 mass % or lower, and still more preferably to 0.20 mass % or lower.

As other main inevitable impurity elements, empirically, in many cases, Ni often mixes in from scraps and the like, but the influence on properties is less than that of Fe, Mn, Sn and the like. Accordingly, the Ni content is preferably lower than 0.3 mass % and more preferably lower than 0.2 mass %. It is not necessary to particularly limit the content of Ag because Ag is commonly considered as Cu and does not substantially affect various properties. However, the Ag content is preferably lower than 0.1 mass %. Te and Se themselves have free-cutting ability, and contamination by a large amount of Te and Se may occur although it is rare. In consideration of influence on ductility or impact resistance, the content of each of Te and Se is preferably lower than 0.2 mass %, more preferably 0.05 mass % or lower, and still more preferably 0.02 mass % or lower. In addition, corrosion-resistant brass includes As and/or Sb in order to improve its corrosion resistance. In consideration of influence on ductility, impact resistance, or human body, the content of each of As and Sb is preferably lower than 0.05 mass % and more preferably 0.02 mass % or lower. Further, Bi may be mixed in from a free-cutting copper alloy including Bi. In the embodiment, the Bi content is preferably 0.02 mass % or lower from a viewpoint of influence on human body and the environment.

The content of each of Mg, Ca, Zr, Ti, In, W, Mo, B, and rare earth elements as other elements is preferably lower than 0.05 mass %, more preferably lower than 0.03 mass %, and still more preferably 0.02 mass % or lower.

The content of the rare earth elements refers to the total content of one or more of the following elements: Sc, Y, La, Ce, Pr, Nd, Pm, Sm, Eu, Gd, Tb, Dy, Ho, Er, Tm, Tb, and Lu.

Accordingly, the total content of these inevitable impurities is preferably lower than 1.0 mass %, more preferably 0.7 mass % or lower, and still more preferably 0.5 mass % or lower.

(Composition Relational Expression f1)

The composition relational expression $f1=[Cu]-4.5\times[Si]+0.5\times[Pb]-[P]$ is an expression indicating a relationship between the composition and the metallographic structure. Even when the amount of each of the elements is in the above-described defined range, unless this composition relational expression f1 is not satisfied, the targeted properties of the embodiment cannot be obtained. When the composition relational expression f1 is lower than 56.5, the proportion of β phase increases, and ductility deteriorates. Accordingly, the lower limit of the composition relational expression f1 is 56.5 or higher, preferably 57.0 or higher, and more preferably 57.2 or higher. As the composition becomes more preferable within the defined range of the composition relational expression f1, the proportion of α phase increases, excellent machinability can be maintained, and good ductility, cold workability, impact resistance, and corrosion resistance can be obtained. In particular, when excellent cold workability is necessary, the composition relational expression f1 is still more preferably 57.5 or higher.

On the other hand, the upper limit of the composition relational expression f1 affects the proportion of β phase or γ phase. When the composition relational expression f1 is higher than 59.5, the proportion of β phase decreases, and excellent machinability cannot be obtained. At the same time, the proportion of γ phase increases, ductility decreases, and strength also decreases. In some cases, μ phase also appears. Accordingly, the upper limit of the composition relational expression f1 is 59.5 or lower, preferably 59.0 or lower, and more preferably 58.5 or lower. When particularly excellent machinability is required, the upper limit of the composition relational expression f1 is preferably 58.3 or lower.

In addition, the composition relational expression f1 also deeply relates to hot workability performed at about 600° C. When the composition relational expression f1 is lower than 56.5, a problem occurs in hot deformability. When the composition relational expression f1 is higher than 59.5, hot deformation resistance increases, and processing at 600° C. becomes difficult to perform.

The free-cutting copper alloy according to the embodiment has machinability obtained by decreasing cutting resistance so that finely broken chips are generated (for which a kind of brittleness is required) and ductility that are completely contradictory to each other. By discussing not only the composition of each of the components but also the composition relational expression f1, the metallographic structure relational expressions f2 to f6, and the metallographic structure and composition relational expression f6A in detail, an alloy more suitable for the purpose and use can be provided.

Sn, Al, Fe, Mn, Co, Cr, and inevitable impurities that are separately defined are not defined by the composition relational expression f1 because their influence on the composition relational expression f1 is small if the content is within the range that can be considered as inevitable impurities.

(Comparison with Patent Documents)

Here, the results of comparison between the compositions of the Cu—Zn—Si alloys described in Patent Documents 2 to 15 and the composition of the alloy according to the embodiment are shown in Tables 1 and 2.

The embodiment and the alloys disclosed by Patent Documents 2 to 11 are different from each other in the contents of Cu and Si, the main elements of the alloys. In Patent Documents 2 to 11, a large amount of Cu is required.

In Patent Documents 2 to 4, 6, 9, and 11, β phase is depicted as a metallic phase that is not preferable in the metallographic because it impairs machinability, and is treated as a phase having a negative effect in the relational expression regarding machinability. It is also disclosed that when β phase is present, it is preferable that β phase is changed into γ phase having excellent machinability through a heat treatment.

In Patent Documents 4 and 9 to 11, in which an allowable amount of β phase is described, the maximum area ratio of β phase is 5% or lower.

In Patent Document 12, the content of each of Sn and Al is at least 0.1 mass % or higher in order to improve dezincification corrosion resistance, and large amounts of Pb and Bi need to be included in order to obtain excellent machinability.

Patent Document 13 describes a corrosion-resistant copper alloy casting which requires greater than or equal to 65 mass % Cu and has excellent mechanical characteristics and castability achieved by including Si and a small amount of Al, Sb, Sn, Mn, Ni, B, or the like.

Further, none of these Patent Documents disclose or imply the essential requirements of the embodiment, that are, β phase including Si has excellent machinability, 15% or more β phase is required at least, and that compounds including fine P are present in β phase.

In Patent Document 15, greater than or equal to 0.2 mass % Sn is included, Sn and Si are included in order to improve dezincification corrosion resistance of β phase, hot extrusion is performed at a temperature of 700° C. or higher in order to improve machinability, and a heat treatment at 400° C. to 600° C. is required to improve corrosion resistance. The proportion of β phase is 5% to 25%, and the Si content may be 0.2 mass % or lower.

be obtained. Accordingly, the metallographic structure relational expressions are defined as follows.

$$20 \leq f2 = (\alpha) \leq 80$$

$$15 \leq f3 = (\beta) \leq 80$$

$$0 \leq f4 = (\gamma) \leq 8$$

$$f5 = 18 \times (\gamma)/(\beta) < 9$$

$$20 \leq f6 = (\gamma)^{1/2} \times 3 + (\beta) \times ([Si])^{1/2} \leq 88$$

$$33 \leq f6A = (\gamma)^{1/2} \times 3 + (\beta) \times ([Si])^{1/2} + ([Pb])^{1/2} \times 35 + ([P])^{1/2} \times 15$$

TABLE 1

|  | Cu | Si | P | Pb | Sn | Al | Others |
|---|---|---|---|---|---|---|---|
| First Embodiment | 61.0-65.0 | 1.0-1.5 | 0.003-0.19 | 0.003-0.20 | Sn + Al < 0.40 | | |
| | | | | | Fe + Mn + Cr + Co < 0.40 | | |
| Second Embodiment | 61.7-64.3 | 1.02-1.35 | 0.02-0.14 | 0.005-0.10 | Sn + Al ≤ 0.30 | | |
| | | | | | Fe + Mn + Cr + Co ≤ 0.30 | | |
| Patent Document 2 | 69-79 | 2.0-4.0 | 0.02-0.25 | — | 0.3-3.5 | 0.1-1.5 | — |
| Patent Document 3 | 69-79 | 2.0-4.0 | 0.02-0.25 | 0.02-0.4 | 0.3-3.5 | 0.1-1.5 | — |
| Patent Document 4 | 71.5-78.5 | 2.0-4.5 | 0.01-0.2 | 0.005-0.02 | 0.1-1.2 | 0.1-2.0 | — |
| Patent Document 5 | 69-88 | 2-5 | 0.01-0.25 | 0.004-0.45 | 0.1-2.5 | 0.02-1.5 | Zr: 0.0005-0.04 |
| Patent Document 6 | 69-88 | 2-5 | 0.01-0.25 | 0.005-0.45 | 0.05-1.5 | 0.02-1.5 | Zr: 0.0005-0.04 |
| Patent Document 7 | 74.5-76.5 | 3.0-3.5 | 0.04-0.10 | 0.01-0.25 | 0.05-0.2 | 0.05-0.2 | Fe: 0.11-0.2 |
| Patent Document 8 | 70-83 | 1-5 | 0.1 or less | — | 0.01-2 | — | Fe, Co: 0.01-0.3 |
| | | | | | | | Ni: 0.01-0.3 |
| | | | | | | | Mn: 0.01-0.3 |
| Patent Document 9 | 73.0-79.5 | 2.5-4.0 | 0.015-0.2 | 0.003-0.25 | 0.03-1.0 | 0.03-1.5 | — |
| Patent Document 10 | 73.5-79.5 | 2.5-3.7 | 0.015-0.2 | 0.003-0.25 | 0.03-1.0 | 0.03-1.5 | — |
| Patent Document 11 | 75.4-78.0 | 3.05-3.55 | 0.05-0.13 | 0.005-0.070 | 0.05 or less | 0.05 or less | — |
| Patent Document 12 | 55-75 | 0.01-1.5 | less than 0.15 | 0.01-4.0 | 0.1 or more | 0.1 or more | — |
| Patent Document 13 | 65-75 | 0.5-2.0 | — | — | 0.01-0.55 | 0.1-1.0 | — |
| Patent Document 14 | — | 0.25-3.0 | — | — | — | — | — |
| Patent Document 15 | 60.0-66.0 | 0.01-0.50 | 0.15 or less | 0.05-0.50 | 0.20-0.90 | — | Fe: 0.60 or less |

TABLE 2

| | Metallographic Structure |
|---|---|
| First Embodiment | 20 ≤ α ≤ 80, 15 ≤ β ≤ 80, 0 ≤ γ < 8 |
| Second Embodiment | 30 ≤ α ≤ 75, 25 ≤ β ≤ 70, 0 ≤ γ < 4 |
| Patent Document 2 | γ phase, in some cases, κ phase is present. β phase is turned into γ phase by heat treatment. |
| Patent Document 3 | γ phase, in some cases, κ phase is present. β phase is turned into γ phase by heat treatment. |
| Patent Document 4 | 18-500 Pb ≤ κ + γ + 0.3μ − β ≤ 56 + 500 Pb, 0 ≤ β ≤ 5 |
| Patent Document 5 | α + κ + γ ≥ 80 |
| Patent Document 6 | α + γ + κ ≥ 85, 5 ≤ γ + κ + 0.3μ − β ≤ 95 |
| Patent Document 7 | — |
| Patent Document 8 | — |
| Patent Document 9 | 30 ≤ α ≤ 84, 15 ≤ κ ≤ 68, β ≤ 3, etc. |
| Patent Document 10 | 60 ≤ α ≤ 84, 15 ≤ κ ≤ 40, β ≤ 2, etc. |
| Patent Document 11 | 29 ≤ κ ≤ 60, β = 0, etc. κ phase is present in α phase. |
| Patent Document 12 | — |
| Patent Document 13 | — |
| Patent Document 14 | — |
| Patent Document 15 | — |

<Metallographic Structure>

In a Cu—Zn—Si alloy, 10 or more kinds of phases are present, a complicated phase change occurs, and desired properties cannot be necessarily obtained simply by satisfying the composition ranges and relational expressions of the elements. Eventually, by specifying and determining the kinds of metallic phases present in the metallographic structure and the area ratio ranges thereof, desired properties can (γ Phase, Metallographic Structure Relational Expression f4)

As described in Patent Documents 2 to 6 and 9 to 11, γ phase is a phase that contributes most to machinability in a Cu—Zn—Si alloy in which the Cu concentration is about 69 mass % to 80 mass % and the Si concentration is about 2 mass % to 4 mass %. In the embodiments also, γ phase contributes to machinability. However, it is necessary to limit γ phase in order to obtain a good balance between ductility and strength. Specifically, when the proportion of γ phase is 8% or higher, excellent ductility or toughness cannot be obtained. Even when the amount of γ phase is small, γ phase acts to improve chip breakability in drilling. However, as γ phase is a hard phase, when a large amount of γ phase is present, the thrust resistance value in drilling increases. Providing that β phase is present at a proportion of 15% or higher, the effect of γ phase on machinability corresponds to the value obtained by raising the amount of γ phase to the power of ½. When a small amount of γ phase is included, γ phase has a large effect on improving machinability. However, when the amount of γ phase is further increased, the effect of improving machinability decreases. In consideration of ductility and cutting resistance in drilling and turning, the proportion of γ phase needs to be lower than 8%. The area ratio of γ phase is preferably 5% or lower and more preferably lower than 4%. When the area ratio of γ phase is lower than 4%, the influence on ductility is reduced. However, when cold workability is required among others, it is preferable that the area ratio of γ phase is lower than 1% or γ phase is not present. That is, even when (γ)=0, excellent machinability can be obtained by causing β phase including Si to be present at a proportion described below.

(β phase, Metallographic Structure Relational Expressions f3 and f5)

In order to obtain excellent machinability with γ phase contained in an amount less than that described in the Patent Documents and almost no κ phase or μ phase, it is important to optimize the Si content, the blending ratio between Cu and Zn, the amount of β phase, and the amount of Si solid-solubilized in β phase. Incidentally, it should be noted that β phase includes β' phase.

β phase in the composition range according to the embodiment has lower ductility than α phase, but has much higher ductility than γ phase or p phase, and also has higher ductility than κ phase. Accordingly, from a viewpoint of ductility, a relatively large amount of β phase can be included. On the other hand, γ phase has poor ductility and toughness. In addition, β phase can obtain excellent conductivity although it includes high concentrations of Zn and Si. The amounts of β phase and γ phase are significantly affected not only by the composition but also by the process.

In a Cu—Zn—Si—P—Pb alloy, a free-cutting copper alloy according to the embodiment, it is necessary that the area ratio of β phase is at least 15% or higher in order to obtain excellent machinability while minimizing the Pb content, and also, the amount of β phase needs to be more than twice the amount of γ phase in order to obtain excellent ductility and high strength. That is, it is necessary to satisfy f5=18×(γ)/(β)<9 (which can be transformed to 2×(γ)<(β)). The amount of β phase is preferably 20% or higher and more preferably 25% or higher. Even when the amount of γ phase is lower than 4% (in some cases, 0%), excellent machinability can be obtained by satisfying the relational expressions f6 and f6A. When the amount of γ phase is lower than 4% and the amount of β phase exceeds nine times the amount of γ phase, excellent ductility and toughness, and high strength can be obtained. The amount of β phase, then, is preferably 25% or higher, more preferably 35% or higher, and still more preferably 40% or higher. Even when the proportion of β phase is about 50% or about 40% and the proportion of α phase having poor machinability is about 50% or about 60%, superb machinability of the alloy is maintained.

When the proportion of γ phase is 0% or lower than 1%, if the amount of β phase is about 50% or about 40% or higher, P-containing compounds are present and the machinability of a β single-phase alloy including Si is maintained although depending on the Si concentration, the shape of α phase, and the distribution of β phase. It is presumed that soft α phase functions as a cushioning material around β phase and prevents α phase from causing an adverse effect not only on cutting resistance but also on chip breakability. Further, a phase boundary between hard β phase and soft α phase functions as a stress concentration source of chip breakage, and the chip breakability can be better than that of a single β-phase alloy depending on the shape of α phase. Further, when the amount of β phase is decreased to about 20%, the characteristics of α phase become predominant, and once the amount of β phase is decreased to about 15% to about 25%, machinability rapidly deteriorates.

On the other hand, β phase has lower ductility than α phase. As the proportion of β phase decreases, ductility improves. In order to obtain excellent ductility and a good balance between strength and ductility, the proportion of β phase is required to be 80% or lower, preferably 75% or lower, and more preferably 70% or lower. When ductility and cold workability are important, the proportion of β phase is preferably 60% or lower and more preferably 50% or lower. The appropriate proportion of β phase slightly varies depending on the intended purpose of use and application.

β phase including about 1.5 mass % Si exhibits excellent hot deformability and low hot deformation resistance when hot worked at a low hot working temperature of 500° C. or higher, and an alloy having such β phase exhibits excellent hot deformability and low hot deformation resistance.

(Si Concentration and Machinability of β Phase)

Regarding β phase, the more the Si content solid-solubilized in β phase increases within the composition range of the embodiment, the more the machinability improves. Therefore, the Si content in β phase is preferably 1.2 mass % or higher. As a result of devoted study on the relationship between the Si concentration in the alloy, the amount of β phase, and the machinability of the alloy, it was revealed that, as a convenient means, machinability of an alloy can be represented well by multiplying the amount of β phase by the Si concentration (mass %, [Si]) raised to the power of ½. That is, when two β phases are compared, one containing Si at a higher concentration has better machinability. That means, for example, an alloy whose Si concentration is 1.0 mass % needs 1.1 times the amount of β phase contained in an alloy whose Si concentration is 1.21 mass %. However, the machinability improvement effect of β phase is saturated when the Si concentration in the alloy is in a range of about 1.35 mass % to about 1.5 mass %. Once the Si concentration exceeds about 1.5 mass %, the higher the Si concentration, the worse the machinability of β phase. Regarding the Si content in β phase, when the Si content in β phase is higher than 1.9 mass %, the machinability of β phase deteriorates instead of improves. Thus, the amount of Si contained in β phase, that is, the amount of Si solid-solubilized in β phase is preferably 1.2 mass % or higher and 1.9 mass % or lower.

(β Phase, Metallographic Structure Relational Expression f6)

In addition to the metallographic structure relational expressions f3 to f5, the metallographic structure relational expression f6 defines the proportions of γ phase and β phase to obtain excellent machinability, ductility, and strength comprehensively by assigning coefficients to the proportions of γ phase and β phase, respectively. As described above, γ phase exhibits excellent chip breakability during drilling even if its content is small, and a coefficient of 3 is multiplied by the amount (area %) of γ phase raised to the power of ½. β phase is expressed in the metallographic structure relational expression f6, an expression to obtain machinability in which importance is put on the Si concentration of the alloy, and the amount (area %) of β phase multiplied by the Si concentration raised to the power of ½ and the value obtained by multiplying the amount (area %) of γ phase raised to the power of ½ by a coefficient of 3 are added. The metallographic structure relational expression f6 is important, but is not effective unless the composition relational expression f1 and the metallographic structure relational expression f2 to f5 are satisfied. The lower limit value of the metallographic structure relational expression f6 for obtaining excellent machinability is 20 or higher, preferably 30 or higher, and more preferably 35 or higher. When machinability is important, the lower limit value of the metallographic structure relational expression f6 is preferably 40 or higher and more preferably 45 or higher. On the other hand, in consideration of properties such as ductility or strength, the upper limit of the metallographic structure relational expression f6 is 88 or lower, preferably 82 or lower, and more preferably 77 or lower. In particular, when ductility and cold workability during cold rolling, slender bar production, or the like are important, the metallographic structure relational expression f6 is preferably 67 or lower and more preferably 60 or lower.

Incidentally, in the metallographic structure relational expressions f2 to f6 and f6A, α phase, β phase, γ phase, δ phase, ε phase, ζ phase, η phase, κ phase, μ phase, and χ phase are the subject metallic phases, and intermetallic compounds excluding P-containing compounds, Pb particles, oxides, non-metallic inclusions, non-melted materials, and the like are not the subjects. Most P-containing compounds are present in β phase or at a boundary between α phase and β phase. Therefore, it is assumed that β phase includes the P-containing compounds that are present in β phase or at a boundary between α phase and β phase. When any P-containing compounds are present in α phase although it is rare, it is assumed that α phase includes the P-containing compounds. P-containing compound acts effectively in favor of machinability, and its content is small. Therefore, there is no problem to assume that β phase includes P-containing compounds. On the other hand, Intermetallic compounds that are formed by Si or P and inevitably mixed-in elements (for example, Fe, Mn, Co, and Cr) are outside the scope of the calculation of the area ratios of metallic phases.

(Metallographic Structure and Composition Relational Expression f6A)

As a conditional expression for an alloy to obtain excellent machinability, it is necessary to add the effects of Pb and P for improving machinability through distinctive actions to the expression f6. When a very small amount of Pb is included under a condition where P-containing compounds are present in β phase including Si, machinability improves. Likewise, as the amount of P solid-solubilized in β phase increases, or as the amount of P-containing compounds increases, machinability improves. As a result of devoted study, it was found that the degree of improvement of machinability has a close relationship with the values of the contents of Pb and P raised to the power of ½. That is, even when the amount of Pb or P is tiny, these elements exhibit a tremendous effect, and as the contents increase, the effect of improving machinability increases. However, the degree of the improvement gradually diminishes.

In summary, the Si concentration in β phase, the amount of β phase, the amount of P solid-solubilized in β phase, the amount of P-containing compounds in β phase, and the content of Pb present as fine particles improve the machinability of the alloy through distinctive actions respectively. When all the requirements are satisfied, a large effect of improving machinability is exhibited due to the synergistic effect, and the machinability of the alloy is significantly improved by including a very small amount of Pb or P.

In the metallographic structure and composition relational expression f6A, a coefficient of 35 is multiplied by the value of the Pb content (mass %, [Pb]) raised to the power of ½, a coefficient of 15 is multiplied by the value of the P content (mass %, [P]) raised to the power of ½, and the obtained values are added to f6. In order to obtain excellent machinability, f6A is at least 33 or higher, preferably 40 or higher, more preferably 44 or higher, and still more preferably 50 or higher. Even when the metallographic structure relational expression f6 is satisfied, unless f6A in which the effects of Pb and P are added is satisfied, excellent machinability cannot be obtained. As long as the contents of Pb and P are within the ranges defined by the embodiment, the effect on ductility or the like does not need to be defined by f6A since it is defined by the upper limit of the relational expression f6. When the value of f6 is relatively low, the machinability is improved by increasing the contents of Pb and P. Further, when machining conditions are severe, for example, when machining is performed at a high cutting speed, when the feed rate is high, when the cutting depth in turning is deep, or when holes with a large diameter are drilled, it is preferable to increase f6A, in particular, the value of the term related to Pb.

f6 and f6A are applied only within the concentration range of each of the elements defined by the embodiment and the ranges defined by f1 to f5.

(α Phase, Metallographic Structure Relational Expression f2, and Shape of α Phase)

α phase is a main phase forming the matrix together with β phase or γ phase. α phase including Si has better machinability improvement effect than α phase without Si, even though it is only by 5% to 10% in terms of machinability index. However, as the Si content increases, machinability improves. In the case of a β single-phase alloy, there is a problem with the ductility of the alloy, and an appropriate amount of α phase having high ductility is required. Even when β phase having excellent machinability and α phase having poor machinability are included, α phase itself functions as a cushioning material or as a stress concentration source at a boundary with hard β phase during machining. Therefore, even when a relatively large amount of α phase is included, for example, about 50% in terms of area ratio, excellent machinability that a β single-phase alloy has is maintained. As described above, machinability also depends on the Si concentration in the alloy, the Si concentration in β phase, and the shape of α phase or how α phase is distributed.

As a result of devoted study, in consideration of the ductility and toughness of the alloy and the balance between ductility and strength, the amount of α phase is required to be 20% or higher, preferably 25% or higher, and more preferably 30% or higher. When cold workability is important, for example, when cold drawing, cold wire-drawing, or cold rolling is performed at a high working ratio or when cold working such as bending or crimping is performed, it is preferable that the area ratio of α phase is 40% or higher. On the other hand, in order to obtain excellent machinability, the upper limit of the area ratio of α phase is at least 80% or lower, preferably 75% or lower, and more preferably 70% or lower or 65% or lower. In particular, when machinability is important, the area ratio of α phase is preferably 60% or lower.

(Machinability, Mechanical Characteristics, Shape of α Phase, and Distribution of β Phase)

Regarding the shape and distribution of α phase and the distribution of β phase that affect the machinability and/or the mechanical characteristics of the alloy, when the shape of α phase crystal grains is acicular (an elliptical shape in which the longer side/shorter side ratio of crystal grains is higher than 4), the dispersion of α phase deteriorates, and acicular α phase having a large longer side hinders machining. In addition, crystal grains of β phase around α phase enlarge, and the state of dispersion of β phase also deteriorates. Further, the finer the α phase crystal grains are, the more the machinability and mechanical characteristics improve. The average size of α phase crystal grains is preferably 30 μm or less. When α phase crystal grains are granular and fine, α phase is uniformly distributed, causing β phase to be divided. Therefore, in terms of machinability, strength, and ductility, α phase functions as a good cushioning material, or a phase boundary between α phase and β phase functions as a stress concentration source for chip breakage, and chips are more likely to be broken than those of a β single-phase alloy. Accordingly, as a preferred embodiment, when the proportion of α phase crystal grains having a longer side/shorter side ratio of 4 or lower in the entirety of α phase ((the number of granular α phase crystal grains whose "longer side/shorter side" ratio is 4 or lower/ the total number of α phase crystal grains)×100) is 50% or higher and preferably 75% or higher, machinability improves. When the proportion of acicular α phase crystal grains having a large longer side exceeds 50%, about the same level of ductility is maintained, but the strength of the alloy decreases. Accordingly, when the proportion of granular α phase crystal grains increases, the strength increases, and the balance between strength and ductility improves. Regarding the shape of α phase crystal grains, whether or not the proportion of the acicular or elliptical α phase crystal grains whose "longer side/shorter side" ratio is higher than 4 exceeds 50% or 25% is affected by the production process. When the hot working temperature increases, the proportion of acicular or elliptical α phase crystal grains whose "longer side/shorter side" ratio is higher than 4 increases.

(μ Phase, κ Phase, and Other Phases)

In order to obtain high ductility or toughness, and high strength together with excellent machinability, presence of the phases other than α, β, and γ phases is also important. In the embodiment, considering the properties of the alloy, κ phase, μ phase, δ phase, ε phase, ζ phase, or η phase is not particularly required. When the sum of the constituent phases (α), (β), (γ), (μ), (κ), (δ), (ε), (ζ), and (η) that form the metallographic structure is represented by 100, it is preferable that (α)+(β)+(γ)>99, and it is most preferable that (α)+(β)+(γ)=100 providing that calculation error and number rounding are disregarded.

(Presence of P-Containing Compounds)

In β phase including Si, chip breakability is insufficient as compared to a free-cutting copper alloy including 3 mass % Pb, and the cutting resistance in turning and the torque in drilling are high. By precipitating P-containing compounds having an average particle size of about 0.5 to 3 μm in β phase, the machinability of β phase can be further improved. Simply speaking, the effect of improving machinability obtained by the presence of P-containing compounds corresponds to an improvement of about 10%, in some cases, about 12% in terms of machinability index. Machinability is also affected by the P content, the amount and distribution of β phase, as well as the size, distribution state, etc. of the P-containing compounds to be formed. P-containing compound is a compound including P and at least either or both of Si and Zn. In some cases, it can further includes Cu and/or inevitable impurities such as Fe, Mn, Cr, or Co. P-containing compounds are affected by inevitable impurities such as Fe, Mn, Cr, and Co, too. When the concentration of the inevitable impurities exceeds the afore-mentioned defined amount, the composition of P-containing compound changes such that P-containing compound may no longer contribute to improvement of machinability. Incidentally, P-containing compounds are not present at a hot working temperature of about 600° C. They are produced at a critical cooling rate during cooling after hot working. Accordingly, the cooling rate after hot working is important, and it is preferable that cooling is performed at an average cooling rate of 50° C./min or lower in a temperature range from 530° C. to 450° C. This average cooling rate is more preferably 45° C./min or lower. On the other hand, when the cooling rate is excessively slow, P-containing compounds are likely to grow bigger, which causes the effect on machinability to decrease. The lower limit of the average cooling rate is preferably 0.1° C./min or higher and more preferably 0.3° C./min or higher.

Figure 1B:
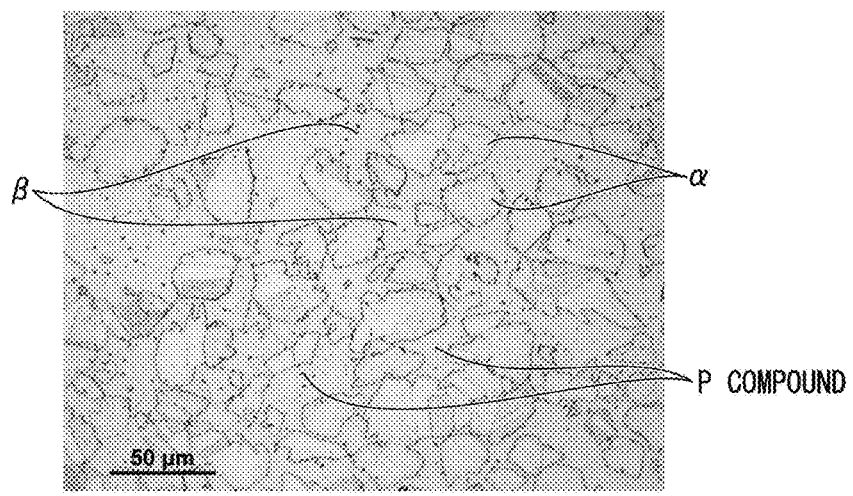
FIG. 1B is a picture showing the structure of a free-cutting copper alloy according to an embodiment, which includes 62.9 mass % Cu, 1.14 mass % Si, 0.072 mass % P, 0.009 mass % Pb, and Zn as the balance and is obtained by hot forging at 615° C. and cooling at an average cooling rate of 28° C./min in a temperature range from 530° C. to 450° C.
Figure 1C:
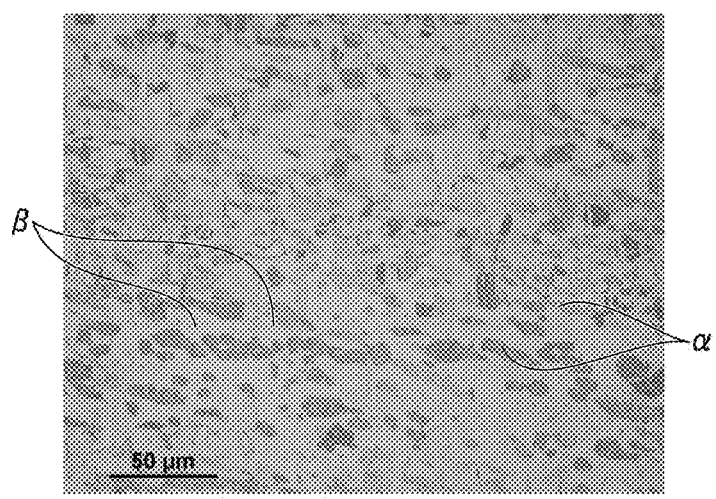
FIG. 1C is a picture showing the structure of a free-cutting copper alloy according to an embodiment, which includes 62.5 mass % Cu, 1.05 mass % Si, 0.001 mass % P, 0.016 mass % Pb, and Zn as the balance and is obtained by hot extrusion at 595° C. and cooling at an average cooling rate of 25° C./min in a temperature range from 530° C. to 450° C.

Now, FIGS. 1A to 1C show metallographic structure images of various alloys.

The copper alloy shown in FIG. 1A is an alloy comprising 62.9 mass % Cu, 1.14 mass % Si, 0.072 mass % P, 0.009 mass % Pb, and Zn as the balance, which is obtained by hot extrusion at 590° C. and an average cooling rate of 25° C./min in a temperature range from 530° C. to 450° C.

The copper alloy shown in FIG. 1B is an alloy comprising 62.9 mass % Cu, 1.14 mass % Si, 0.072 mass % P, 0.009 mass % Pb, and Zn as the balance, which is obtained by hot forging at 615° C. and an average cooling rate of 28° C./min in a temperature range from 530° C. to 450° C.

The copper alloy shown in FIG. 1C is an alloy comprising 62.5 mass % Cu, 1.05 mass % Si, 0.001 mass % P, 0.016 mass % Pb, and Zn as the balance, which is obtained by hot extrusion at 595° C. and an average cooling rate of 25° C./min in a temperature range from 530° C. to 450° C.

As shown in FIGS. 1A and 1B, when the hot extruded material and the hot forged material are observed with a metallographic microscope, granular precipitates having a particle size of about 0.5 to 3 μm that look black are present in β phase and at a phase boundary between β phase and α phase. In addition, in most of α phase crystal grains, the longer side/shorter side is 4 or lower, and the average size of α phase crystal grains is about 15 μm in FIG. 1A and is about 25 μm in FIG. 1B.

On the other hand, in FIG. 1C, the P content is 0.001 mass %. Therefore, no precipitate including P is present. In a comparison between FIG. 1C and FIGS. 1A and 1B, even if etching is performed under the same condition, when the P content is 0.001 mass % (FIG. 1C), phase boundaries between α phase and β phase are not clear. However, when the P content is 0.072 mass % (FIGS. 1A and 1B), phase boundaries between α phase and β phase look clearer. That the P content of the former is 0.001 mass % and the difference of 0.071 mass % in the P content has caused the metallographic structure to changed.

(Si Content Solid-Solubilized in β Phase and Machinability)

The contents of Cu, Zn, and Si in α phase, β phase, and γ phase formed in the composition range of the embodiment roughly have the following relationships.

The Cu concentration: $\alpha > \beta \geq \gamma$.

The Zn concentration: $\beta > \gamma > \alpha$.

The Si concentration: $\gamma > \beta > \alpha$.

Regarding a sample (an alloy including 64.1 mass % Cu, 1.21 mass % Si, 0.035 mass % P, and Zn as the balance) that was hot-extruded to φ25.4 mm at 590° C. on the actual production line, a sample (an alloy including 62.9 mass % Cu, 1.14 mass % Si, 0.07 mass % P, and Zn as the balance) that was heat-treated at 410° C. for 50 minutes on the actual production line, and samples (an alloy including 64.0 mass % Cu, 1.31 mass % Si, 0.05 mass % P, and Zn as the balance and an alloy including 62.3 mass % Cu, 1.06 mass % Si, 0.04 mass % P, and Zn as the balance) that were extruded to φ22 mm at 595° C. in a laboratory, the concentrations of Cu, Zn, and Si in α, β, and γ phases were quantitatively analyzed with an X-ray microanalyzer using secondary electron images and compositional images of the samples taken at a magnification of 2000-fold. The measurement was performed using "JXA-8230" (manufactured by JEOL Ltd.) under the conditions of acceleration voltage: 20 kV and current value: $3.0 \times 10^{-8}$ A. The results are shown in Tables 3 to 6.

The concentration of the Si solid-solubilized in β phase is about 1.5 times that in α phase. That is, about 1.5 times the amount of Si in α phase is distributed in β phase. For example, when the Si concentration in the alloy is 1.2 mass %, about 1.0 mass % Si is solid-solubilized in α phase, and 1.5 mass % Si is solid-solubilized in β phase.

An alloy having a representative composition of Patent Document 2, that is, 76 mass % Cu, 3.1 mass % Si, and Zn as the balance, was prepared and analyzed with an X-ray microanalyzer (EPMA). The result was that the composition of γ phase was 73 mass % Cu, 6 mass % Si, and 20.5 mass % Zn. This composition of γ phase is significantly different from the composition of 60.5 mass % Cu, 3.5 mass % Si, and 36 mass % Zn, which is a composition example of γ phase in the embodiment, and therefore, it is expected that characteristics of the γ phases of the alloys are also different.

TABLE 3

Alloy of Zn-64.1 mass % Cu-1.21 mass % Si -0.035 mass % P

|   | Cu | Zn | Si |
|---|---|---|---|
| α phase | 66.0 | 32.5 | 1.0 |
| β phase | 61.0 | 37.5 | 1.5 |
| γ phase | 60.5 | 36.0 | 3.5 |

TABLE 4

Alloy of Zn-62.9 mass % Cu-1.14 mass % Si -0.07 mass % P

|   | Cu | Zn | Si |
|---|---|---|---|
| α phase | 65.5 | 33.5 | 0.9 |
| β phase | 60.5 | 38.0 | 1.4 |

TABLE 5

Alloy of Zn-64.0 mass % Cu-1.31 mass % Si -0.05 mass % P

|   | Cu | Zn | Si |
|---|---|---|---|
| α phase | 66.0 | 32.5 | 1.1 |
| β phase | 61.0 | 37.0 | 1.6 |
| γ phase | 60.5 | 35.5 | 3.7 |

TABLE 6

Alloy of Zn-62.3 mass % Cu-1.06 mass % Si-0.04 mass % P

|   | Cu | Zn | Si |
|---|---|---|---|
| α phase | 65.0 | 34.0 | 0.9 |
| β phase | 60.0 | 38.5 | 1.3 |

(Machinability Index)

In general, machinability of various copper alloys is expressed by numerical value (%) by comparison with a free-cutting brass including 3 mass % Pb which is used as a standard, i.e., 100% refers to the machinability of the standard alloy. Machinability of copper alloys is described, for example, in "Basic and Industrial Technique of Copper and Copper Alloy (Revised Edition)" (1994, Japan Copper and Brass Association), p. 533, Table 1, and Metals Handbook TENTH EDITION Volume 2 Properties and Selection: Nonferrous Alloys and Special-Purpose Materials" (1990, ASM International), p. 217 to 228.

Alloys in Table 7 are alloys including 0.01 mass % Pb prepared in a laboratory as described below by hot-extruding to φ22 mm using an extrusion test machine in the laboratory. In the case of Cu—Zn binary alloys, containing a small amount of Pb hardly affects the machinability of the alloy. Therefore, 0.01 mass % Pb, which falls within the component range of the embodiment, was added to each of the alloys. The hot extrusion temperature of Alloys A and D was 750° C., and the hot extrusion temperature of the other alloys, Alloys B, C, E, and F, was 635° C. After the extrusion, a heat treatment was performed at 500° C. for 2 hours to adjust the metallographic structure. The turning and drilling tests described below were performed to find out the machinability of the alloys. A commercially available free-cutting brass, C3604 (comprising 59 mass % Cu, 3 mass % Pb, 0.2 mass % Fe, 0.3 mass % Sn, and Zn as the balance) was used as the standard free-cutting brass material.

TABLE 7

|  |  | Component Composition | | | | | Metallographic Structure (%) | |
|---|---|---|---|---|---|---|---|---|
| Material | | Cu | Zn | Si | Pb | P | α | β |
| Alloy A | α brass | 65.0 | 35.0 | 0 | 0.01 | 0 | 100 | 0 |
| Alloy B | 50% β brass | 58.1 | 41.9 | 0 | 0.01 | 0 | 52 | 48 |
| Alloy C | β brass | 54.0 | 46.0 | 0 | 0.01 | 0 | 0 | 100 |
| Alloy D | α brass with 0.9 Si | 69.1 | 30.0 | 0.88 | 0.01 | 0 | 100 | 0 |
| Alloy E | β brass with 1.3 Si | 59.8 | 38.8 | 1.30 | 0.01 | 0 | 0 | 100 |
| Alloy F | β brass with P + 1.3 Si | 59.6 | 39.0 | 1.30 | 0.01 | 0.05 | 0 | 100 |

TABLE 8

| Machinability | Turning | | | Hole Drilling | | | |
|---|---|---|---|---|---|---|---|
|  | Cutting | | | Cutting Resistance | | | |
|  | Overall (%) | Resistance (%) | Chips | Overall (%) | Torque (%) | Thrust (%) | Chips |
| Alloy A | 31 | 33 | X | 28 | 26 | 30 | X |
| Alloy B | 44 | 39 | X | 49 | 46 | 52 | X |
| Alloy C | 51 | 41 | X | 61 | 53 | 68 | X |
| Alloy D | 38 | 39 | X | 36 | 33 | 39 | X |
| Alloy E | 75 | 79 | Δ | 71 | 65 | 76 | Δ |
| Alloy F | 85 | 93 | ○ | 76 | 74 | 77 | ○ |

The above-mentioned Patent Documents describe that the machinability of a 70 Cu-30 Zn alloy which is an α single-phase brass is 30%. In the embodiment, as shown in Tables 7 and 8, the machinability of a 65 Cu-35 Zn alloy (Alloy A), which is also an α single-phase brass, was 31%. In the α single-phase brass in which the contents of Cu and Zn were adjusted and the Si content was 0.9 mass % (Alloy D), that is, an α single-phase brass in which 0.9 mass % Si was solid-solubilized in α phase, the machinability index was improved by about 7% compared with an a brass not including Si. Chips of Alloys A and D generated in the turning and drilling tests were both continuous.

The force of turning can be decomposed into a principal cutting force, a feed force, and a thrust force, but the combined force (three force components) thereof was regarded as the cutting resistance. In the case of drilling, the force was decomposed into torque and thrust, and the average value thereof is described as "Overall" cutting resistance of drilling. Further, as the machinability of the alloy, the cutting resistance during turning and that during drilling were averaged, and the average value was described as the "Overall" machinability index (evaluation).

In a β single-phase brass in which the contents of Cu and Zn were adjusted and Si was not included (Alloy C, 54 Cu-46 Zn), the "overall" machinability index improved about 20% compared with an α phase brass not including Si. Yet, with the "overall" machinability index still standing at 51%, there was little improvement in chips, and the chip evaluation remained the same. In a β single-phase alloy including about 1.3 mass % Si (Alloy E), the "overall" machinability index further improved 24% compared with a β single-phase alloy not including Si (Alloy C). Chips generated during turning and drilling were slightly improved and were broken, but the difference from those of a free-cutting brass including 3 mass % Pb was large.

In a β single-phase alloy including 0.05 mass % P and 1.3 mass % Si (Alloy F), the "overall" machinability index was improved by about 10% compared with a β single-phase alloy including 1.3 mass % Si without including P. Due to inclusion of P, the turning performance improved about 14%, and the torque in drilling remarkably improved about 9%. The magnitude of cutting resistance in turning and that of torque in drilling are related to chip shape, and by including 0.05 mass % P, the evaluation result of the chip shape improved from "Δ" to "○". The difference with a free-cutting brass including 3% Pb in the resistance during turning narrowed, and chips produced during turning and drilling significantly improved having substantially the same shape as those of a free-cutting brass including 3% Pb. Incidentally, cutting resistance of an alloy is affected by its strength. When hot extruded materials are compared to each other, the higher the strength, the higher the cutting resistance. β single-phase brass and the alloy according to the embodiment have a strength that is 1.2 to 1.3 times that of a free-cutting brass including 3 mass % Pb. If the difference is taken into consideration, it can be said that the machinability of a β single-phase alloy including 1.3 mass % Si and 0.05 mass % P is substantially equivalent to the machinability of a free-cutting brass including 3 mass % Pb.

According to Tables 4 and 6, Alloy F, a β single-phase alloy, corresponds to β phase of the free-cutting copper alloy according to the embodiment, and Alloy D corresponds to α phase thereof. The free-cutting copper alloy according to the embodiment is composed of β phase having machinability substantially comparable to that of a free-cutting brass including 3 mass % Pb (Alloy F) and α phase in which the machinability is improved by including Si (Alloy D). In the free-cutting copper alloy according to the embodiment, even when the proportion of β phase is reduced to about 50% or about 40%, the machinability of Alloy F, a β single-phase alloy, which is comparable to that of a leaded free-cutting brass, can be substantially maintained.

On the other hand, Alloy B is a brass including 0.01 mass % Pb and not including Si or P, in which the proportion of β phase is 48%, and the cutting resistances in turning and drilling improved surpassing that of an α single-phase brass (Alloy A). However, the cutting resistance was higher than that of a β single-phase brass (Alloy C), and the "overall" machinability evaluation was 44%, which is 35% points lower than that of the alloy according to the embodiment of the present invention having the same proportion of β phase, and the chip shapes were totally different from each other. There is no way that a brass including 0.01 mass % Pb, not including Si or P, and including 48% β phase can be a replacement of a free-cutting brass including 3 mass % Pb from a perspective of cutting resistance and chip shape.

The free-cutting copper alloy according to the embodiment includes P-containing compounds in β phase, and has good machinability due to the effect of 1.3% to 1.6 mass % Si contained in β phase as shown in Tables 3 to 6.

<Properties>

(Normal-Temperature Strength and High Temperature Properties)

There is a strong demand for reduction in the thickness and weight of parts and components that are target applications of the embodiment such as auto parts. Among the strengths that are required, tensile strength is important, and the balance between tensile strength and ductility is also important.

In this regard, it is preferable that hot extruded materials, hot rolled materials, and hot forged materials are high strength materials having a tensile strength of 470 N/mm² or higher in a state where cold working is not performed after hot working. The tensile strength is more preferably 500 N/mm² or higher and still more preferably 530 N/mm² or higher. Many components that are used for valves, joints, pressure vessels, air conditioners, or freezers are manufactured by hot forging. A leaded copper alloy currently used has a tensile strength of about 400 N/mm² and an elongation of 30% to 35%. Therefore, a reduction in weight can be realized by increasing the strength.

Cold working may also be performed after hot working, and a material that falls within the following range is defined as a high-strength and high-ductility material in consideration of the influence of cold working.

A hot worked material, a material that is further cold-worked at a working ratio of 30% or lower after hot working, or further cold-worked and heat-treated after hot working, then cold-worked to a working ratio of 30% or lower have the following properties. Hereinafter, the final cold working ratio is represented by [R]%, and when cold working is not performed, [R]=0. The tensile strength S (N/mm²) is (470+8×[R]) N/mm² or higher and preferably (500+8×[R]) N/mm² or higher. The elongation E (%) is (0.02×[R]²−1.15×[R]+18)% or higher, and preferably (0.02×[R]²−1.2×[R]+20)% or higher. The characteristic relational expression f7=S×(100+E)/100 indicating the balance between strength and ductility is preferably 600 or higher, more preferably 640 or higher, still more preferably 670 or higher, and most preferably 700 or higher.

Incidentally, in a hot-worked, free-cutting brass including Pb on which no further working is performed after hot-working, the characteristic relational expression f7 is about 530. The characteristic relational expression f7 of the copper alloy according to the embodiment is higher than this by at least 70, possibly 100 or higher, indicating that the balance between strength and ductility is excellent.

(Electrical Conductivity)

The applications of the embodiment include electrical and electronic apparatus components, components of automobiles in the field where electrification is in progress, and other parts and components having high conductivity. Currently, phosphor bronzes including 6 mass % or 8 mass % Sn (JIS standards, C5191, C5210) are widely used for these applications, and their electrical conductivities are about 14% IACS and 12% IACS, respectively. Accordingly, no serious problem related to electric conductivity occurs to the copper alloy according to the embodiment as long as it has an electrical conductivity of 13% IACS or higher. The electrical conductivity is preferably 14% IACS or higher. The reason that the copper alloy according to the embodiment exhibits high conductivity despite inclusion of elements that deteriorate electrical conductivity, specifically, Si in an amount exceeding 1 mass % and Zn in an amount about 33 mass % or higher, is the influence of the amount of β phase in the alloy and Si solid-solubilized in β phase. The upper limit of the electrical conductivity is not particularly defined because an increase in conductivity rarely causes a problem in practice.

From the above-stated results of study, the following findings were obtained.

First, in the conventional art, it was known that β phase formed in a Cu—Zn—Si alloy has no effect on machinability of an alloy or has a negative effect on the machinability. However, as a result of devoted study, it was found that β phase comprising, for example, about 1.5 mass % Si, about 61 mass % Cu, and about 37.5 mass % Zn has extremely good machinability.

Second, it was found that, if β phase is made to contain P such that P is solid-solubilized in β phase and P-containing compounds having an average particle size of about 0.5 to about 3 μm are made to precipitate in β phase for the purpose of further improving the machinability of β phase in a Cu—Zn—Si alloy, the cutting resistance further decreases, and the chip breakability significantly improves compared with an alloy not including P or in which no P-containing compounds are present.

Third, it was found that γ phase formed in the free-cutting copper alloy according to the embodiment has an effect to obtain excellent chip breakability. The copper alloys of the Patent Documents have compositions different than that of the free-cutting copper alloy according to the embodiment. Even though the copper alloys of the Patent Documents and the free-cutting copper alloy according to the embodiment both have γ phase, if the composition is different, there is a large difference in machinability similarly to β phase as described above. And, it was found that γ phase present within the composition range of the embodiment also has excellent machinability. It was revealed that in the embodiment, although the Cu content and the Si content are low, the machinability, in particular, chip breakability of γ phase during drilling, is excellent. However, since γ phase impairs ductility, it was necessary to limit its amount. It was found that, in the metallographic structure comprising two phases of α phase and β phase without including γ phase (for the purpose of prioritizing the ductility of the alloy), machinability is excellent.

Fourth, β phase including about 1.5 mass % Si has high strength but its ductility is poor. An alloy containing an excessive amount of β phase is not suitable as an industrial material. The free-cutting copper alloy according to the embodiment was completed by optimizing the respective parameters including the amount of α phase, the amount of β phase, the amount of γ phase, the size of α phase crystal grains (crystal grain size of α phase), and the shape of α phase crystal grains for the purpose of maintaining machinability such as excellent chip breakability and low cutting resistance.

Fifth, it was revealed that, when a small amount of Pb is contained in a copper alloy whose machining performance has been improved by including β phase in which Si is contained and P-containing compounds are present, such Pb exhibits an effect of improving chip breakability and reducing cutting resistance. The alloy according to the embodiment was completed by finding out not only the previously described P content but also the effect of the Pb content on machinability and obtaining a further optimized composition and metallographic structure in consideration of machinability, other properties, and influence on human body.

Sixth, conventional leaded copper alloys had a problem in hot deformability at 650° C. or lower because they contain a large amount of Pb which is in a molten state at a hot working temperature. The alloy according to the embodiment was completed as a copper alloy having good ductility during hot working, excellent hot deformability at about 600° C., a temperature lower than 650° C., low hot deformation resistance, which can be hot worked easily.

(Hot Workability)

The free-cutting copper alloy according to the embodiment has a characteristic that it has excellent deformability at about 600° C., can be hot-extruded into a bar having a small cross-sectional area, and can be hot-forged into a complex shape. When high deformation is performed on a leaded copper alloy at about 600° C., a large crack is formed. Therefore, the appropriate hot extrusion temperature is 625° C. to 800° C., and the appropriate hot forging temperature is 650° C. to 775° C. The free-cutting copper alloy according to the embodiment has a characteristic that it does not crack when hot working is performed at a working ratio of 80% or higher at 600° C. A preferable hot working temperature for the free-cutting copper alloy according to the embodiment is a temperature lower than 650° C. and more preferably lower than 625° C.

In the free-cutting copper alloy according to the embodiment, hot deformability of α phase and β phase is improved and deformation resistance is reduced at 600° C. due to inclusion of Si. Since the proportion of β phase is high, hot working can be easily performed at 600° C.

When the hot working temperature is about 600° C. which is lower than the working temperature of conventional copper alloys, tools such as an extrusion die for hot extrusion, containers of extruder, and metal molds for forging are heated to 400° C. to 500° C. and used. The smaller the difference in temperature between the tools and the hot worked material, the more homogeneous the metallographic structure, the better the dimensional accuracy of a hot worked material, and the longer the tool life because tool temperature does not substantially increase. In addition, a material having a high strength and a good balance between strength and elongation can be obtained.

<Production Process>

Next, a method for producing the free-cutting copper alloys according to the first and second embodiments of the present invention will be described.

The metallographic structure of the alloy according to the embodiment varies not only depending on the composition but also depending on the production process. The metallographic structure of the alloy is affected not only by hot working temperatures in hot extrusion and hot forging and heat treatment conditions but also by the average cooling rate in the process of cooling after hot working or heat treatment. As a result of a devoted study, it was found that the metallographic structure is significantly affected by the cooling rate in a temperature range from 530° C. to 450° C. in the process of cooling after hot working or heat treatment.

(Melting and Casting)

Melting is performed at about 950° C. to about 1200° C., a temperature that is about 100° C. to about 300° C. higher than the melting point (liquidus temperature) of the alloy according to the embodiment. A molten alloy having a temperature of about 900° C. to about 1100° C., a temperature that is about 50° C. to about 200° C. higher than the melting point is cast into a predetermined mold and is cooled by some cooling means such as air cooling, slow cooling, or water cooling. After the alloy solidifies, constituent phases change in various ways.

(Hot Working)

Examples of hot working include hot extrusion, hot forging, and hot rolling. When two or more hot working steps are performed, the final hot working step is performed under the following condition.

First, regarding hot extrusion, in a preferred embodiment, although depending on extrusion ratio (hot working ratio) and facility capacity, hot extrusion is performed such that the material's temperature when it is being hot worked, specifically, immediately after the material passes through the extrusion die (hot working temperature) is higher than 540° C. and lower than 650° C. The lower limit of the hot extrusion temperature relates to hot deformation resistance, and the upper limit thereof relates to the shape of α phase. By controlling the hot extrusion temperature such that it is within a narrower temperature range, a stable metallographic structure can be obtained. When hot extrusion is performed at 650° C. or higher, the shape of α phase crystal grains is likely to be acicular instead of granular, or large α phase crystal grains having a diameter of more than 50 μm are likely to appear. When acicular and large α phase crystal grains appear, the strength slightly decreases, the balance between strength and ductility slightly deteriorates, the distribution of P-containing precipitates slightly deteriorates, and the machinability slightly deteriorates as large α phase crystal grains having a large longer side hinder machining. The shape of α phase crystal grains relates to the composition relational expression f1, and when the composition relational expression f1 is 58.0 or lower, the extrusion temperature is preferably lower than 625° C. By performing extrusion at a temperature lower than the temperature at which common copper alloys are extruded, good machinability and strength can be obtained.

Further, by adjusting the cooling rate after hot extrusion, that is, by performing cooling in a temperature range from 530° C. to 450° C. in the process of cooling after hot extrusion at an average cooling rate of 50° C./min or lower and preferably 45° C./min or lower, a material having better machinability can be obtained. By limiting the average cooling rate to 50° C./min or lower, the presence of P-containing compounds can be observed with a metallographic microscope at a magnification of 500-fold. On the other hand, if the cooling rate is excessively slow, P-containing compounds are likely to grow bigger, and the effect on machinability may decrease. Therefore, the average cooling rate is preferably 0.1° C./min or higher and more preferably 0.3° C./min or higher.

From a perspective of practicability of measurement position, hot working temperature is defined as a temperature of a hot worked material at which measurement can be performed about three or four seconds after hot extrusion, hot forging, or hot rolling is completed. The metallographic structure is affected by the temperature immediately after working where large plastic deformation occurs. The average cooling rate after hot working in question is about 50° C./min. Therefore, a temperature decrease during the 3 to 4 seconds after hot working is calculated to be about 3° C., and thus there is little influence.

As a material for hot forging, a hot extruded material is mainly used, but a continuously cast bar is also used. Compared with hot extrusion, in hot forging, the working rate is higher, and a more complex shape is formed. In some cases, high deformation can be performed up to a thickness of about 3 mm, and thus the forging temperature is higher than the hot extrusion temperature. In a preferred embodiment, the temperature of a hot forged material on which plastic working is performed to form a main portion of a forged product, that is, the material's temperature about three or four seconds immediately after forging (after completion of forging) is preferably higher than 540° C. and lower than 675° C. In a brass alloy including 2 mass % Pb that is widely used as a brass alloy for forging (59Cu-2Pb-balance Zn), the lower limit of the hot forging temperature is 650° C. Hot forging temperature of the embodiment is more preferably lower than 650° C. Hot forging relates to the composition relational expression f1, and when the composition relational expression f1 is 58.0 or lower, the hot forging temperature is preferably lower than 650° C. Although depending on the working ratio in hot forging, the lower the temperature, the smaller the size of α phase crystal grains, the more likely the shape of α phase crystal grains change from an acicular shape into a granular shape, the higher the strength, the more the balance between strength and ductility improves, and the more the machinability improves.

By adjusting the cooling rate after hot forging, a material having various characteristics of machinability can be obtained. That is, cooling is performed after hot forging with the average cooling rate in a temperature range from 530° C. to 450° C. set at 50° C./min or lower and preferably 45° C./min or lower. By controlling the cooling rate such that compounds including mainly P and Si having a particle size of about 0.5 to 3 μm and Zn precipitate in β phase or at a boundary between β phase and α phase where phase change occurs, the machinability of the alloy can be further improved. Incidentally, when the cooling rate is excessively slow, the compounds enlarge in the process of cooling. Therefore, the lower limit of the above-mentioned average cooling rate is 0.1° C./min or higher and preferably 0.3° C./min or higher.

In hot rolling, an ingot is heated and rolled 5 to 15 times repeatedly. The material's temperature upon completion of the final hot rolling (the material's temperature three or four seconds after completion of the process) is preferably higher than 540° C. and lower than 650° C., and more preferably lower than 625° C. After completion of hot rolling, the rolled material is cooled. In this cooling, as in hot extrusion, the average cooling rate in a temperature range from 530° C. to 450° C. is preferably 0.1° C./min or higher and 50° C./min or lower. The above-mentioned average cooling rate is more preferably 0.3° C./min or higher or 45° C./min or lower.

(Heat Treatment)

A main heat treatment of the copper alloy is also called annealing. Heat treatment is performed as necessary. For example, when making a small product which cannot be produced by hot extrusion, heat treatment is performed after cold-drawing or cold wire-drawing for the purpose of recrystallization, that is, to soften the material. Likewise, rolled material is cold-rolled and heat-treated. In the embodiment, a heat treatment is also performed in order to control the amounts of γ phase and β phase.

When a heat treatment to induce recrystallization is required, the material is heated to a temperature of 400° C. or higher and 600° C. or lower for 0.1 to 8 hours. When P-containing compounds are not formed in the previous step, they are formed during heat treatment. When heat treatment is performed at a temperature of higher than 530° C., P-containing compounds are solid-solubilized again and disappear. When the heat treatment temperature is higher than 530° C., it is necessary to perform the cooling with the average cooling rate in a temperature range from 530° C. to 450° C. in the process of cooling set to be 50° C./min or lower and preferably 45° C./min or lower such that P-containing compounds are formed. The lower limit of the average cooling rate is preferably 0.1° C./min or higher.
(Cold Working Step)

In the case of a hot extruded bar, cold working may be performed on a hot extruded material in order to obtain a high strength, to improve the dimensional accuracy, or to straighten (reduce the degree of bending of) an extruded bar or a coiled material. For example, cold-drawing at a working ratio of about 2% to about 30% is performed on a hot extruded material, and optionally straightness correction and low-temperature annealing are performed after cold-drawing.

If the material is a slender bar, a wire, or a rolled material, cold working and a heat treatment are repeatedly performed. After the heat treatment, cold working, straightness correction, and/or low-temperature annealing are performed such that the final working ratio becomes 0% to about 30%.

An advantage of cold working is that the strength of the alloy can be increased by the process. By performing a combination of cold working and heat treatment on a hot worked material, no matter which step is performed first, high strength, ductility, and impact resistance can be well-balanced, and properties demanded by the respective applications in which strength, ductility, and/or toughness are considered important can be obtained. The influence of cold working on machinability is limited.
(Low-Temperature Annealing)

In the case of bars, wires, forged products, and rolled materials, for the main purposes of removal of residual stress, correction of a bar (straightness of a bar), and adjustment and improvement of the metallographic structure, low-temperature annealing is sometimes performed at a temperature equal to or lower than the recrystallization temperature in the final step. In the case of the embodiment, in order to distinguish low-temperature annealing from the above-described heat treatment, low-temperature annealing is defined to be a process which induces recrystallization where the recrystallized portion in the metallographic structure is lower than 50%. Low-temperature annealing is performed with a holding temperature of 250° C. or higher and 430° C. or lower and a holding time of 10 minutes to 200 minutes. The lower limits of temperature and time are those where residual stress can be sufficiently removed. In addition, bars with excellent straightness can be obtained by arranging bars in a mold whose cross-section has a recess and the bottom surface is smooth and flat, for example, a steel mold having a width of about 500 mm, a height of about 300 mm, a thickness of about 10 mm, and a length of about 4000 mm (the depth of the recess refers to (height)–(thickness)), and holding the bars at a temperature of 250° C. or higher and 430° C. or lower for 10 minutes to 200 minutes. When the temperature is represented by T° C. and the time is represented by t min, it is preferable that 300≤annealing conditional expression $f8=(T-200)\times(t)^{1/2}$≤2000. When annealing conditional expression f8 is lower than 300, the removal of residual stress or straightness correction is insufficient. When the annealing conditional expression f8 is higher than 2000, the strength of the material decreases due to recrystallization. The annealing conditional expression f8 is preferably 400 or higher and 1600 or lower. Irrespective of the cooling rate in the previous step, when the annealing conditional expression f8 is 400 or higher, compounds including fine P are formed during low-temperature annealing. In addition, although depending on the alloy's composition, when a material is held at a temperature of 250° C. or higher and 430° C. or lower for 10 minutes to 200 minutes, fine γ phase can be precipitated in β phase and at a phase boundary between β phase and α phase, making the chips generated by drilling become fine. However, machinability may deteriorate since the amount of β phase decreases as the amount of γ phase increases. In addition, when the amount of γ phase is excessively large, the improvement of machinability is saturated, which causes ductility to deteriorate. Therefore, it is necessary to pay attention to the metallographic structure relational expressions f2 to f6.

Using the above-mentioned production method, the high-strength free-cutting copper alloy according to the first and second embodiments of the present invention are produced.

The hot working step, the heat treatment (also referred to as "annealing") step, and the low-temperature annealing step are steps of heating the copper alloy. Basic production steps are melt and casting, hot working (extrusion, forging, rolling), cold working (wire-drawing, drawing, rolling), straightness correction, and low-temperature annealing, but straightness correction, cold working, or low-temperature annealing may not be included. Straightness correction is typically performed in a cold state, and thus is also be referred to as "cold working". The steps for slender bars having a diameter of φ5 to 7 mm, wires, and plates having a thickness of 8 mm or less may include a heat treatment. Heat treatment is mainly performed after cold working, and heat treatment and cold working are repeated according to the final dimensions. The smaller the diameter of the final product is and the thinner the final product is, the more cold workability matters, becoming as important as or more important than machinability. The heat treatment may be performed before cold working after hot working.

A low-temperature annealing step is performed after the final step among a hot working step, a cold working step, a straightness correction step, and an annealing step. When a low-temperature annealing step is performed, an annealing step is typically performed between the working steps. It can be said that a low-temperature annealing step is performed after the final working step among a hot working step, a cold working step, and a straightness correction step.

Specifically, the following are examples of combinations of production steps. Hot rolling may be performed instead of hot extrusion.

(1) Hot extrusion and low-temperature annealing (2) Hot extrusion, cold working (drawing, wire-drawing, rolling), and low-temperature annealing (3) Hot extrusion, cold working (drawing, wire-drawing, rolling), straightness correction, and low-temperature annealing (4) Hot extrusion, repetition of cold working (wire-drawing, rolling) and annealing, cold working, and low-temperature annealing (5) Hot extrusion, repetition of cold working (cold wire-drawing, rolling) and annealing, cold working, straightness correction, and low-temperature annealing (6) Hot extrusion, annealing, cold working (drawing, wire-drawing, rolling), and low-temperature annealing (7) Hot extrusion, annealing, cold working (drawing, wire-drawing, rolling), straightness correction, and low-temperature annealing (8) Hot extrusion, annealing, repetition of cold working (drawing, wire-drawing, rolling) and annealing, cold working, and low-temperature annealing (9) Hot extrusion, annealing, repetition of cold working (drawing, wire-drawing, rolling) and annealing, cold working, straightness correction, and low-temperature annealing

(10) Hot extrusion, cold-drawing, straightness correction (straightness correction may not be performed), hot forging, and low-temperature annealing

(11) Hot extrusion, straightness correction, hot forging, and low-temperature annealing

(12) Hot extrusion, hot forging, and low-temperature annealing

(13) Casting, hot forging, and low-temperature annealing

(14) Casting, straightness correction, hot forging, and low-temperature annealing In the free-cutting alloy according to the first or second embodiment of the present invention having the above-described constitution, since the alloy's composition, the composition relational expressions, the metallographic structure, the metallographic structure relational expressions, and the metallographic structure and composition relational expression are defined as described above, even though the Pb content is low, excellent machinability can be obtained, and excellent hot workability, high strength, and a good balance between strength and ductility can be obtained.

Hereinabove, the embodiments of the present invention have been described. However, the present invention is not limited to the embodiments, and appropriate modifications can be made within a range not departing from the technical requirements of the present invention.

EXAMPLES

Hereinafter, the results of the experiments that were performed to verify the effects of the embodiments will be described. The following Examples are for the purpose of explaining the effects of the embodiments. The constituent elements, the processes, and the conditions described in the Examples do not limit the technical ranges of the embodiments.

Using a low-frequency melting furnace and a semi-continuous casting machine used on the actual production line, a trial production of copper alloys was performed.

In addition, using a laboratory facility, a trial production of copper alloys was performed.

Tables 9 to 12 show the alloys' compositions. In addition, Tables 13 to 19 show production steps. Regarding composition, "MM" refers to mischmetal which represents the total content of rare earth elements. The respective production steps are as follows.

(Steps Nos. A0 to A6, A10, AH1, and AH2)

As shown in Table 13, using the low-frequency melting furnace and the semi-continuous casting machine on the actual production line, a billet having a diameter of 240 mm was produced. For raw materials, those correspond to ones used for commercial production were used. The billet was cut into a length of 800 mm and was heated. Using a hot extruder having an officially announced capacity of 3000 tons, two round bars having a diameter of 25.6 mm were extruded. The extruded bars were cooled at several different cooling rates in a temperature range from 530° C. to 450° C. The temperature was measured using a radiation thermometer mainly in a period from the middle stage to the final stage of the hot extrusion process about three or four seconds after the bars came out of the extruder. For the temperature measurement during hot extrusion, hot forging, and hot rolling described below, IGA 8Pro/MB20, a radiation thermometer manufactured by Luma Sense Technologies Inc., was used.

It was verified that the average temperature of the extruded material was within ±5° C. of a temperature shown in Table 13 (in a range of (temperature shown in the table)−5° C. to (temperature shown in the table)+5° C.)

In Steps Nos. A0, A1, A2, A4, and AH2, the extrusion temperature was 590° C. In Step No. A3, the extrusion temperature was 635° C. In Step No. AH1, the extrusion temperature was 680° C. The average cooling rate in a temperature range from 530° C. to 450° C. after hot extrusion was 45° C./min in Step No. A2 and was 65° C./min in Step No. AH2. In steps other than Steps Nos. A2 and AH2, the average cooling rate was 25° C./min.

After completion of the hot extrusion, in Step No. A0, straightness correction was performed in a cold state. During the straightness correction, the cold working ratio was 0% in effect. In Step No. A4, the drawing ratio was 8.4%. In steps other than Steps Nos. A0 and A4, the extruded material having a diameter of 25.6 mm was cold-drawn to a diameter of 25.0 mm (working ratio: 4.7%). Further, in Steps Nos. A5 and A6, the material of Step No. A1 was used. In a laboratory, the materials were put into a mold to perform a low-temperature annealing at 275° C. for 100 minutes and at 410° C. for 50 minutes, respectively. In Step No. A10, the material was hot-extruded to a diameter of 45 mm at 575° C. and was cooled at an average cooling rate of 20° C./min in a temperature range from 530° C. to 450° C. Step No. A10 was also used for a forging experiment.

Here, regarding the material on which low-temperature annealing was performed, the annealing conditional expression f8 shown below was calculated.

$$f8 = (T - 200) \times (t)^{1/2}$$

T: temperature (material's temperature) (° C.)
t: heating time (min)

In addition, low-temperature annealing was performed on bars arranged (stacked in four tiers) in a steel mold having a recessed cross-section, a width of about 500 mm, a height of 300 mm, a thickness of 10 mm, and a length of 4000 mm. Next, low-temperature annealing was performed, and the bend of the bars was measured.

All the measurement results of bending was good standing at 0.1 mm or less for one meter of the sample bars obtained by performing Steps Nos. A5 and A6 and Step No. B6 described below on Alloys Nos. S01 and S02.

(Steps Nos. B1 to B7, BH1, and BH2)

As shown in Table 14, using a facility on the actual production line, in Steps Nos. B1 to B7, BH1, and BH2, test materials were hot-extruded to a diameter of 20.0 mm, and were cold-drawn to a diameter of 19.03 mm in steps other than Steps Nos. B5 and B7. In Step No. B5, the material was cold-drawn to a diameter of 18.5 mm. In Steps Nos. B1, B2, B5, B6, and B7, the extrusion temperature was 610° C. Hot extrusion was performed at 580° C. in Steps Nos. B3 and BH2, at 640° C. in Step No. B4, and at 680° C. in Step No. BH1. The average cooling rate in a temperature range from 530° C. to 450° C. after hot extrusion was 55° C./min in Step No. BH2 and was 0.2° C./min in Step No. B2. In the other steps, cooling was performed at an average cooling rate of 38° C./min. In Step No. B6, the material of Step No. B1 was used and was put into a mold and low-temperature annealing was performed at 310° C. for 100 minutes. Step No. E followed Step No. B7.

(Steps Nos. C1 to C3, C10, CH1, and CH2)

As shown in Table 15, in a laboratory, raw materials mixed at a predetermined component ratio were melted. The molten alloy was cast into a mold having a diameter of 100 mm and a length of 180 mm to prepare a billet (Alloys Nos. S51 to S65 and S70 to S84). A molten alloy was obtained from a melting furnace on the actual production line, and impurities such as Fe or Sn were further intentionally added to the molten alloy. This molten alloy was poured into a mold having a diameter of 100 mm and a length of 180 mm to cast a billet (Alloys Nos. S11 to S17 and Nos. S21 to S26). The concentration of the impurities such as Fe or Sn that were intentionally added was lower than or equal to that of commercially available brass including Pb.

This billet was heated and extruded into a round bar having a diameter of 22 mm. In Steps Nos. C1, C3, and CH2, the extrusion temperature was 595° C. In Step No. C2, the extrusion temperature was 635° C. In Step No. CH1, the extrusion temperature was 675° C. The average cooling rate in a temperature range from 530° C. to 450° C. after hot extrusion was 72° C./min in Step No. CH2 and was 30° C./min in Steps Nos. C1, C2, C3, and CH1. Next, straightness correction was performed (working ratio: 0%) on the bars whose straightness was poor, but not on those having good straightness. In Step No. C3, the bar of Step No. C1 was used, and low-temperature annealing was performed at 320° C. for 60 minutes.

In Step No. C10, a forging material was prepared by extruding a bar to a diameter of 45 mm at an extrusion temperature of 575° C. and cooling the bar at an average cooling rate of 20° C./min.

The above-described alloys A to F were prepared using the method of Step C. The extrusion temperature for the alloys A and D was 750° C., the extrusion temperature for the other alloys, Alloys B, C, E, and F, was 635° C., and the average cooling rate in a temperature range from 530° C. to 450° C. after the extrusion was 30° C./min. Alloys A to F were all heat-treated at 500° C. for 2 hours after the extrusion to adjust the metallographic structure. As a comparative material, C3771, a brass for forging including 2 mass % Pb was used, and as Alloy H, a commercially available material was used.

(Step D)

In Step No. D, a molten alloy was obtained from a laboratory and another from a melting furnace on the actual production line. They were cast into a metal mold having an inner diameter of 45 mm. The molten alloys were cooled at an average cooling rate of 40° C./min in a temperature range from 530° C. to 450° C. in the process of cooling, and materials for forging of Step F was obtained.

(Step E)

As shown in Table 17, Step No. E is a step including annealing. Step No. E is a step of preparing mainly slender bars having a diameter of, for instance, 7 mm or less. However, as the machining test was unable to be performed on a slender bar, an extruded bar having a large diameter was used for the testing instead.

In Step No. E1, a material having a diameter of 20 mm obtained in Step No. B7 was cold-drawn to a diameter of 16.7 mm, was heat-treated at 480° C. for 60 minutes, and was cold-drawn to a diameter of 16 mm.

In Step No. E2, a material having a diameter of 22 mm obtained in Step No. C1 was cold-drawn to a diameter of 18.4 mm, heat-treated at 450° C. for 90 minutes, and cold-drawn to a diameter of 17.7 mm.

(Steps Nos. F1 to F5, FH1, and FH2) As shown in Table 18, a round bar having a diameter of 45 mm obtained in Steps Nos. A10, C10, and D1 were cut to a length of 180 mm. The round bar was horizontally placed and was forged to a thickness of 16 mm using a press machine having a hot forging press capacity of 150 ton. About three to four seconds immediately after the material was hot-forged to a predetermined thickness, the temperature was measured using a radiation thermometer and a contact thermometer. It was verified that the hot forging temperature (hot working temperature) was within ±5° C. of a temperature shown in Table 18 (within a range from (temperature shown in the table)−5° C. to (temperature shown in the table+5° C.).

In Steps Nos. F1, F2, F3, F5, FH1, and FH2, the hot forging temperatures were 660° C., 640° C., 615° C., 620° C., 685° C., and 615° C., respectively. The average cooling rate in a temperature range from 530 to 450° C. was set to 63° C./min in Step No. FH2. In the other steps, cooling was performed at an average cooling rate of 28° C./min. In Step F, a forged product which was left as hot-forged without performing straightness correction (cold working) was obtained. In Step No. F4, low-temperature annealing was performed on the forged product obtained in Step No. F3 at 290° C. for 100 minutes.

The hot forged material was cut and provided for machining tests and experiments for investigating mechanical characteristics.

(Step R)

In Step No. R1, a part of the molten alloy from a melting furnace on the actual production line was poured into a casting mold having a cross-section of 35 mm×70 mm. The surface of the casting was machined to dimensions of 32 mm×65 mm×200 mm, and the casting was heated to 650° C., then two passes of hot-rolling was performed on the casting to a thickness of 15 mm. About three or four seconds after completion of the final hot rolling, the material's temperature was 560, and the material was cooled at an average cooling rate of 20° C./min in a temperature range from 530° C. to 450° C. The obtained rolled sheet was cold-rolled to a thickness of 10 mm, was heat-treated at 480° C. or 60 minutes using an electric furnace, and cold rolling was further performed to a thickness of 9 mm.

The above-described test materials were evaluated for the following items. The evaluation results are shown in Tables 20 to 32.

(Observation of Metallographic Structure)

The metallographic structure was observed using the following method, then the area ratios (%) of the respective phases such as α phase, β phase, γ phase, κ phase, and μ phase were measured by image analysis. It was assumed that α' phase, β' phase, and γ' phase were included in α phase, β phase, and γ phase respectively.

Each of the test materials (bars and forged products) was cut parallel to its long side or parallel to a flowing direction of the metallographic structure. Next, the surface was polished (mirror-polished) and was etched with a mixed solution of hydrogen peroxide and ammonia water. For etching, an aqueous solution obtained by mixing 3 ml of 3 vol % hydrogen peroxide water and 22 ml of 14 vol % ammonia water was used. At a room temperature of about 15° C. to about 25° C., the polished metal surface was dipped in the aqueous solution for about 2 seconds to about 5 seconds.

The metallographic structure was observed with a metallographic microscope at a magnification of 500-fold to obtain the proportions of the respective phases and check whether or not any P-containing compounds were present. Depending on the state of the metallographic structure, the phases and the compounds were checked at a magnification of 1000×. In micrographs of five visual fields, respective phases (α phase, β phase, γ phase, κ phase, and μ phase) were manually painted using image processing software "Photoshop CC". Next, the micrographs were binarized using image analysis software "WinROOF 2013" to obtain the area ratios of the respective phases. Specifically, the average area ratio of each of the phases in the five visual fields was calculated to obtain the proportion of each phase. In this area ratio calculation, the aggregate of the area ratio of each and every constituent phase excluding precipitates (P-containing compounds are excluded), oxides, sulfides, and crystallized particles constitutes 100%.

Then P-containing compounds were observed. The minimum size of a precipitated particle of a P-containing compound that can be observed at 500-fold with a metallographic microscope is about 0.5 μm. We first determined whether or not any P-containing compounds were present by the precipitates that were able be observed with a 500-fold metallographic microscope, in the same manner as when the proportion of the phases were observed. When P-containing compounds were confirmed under this observation condition, the presence of P-containing compounds was evaluated as "○" (good). Although depending on the P content and the production conditions, there was a sample in which several to several hundreds P-containing compounds were present in one visual field of the microscope. As most of the P-containing compounds were present in β phase or at a phase boundary between α phase and β phase, they were assumed to be included in β phase. In addition, when P-containing compounds were present in α phase although it was rare, such P-containing compounds were assumed to be included in α phase. Further, γ phase having a size of less than 0.5 μm was sometimes present in β phase. Phases having a size of less than 0.5 μm are unable to be identified with a metallographic microscope at a magnification of 500-fold. Therefore, in the embodiment, ultrafine γ phase was treated as β phase. When observed with a metallographic microscope, a P-containing compound appears blackish grey. Therefore, it is distinguishable from a precipitate or a compound formed of Mn or Fe which appears light blue.

It is necessary to determine whether an α phase grain is acicular. Accordingly, the shape of α phase was evaluated as follows.

If an α phase crystal grain has the longer side/shorter side ratio exceeding 4, the α phase crystal grain was defined to be acicular (elliptical). If the longer side/shorter side ratio was 4 or lower, the α phase crystal grain was defined to be granular. During the observation of the metallographic structure, the proportion of the number of granular α phase crystal grains to the entirety of α phase was investigated. When the proportion of granular α phase crystal grains was lower than 50%, it was evaluated as "X" (poor). When the proportion of granular α phase crystal grains was 50% or higher and lower than 75%, it was evaluated as "Δ" (fair). When the proportion of granular α phase crystal grains was 75% or higher, it was evaluated as "○" (good). The shape of α phase crystal grains affects mechanical characteristics and machinability, and the more the number of granular α phase crystal grains, the better the mechanical characteristics and machinability.

Specifically, the area ratio of each of the phases and whether the compounds were present were evaluated using an image that was printed out in a size of about 70 mm×about 90 mm.

When it was difficult to identify phases and precipitates, they were identified by an electron backscattering diffraction pattern (FE-SEM-EBSP) method in which an EDS equipped in an field emission scanning electron microscope (FE-SEM) (JSM-7000F, manufactured by JEOL Ltd.) was used, and phases and precipitates were observed at a magnification of 500-fold or 2000-fold under the conditions of an acceleration voltage of 15 kV and a current value of 15 (set value).

In addition, regarding some alloys, when the Si concentration in β phase was measured and when it was difficult to determine the presence of P-containing compound, mainly, quantitative analysis or qualitative analysis was performed with an X-ray microanalyzer on a secondary electron image and a compositional image taken at a magnification of 2000-fold. The measurement was performed using "JXA-8230" (manufactured by JEOL Ltd.) under the conditions of an acceleration voltage of 20 kV and a current value of $3.0 \times 10^{-8}$ A. In the investigation using the electron microscope, when P-containing compounds were observed, the alloy was evaluated as "Δ" (fair) in terms of presence of P-containing compound. When no P-containing compound was observed, the alloy was evaluated as "X" (poor) in terms of presence of P-containing compound. Those evaluated as "Δ" (fair) regarding presence of P-containing compound are also acceptable in the embodiment. In the table, the evaluation results regarding the presence of P-containing compounds are shown in the "P Compound" row.

(Electrical Conductivity)

For the measurement of electrical conductivity, a electrical conductivity measurement device (SIGMATEST D2.068, manufactured by Foerster Japan Ltd.) was used. In this specification, the terms "electric conductivity" and "electrical conductivity" are meant to have the same meaning. In addition, thermal conductivity and electrical conductivity have a strong relation. Therefore, the higher the electrical conductivity, the better the thermal conductivity.

(Tensile Strength/Elongation)

Each of the test materials was processed in accordance with specimen No. 10 of JIS Z 2241, and their tensile strength and elongation were measured.

If a hot extruded material or a hot forged material not having undergone any cold working step has a tensile strength of preferably 470 N/mm² or higher, more preferably 500 N/mm² or higher, and still more preferably 530 N/mm² or higher, the material is considered to have the highest level of tensile strength among free-cutting copper alloys. As a result, a reduction in the thickness and weight of parts and components used in various fields or an increase in allowable stress can be realized. In addition, regarding the balance between strength and elongation, when the tensile strength is represented by S (N/mm²) and the elongation is represented by E (%), if the value of the characteristic relational expression f7=S×(100+E)/100 indicating the balance between strength and ductility is preferably 600 or higher, more preferably 640 or higher, still more preferably 670 or higher, and still more preferably 700 or higher, it can be said that the alloy has a very high standard of balance between strength and elongation among free-cutting copper alloys.

<Machinability Test Using Lathe>

Machinability was evaluated by the machining test using a lathe as described below.

A hot extruded bar or a hot forged product was machined to prepare a test material having a diameter of 14 mm. A carbide tool (chip) K10 not equipped with a chip breaker was attached to a lathe. Using this lathe, the circumference of the test material having a diameter of 14 mm was machined on a dry condition and under the conditions of rake angle: 0°, nose radius: 0.4 mm, clearance angle: 6°, cutting speed: 40 m/min, cutting depth: 1.0 mm, and feed rate: 0.11 mm/rev.

A signal emitted from a dynamometer (AST tool dynamometer AST-TL1003, manufactured by Mihodenki Co., Ltd.) composed of three portions attached to the tool was electrically converted into a voltage signal and recorded on a recorder. Next, these signals were converted into cutting resistance (principal cutting force, feed force, thrust force, N). In the machining test, in order to suppress the influence of wear on the insert, each sample was measured four times by reciprocating A→B→C→ . . . C→B→A twice. The cutting resistance can be obtained from the following expression.

Cutting Resistance (Combined Force comprising Principal cutting force, Feed Force, and Thrust Force)=((Principal Cutting Force)$^2$+(Feed Force)$^2$+(Thrust Force)$^2$)$^{1/2}$ Each sample was measured four times, and the average value thereof was adopted. Assuming that the cutting resistance of a commercially available free-cutting brass bar, C3604, made of an alloy including 59 mass % Cu, 3 mass % Pb, 0.2 mass % Fe, 0.3 mass % Sn, and Zn as the balance was 100, a relative value of the cutting resistance (machinability index) of each sample was calculated for relative evaluation. The higher the machinability index, the better the machinability. Incidentally, "three force components" refers to the combined force comprising principal cutting force, feed force, and thrust force, which represents the machinability index.

The machinability index was calculated as follows.

Index representing the results of the machining test performed on a sample (machinability index)= (cutting resistance of C3604/cutting resistance of the sample)×100

Concurrently, chips were collected, and the machinability was evaluated based on the chip shape. Problems that occur in actual machining are entanglement of chips around the tool and bulking of chips. Therefore, regarding the chip shape, when the average length of the generated chips was less than 5 mm, it was evaluated as "◯" (good). When the average length of the generated chips was 5 mm or more and less than 15 mm, it was evaluated as "Δ" (fair) determining that machining could be performed although there could be some practical problems. When the average length of the generated chips was 15 mm or longer, it was evaluated as "X" (poor). Chips generated at the beginning of machining were excluded from the subject of the evaluation.

The cutting resistance depends on the shear strength and the tensile strength of the material, and there is a tendency that the higher the strength of the material, the higher the cutting resistance. In the case of a high strength material, if the cutting resistance is approximately 40% higher than that of a free-cutting brass bar including 1% to 4 mass % Pb, the cutting resistance is considered to be practically good. In the embodiment, the shear strength of the extruded material is about 1.2 to 1.3 times that of C3604, a free-cutting brass including 3 mass % Pb. Therefore, in the evaluation of the machinability of the embodiment, a machinability index of about 70 was applied as the standard machinability index (boundary value). Specifically, when the machinability index was 80 or higher, the machinability was evaluated to be excellent (evaluation symbol: "⓪"). When the machinability index was 70 or higher and lower than 80, the machinability was evaluated to be good (evaluation symbol: "◯"). When the machinability index was 63 or higher and lower than 70, the machinability was evaluated to be fair (evaluation symbol: "Δ"). When the machinability index was lower than 63, the machinability was evaluated to be poor (evaluation symbol: "X").

If the alloy's strength is equivalent, there is a correlation between chip shape and machinability index. When the machinability index is high, chip breakability tends to be good, and this correlation can be numerically expressed.

When cold workability is important, it is necessary that the evaluation results regarding chip and cutting resistance are at least "fair".

Incidentally, the machinability index of an alloy comprising 58.1 mass % Cu, 0.01 mass % Pb, and Zn as the balance, which is a free-cutting copper alloy having a high Zn concentration and including 0.01 mass % Pb and about 50% β phase, was 39, and the chip length was longer than 15 mm. Likewise, the machinability index of an alloy comprising 55 mass % Cu, 0.01 mass % Pb, and Zn as the balance, which is a β single-phase copper alloy not including Si and including 0.01 mass % Pb, was 41, and the chip length was longer than 15 mm.

Figure 2A:
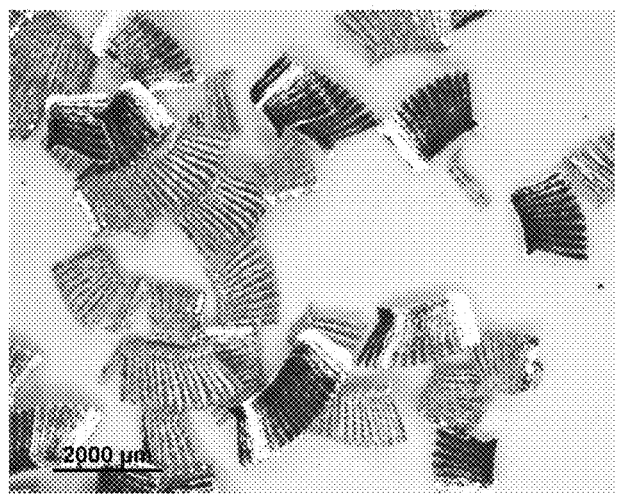
FIG. 2A is a picture of chips after performing a machining test of Test No. T01 among the Examples.
Figure 2B:
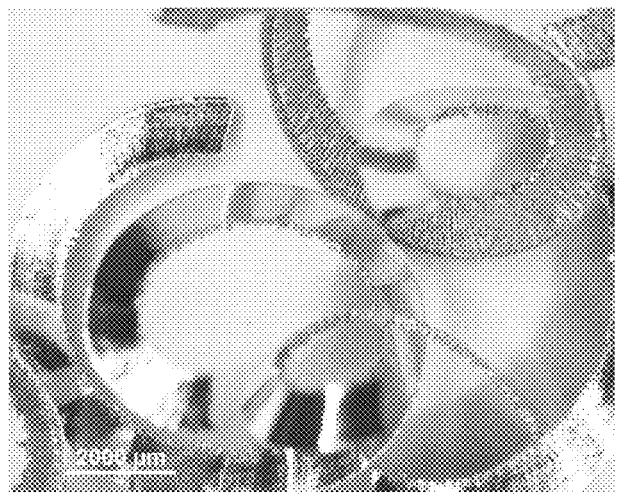
FIG. 2B is a picture of chips after performing a machining test of Test No. T303 among the Examples.

In Test No. T01 (Alloy No. S01), 0.072 mass % P was included, hot extrusion was performed at 590° C., and P-containing compounds were present. The external appearance of the chips generated in Test No. T01 (Alloy No. S01) is shown in FIG. 2A. In addition, in Test No. T303 (Alloy No. S71), the P content was 0.003 mass % or lower, hot extrusion was performed at 595° C., and the presence of P-containing compounds was unable to be confirmed with a metallographic microscope or an electron microscope. The external appearance of the chips generated in Test No. T303 (Alloy No. S71) is shown in FIG. 2B.

The average length of the chips generated in Test No. T01 (Alloy No. S01) including P and in which P-containing compounds were observed, was 1.2 mm, and the chips were finely broken. On the other hand, in Test No. T303 (Alloy No. S71) in which the P content was 0.003 mass % or lower and no P-containing compound was observed, the chip length was more than 15 mm, and the chips were continuous.

<Drilling Test>

By using a drilling machine with a JIS standard drill made of high speed steel having a diameter of 3.5 mm attached, 10 mm-deep holes were drilled on a dry condition at a rotation speed of 1250 rpm and a feed rate of 0.17 mm/rev. Voltage fluctuation in a circumferential direction and an axial direction were measured during drilling using an AST tool dynamometer, and the torque and the thrust during drilling were calculated. Each sample was measured four times, and the average value thereof was adopted. Assuming that the torque and the thrust of C3604, a commercially available free-cutting brass bar comprising 59 mass % Cu, 3 mass % Pb, 0.2 mass % Fe, 0.3 mass % Sn, and Zn as the balance, was 100, relative values (torque index, thrust index) of the torque and the thrust of the sample were calculated for relative evaluation. The higher the machinability index (torque index, thrust index, drill index), the better the machinability. In the drilling, in order to suppress the influence of wear on the drill, each sample was measured four times by reciprocating A→B→C→ . . . C→B→A twice.

That is, the machinability index was obtained as follows.

Index representing Drilling Test Result of Sample (Drill Index)=(Torque Index+Thrust Index)/2

Torque Index of Sample=(Torque of C3604/Torque of Sample)×100

Thrust Index of Sample=(Thrust of C3604/Thrust of Sample)×100

During the third test, chips were collected. Machinability was evaluated based on the chip shape. Problems that occur in actual machining are entanglement of chips around a tool and bulking of chips. Therefore, regarding chip shape, if the average number of windings per chip was less than one, it was evaluated as "○" (good). if the average number of windings per chip was one or more and less than three, it was evaluated as "Δ" (fair) determining that drilling could be performed although there could be some practical problems. If the average number of windings per chip was three or more, it was evaluated as "X" (poor). Chips generated at the beginning of drilling were excluded from the subject of the evaluation.

If the torque and the thrust of a high-strength material are higher than the cutting resistance of a free-cutting brass bar including 1% to 4 mass % of Pb by about 40% points, the material is considered to be practically good regarding torque and thrust. In the embodiment, the machinability was evaluated by machinability index with the machinability index of about 70% regarded as the boundary (boundary value). Specifically, when the drill index was 75 or higher, the machinability was evaluated to be excellent (evaluation symbol: "@"). When the drill index was 70 or higher and lower than 75, the machinability was evaluated to be good (evaluation symbol: "○"). When the drill index was 65 or higher and lower than 70, the machinability was evaluated to be fair (evaluation symbol: "Δ") determining that drilling could be performed although there could be some practical problems. When the drill index was lower than 65, the machinability was evaluated to be poor (evaluation symbol: "X").

The chip shape and the torque index have a strong relationship if the alloy's strength is the same. When the torque index is high, chip breakability tends to be high. Therefore, chip shape can be numerically compared by torque index. In the alloy according to the embodiment, the shear strength, which is more or less proportional to the tensile strength, is about 1.2 to 1.3 times that of a free-cutting brass including 3 mass % Pb. Since cutting resistance has a strong relationship with shear strength, it is necessary to take the material's strength into consideration.

When cold workability, which improves when machinability deteriorates, and vice versa, is important, it is necessary that the evaluation results regarding chip and cutting resistance are at least "fair" (Δ).

Incidentally, the drill index of an alloy comprising 58.1 mass % Cu, 0.01 mass % Pb, and Zn as the balance, which is a free-cutting copper alloy having a high Zn concentration and including 0.01 mass % Pb and about 50% β phase, was 49 (the torque index was 46, and the thrust index was 52), and the number of windings per chip exceeded 3. Likewise, the drill index of a β single-phase copper alloy comprising 54 mass % Cu, 0.01 mass % Pb, and Zn as the balance, which is an alloy not including Si and including 0.01 mass % Pb, was 61 (the torque index was 53, and the thrust index was 68), and the number of windings per chip exceeded 3.

Regarding tools dedicated to precision drilling, with the recent accelerated trend toward reduction in the size of various devices and components, drilling of tiny holes on such components is increasingly required. For example, there are a wide range of needs for tools such as those for drilling pin holes in a metal mold or spinning holes, a component of a device relating to a semiconductor such as a printed circuit board or an optical device. A reduction in the size of various industrial products such as home information appliances, medical devices, and automobile components is expected to be increasingly accelerated. In this trend, drill manufacturers are attempting to improve the lineup of carbide drills having a diameter of 0.1 mm or less. In the past, the ratio between the diameter and the depth of a hole to be drilled was limited to about 10. However, recently, a number of drills that are capable of drilling a hole whose ratio between its diameter and depth is approximately 100 even if the diameter of the hole is 0.5 mm or less have emerged. e a material having excellent machinability is required in this field.

(Hot Working Test)

The bar made in Step No. A0 having a diameter of 25.6 mm or the bar made in Step No. C1 having a diameter of 22.0 mm was machined to a diameter of 15 mm and a length of 25 mm. The test material was held at 600° C. for 20 minutes. Subsequently, the test material was vertically placed and compressed to a thickness of 5 mm using an Amsler testing machine having a hot compression capacity of 10 tons equipped with an electric furnace at a strain rate of 0.02/sec and a working ratio of 80%. During the hot working, the test material was held at 600° C.

Hot deformability was evaluated based on whether or not any visible cracks were present and whether or not a large corrugation was formed on the surface. e Although depending on the capability of the facility used or the hot working ratio such as an extrusion ratio, 30 N/mm$^2$ is a boundary value of hot deformation resistance up to which commonly manufactured hot extruded bars can be produced without any problem. In a hot working test performed at 600° C., when cracking did not occur, a large corrugation was not formed, and hot deformation resistance was 30 N/mm$^2$ or lower, hot workability was evaluated as good (evaluation symbol: "○"). When either hot deformability or hot deformation resistance did not satisfy the above-described standards, hot workability was evaluated as fair (evaluation symbol: "Δ") with some reservations. When neither hot deformability nor hot deformation resistance satisfied the above-described standards, hot workability was evaluated as poor (evaluation symbol: "X"). The evaluation results are shown in Table 32.

Hot extrusion or hot forging at 600° C. is rarely performed on a common copper alloy. When a free-cutting copper alloy including Pb is tested at 600° C., cracking occurs, and hot deformation resistance exceeds 30 N/mm$^2$. By performing hot working at a low temperature, high strength, superb balance between high strength and elongation, and excellent machinability can be obtained, and improvement of dimensional accuracy and an increase in tool life can be realized, which is, in turn, eco-friendly.

In Alloy H, a leaded brass for forging, cracking occurred, and deformation resistance was high. When the value of the composition relational expression f1 was lower than 56.5, a large corrugation was formed. When the value of the composition relational expression f1 was higher than 59.5, deformation resistance exceeded 30 N/mm$^2$.

TABLE 9

| Alloy No. | Component Composition (mass %) | | | | | Impurities (mass %) | | | | | | | | | | Composition Relational Expression f1 |
|---|---|---|---|---|---|---|---|---|---|---|---|---|---|---|---|---|
| | Cu | Si | P | Pb | Zn | Fe | Mn | Co | Cr | Sn | Al | Bi | Ni | Sb | Ag | |
| S01 | 62.9 | 1.14 | 0.072 | 0.009 | Balance | 0.04 | 0.02 | 0.01 | 0.01 | 0.03 | 0.00 | 0.01 | 0.03 | 0.02 | 0.01 | 57.7 |
| S11 | 62.9 | 1.15 | 0.073 | 0.009 | Balance | 0.04 | 0.02 | 0.01 | 0.01 | 0.03 | 0.00 | 0.01 | 0.03 | 0.02 | 0.01 | 57.7 |
| S12 | 62.9 | 1.14 | 0.071 | 0.009 | Balance | 0.19 | 0.07 | 0.01 | 0.01 | 0.03 | 0.00 | 0.01 | 0.03 | 0.02 | 0.01 | 57.7 |
| S13 | 62.8 | 1.13 | 0.072 | 0.009 | Balance | 0.27 | 0.18 | 0.01 | 0.01 | 0.03 | 0.00 | 0.01 | 0.03 | 0.02 | 0.01 | 57.6 |
| S14 | 62.9 | 1.13 | 0.071 | 0.009 | Balance | 0.04 | 0.02 | 0.01 | 0.01 | 0.18 | 0.09 | 0.01 | 0.03 | 0.02 | 0.01 | 57.7 |
| S15 | 63.0 | 1.15 | 0.070 | 0.009 | Balance | 0.04 | 0.02 | 0.01 | 0.01 | 0.29 | 0.17 | 0.01 | 0.03 | 0.02 | 0.01 | 57.8 |
| S16 | 62.9 | 1.14 | 0.069 | 0.009 | Balance | 0.04 | 0.02 | 0.01 | 0.01 | 0.03 | 0.00 | 0.01 | 0.03 | 0.02 | 0.01 | 57.7 |
| S17 | 62.9 | 1.15 | 0.070 | 0.009 | Balance | 0.04 | 0.02 | 0.01 | 0.01 | 0.03 | 0.00 | 0.01 | 0.03 | 0.02 | 0.01 | 57.7 |

TABLE 10

| Alloy No. | Component Composition (mass %) | | | | | Impurities (mass %) | | | | | | | | | | | Composition Relational Expression f1 |
|---|---|---|---|---|---|---|---|---|---|---|---|---|---|---|---|---|---|
| | Cu | Si | P | Pb | Zn | Fe | Mn | Co | Cr | Sn | Al | Bi | Ni | Se | Ag | MM | |
| S02 | 64.1 | 1.21 | 0.035 | 0.048 | Balance | 0.03 | 0.04 | 0.00 | 0.00 | 0.04 | 0.01 | 0.00 | 0.07 | 0.01 | 0.04 | 0.02 | 58.6 |
| S21 | 63.8 | 1.20 | 0.035 | 0.049 | Balance | 0.09 | 0.18 | 0.00 | 0.00 | 0.04 | 0.01 | 0.00 | 0.07 | 0.01 | 0.04 | 0.02 | 58.4 |
| S22 | 63.9 | 1.21 | 0.034 | 0.047 | Balance | 0.18 | 0.28 | 0.00 | 0.00 | 0.04 | 0.01 | 0.00 | 0.07 | 0.01 | 0.04 | 0.02 | 58.4 |
| S23 | 64.0 | 1.21 | 0.036 | 0.047 | Balance | 0.03 | 0.04 | 0.00 | 0.00 | 0.11 | 0.18 | 0.00 | 0.07 | 0.01 | 0.04 | 0.02 | 58.5 |
| S24 | 63.9 | 1.20 | 0.034 | 0.046 | Balance | 0.03 | 0.04 | 0.00 | 0.00 | 0.29 | 0.20 | 0.00 | 0.07 | 0.01 | 0.04 | 0.02 | 58.5 |
| S25 | 63.9 | 1.21 | 0.033 | 0.048 | Balance | 0.03 | 0.04 | 0.00 | 0.00 | 0.04 | 0.01 | 0.00 | 0.07 | 0.01 | 0.04 | 0.02 | 58.4 |
| S26 | 63.8 | 1.20 | 0.034 | 0.047 | Balance | 0.03 | 0.04 | 0.00 | 0.00 | 0.04 | 0.01 | 0.00 | 0.07 | 0.01 | 0.04 | 0.02 | 58.4 |

Note:
"MM" refers to mischmetal.

TABLE 11

| Alloy No. | Component Composition (mass %) | | | | | Impurities (mass %) | | | | | | | | | | Composition Relational Expression f1 |
|---|---|---|---|---|---|---|---|---|---|---|---|---|---|---|---|---|
| | Cu | Si | P | Pb | Zn | Fe | Mn | Co | Cr | Sn | Al | Bi | Ni | Sb | Ag | |
| S51 | 63.2 | 1.22 | 0.021 | 0.025 | Balance | 0.00 | 0.00 | 0.00 | 0.00 | 0.00 | 0.00 | 0.00 | 0.00 | 0.00 | 0.00 | 57.7 |
| S52 | 61.8 | 1.03 | 0.078 | 0.008 | Balance | 0.01 | 0.00 | 0.00 | 0.00 | 0.00 | 0.00 | 0.00 | 0.00 | 0.00 | 0.00 | 57.1 |
| S53 | 64.6 | 1.42 | 0.054 | 0.011 | Balance | 0.00 | 0.00 | 0.00 | 0.00 | 0.01 | 0.00 | 0.00 | 0.00 | 0.00 | 0.00 | 58.1 |
| S54 | 63.6 | 1.26 | 0.068 | 0.028 | Balance | 0.00 | 0.00 | 0.00 | 0.00 | 0.00 | 0.00 | 0.00 | 0.00 | 0.00 | 0.00 | 57.9 |
| S55 | 63.8 | 1.10 | 0.019 | 0.055 | Balance | 0.01 | 0.00 | 0.00 | 0.00 | 0.11 | 0.00 | 0.00 | 0.06 | 0.00 | 0.00 | 58.9 |
| S56 | 62.3 | 1.06 | 0.042 | 0.089 | Balance | 0.00 | 0.00 | 0.00 | 0.00 | 0.00 | 0.00 | 0.00 | 0.00 | 0.00 | 0.01 | 57.5 |
| S57 | 64.0 | 1.31 | 0.048 | 0.025 | Balance | 0.01 | 0.00 | 0.00 | 0.00 | 0.00 | 0.00 | 0.00 | 0.00 | 0.00 | 0.00 | 58.1 |
| S58 | 61.7 | 1.14 | 0.043 | 0.014 | Balance | 0.01 | 0.00 | 0.00 | 0.00 | 0.00 | 0.00 | 0.00 | 0.00 | 0.00 | 0.00 | 56.6 |
| S59 | 64.9 | 1.26 | 0.053 | 0.026 | Balance | 0.01 | 0.00 | 0.00 | 0.00 | 0.01 | 0.00 | 0.00 | 0.00 | 0.00 | 0.00 | 59.2 |
| S60 | 63.9 | 1.08 | 0.042 | 0.166 | Balance | 0.01 | 0.00 | 0.00 | 0.00 | 0.02 | 0.01 | 0.03 | 0.00 | 0.00 | 0.00 | 59.1 |
| S61 | 64.2 | 1.19 | 0.066 | 0.074 | Balance | 0.01 | 0.00 | 0.06 | 0.00 | 0.00 | 0.05 | 0.00 | 0.00 | 0.02 | 0.00 | 58.8 |
| S62 | 62.6 | 1.06 | 0.054 | 0.056 | Balance | 0.12 | 0.04 | 0.00 | 0.03 | 0.00 | 0.00 | 0.01 | 0.00 | 0.00 | 0.00 | 57.8 |
| S63 | 63.4 | 1.12 | 0.011 | 0.052 | Balance | 0.01 | 0.05 | 0.00 | 0.00 | 0.00 | 0.00 | 0.00 | 0.06 | 0.00 | 0.00 | 58.4 |
| S64 | 62.4 | 1.08 | 0.047 | 0.121 | Balance | 0.01 | 0.00 | 0.00 | 0.00 | 0.07 | 0.00 | 0.00 | 0.12 | 0.00 | 0.02 | 57.5 |
| S65 | 62.3 | 1.05 | 0.055 | 0.005 | Balance | 0.00 | 0.00 | 0.03 | 0.00 | 0.03 | 0.11 | 0.01 | 0.00 | 0.02 | 0.05 | 57.5 |
| S66 | 62.5 | 1.03 | 0.078 | 0.092 | Balance | 0.01 | 0.10 | 0.00 | 0.00 | 0.13 | 0.00 | 0.00 | 0.00 | 0.00 | 0.00 | 57.8 |

TABLE 12

| Alloy No. | Component Composition (mass %) | | | | | Impurities (mass %) | | | | | | | | | | Composition Relational Expression f1 |
|---|---|---|---|---|---|---|---|---|---|---|---|---|---|---|---|---|
| | Cu | Si | P | Pb | Zn | Fe | Mn | Co | Cr | Sn | Al | Bi | Ni | Sb | Ag | |
| F | 59.6 | 1.30 | 0.050 | 0.010 | Balance | 0.00 | 0.00 | 0.00 | 0.00 | 0.00 | 0.00 | 0.00 | 0.00 | 0.00 | 0.00 | 53.7 |
| S70 | 61.3 | 1.17 | 0.071 | 0.041 | Balance | 0.01 | 0.00 | 0.00 | 0.00 | 0.00 | 0.00 | 0.00 | 0.00 | 0.00 | 0.00 | 56.0 |
| S71 | 62.5 | 1.05 | 0.001 | 0.016 | Balance | 0.00 | 0.00 | 0.00 | 0.00 | 0.00 | 0.00 | 0.00 | 0.00 | 0.00 | 0.00 | 57.8 |

TABLE 12-continued

| Alloy No. | Component Composition (mass %) | | | | | Impurities (mass %) | | | | | | | | | | Composition Relational Expression |
|---|---|---|---|---|---|---|---|---|---|---|---|---|---|---|---|---|
| | Cu | Si | P | Pb | Zn | Fe | Mn | Co | Cr | Sn | Al | Bi | Ni | Sb | Ag | f1 |
| S72 | 63.5 | 1.18 | 0.001 | 0.019 | Balance | 0.00 | 0.00 | 0.00 | 0.00 | 0.00 | 0.00 | 0.00 | 0.00 | 0.00 | 0.00 | 58.2 |
| S73 | 65.3 | 1.56 | 0.070 | 0.036 | Balance | 0.01 | 0.00 | 0.00 | 0.00 | 0.00 | 0.00 | 0.00 | 0.00 | 0.00 | 0.00 | 58.2 |
| S74 | 65.5 | 1.48 | 0.070 | 0.034 | Balance | 0.01 | 0.00 | 0.00 | 0.00 | 0.00 | 0.00 | 0.00 | 0.00 | 0.00 | 0.00 | 58.8 |
| S75 | 66.4 | 1.65 | 0.068 | 0.015 | Balance | 0.00 | 0.00 | 0.00 | 0.00 | 0.00 | 0.00 | 0.00 | 0.00 | 0.00 | 0.00 | 59.0 |
| S76 | 63.2 | 0.83 | 0.057 | 0.023 | Balance | 0.02 | 0.00 | 0.00 | 0.00 | 0.00 | 0.05 | 0.00 | 0.00 | 0.00 | 0.00 | 59.4 |
| S77 | 63.7 | 1.05 | 0.033 | 0.001 | Balance | 0.01 | 0.00 | 0.00 | 0.06 | 0.00 | 0.00 | 0.00 | 0.00 | 0.00 | 0.00 | 58.9 |
| S78 | 63.3 | 1.09 | 0.041 | 0.024 | Balance | 0.26 | 0.20 | 0.00 | 0.00 | 0.00 | 0.00 | 0.00 | 0.00 | 0.00 | 0.00 | 58.4 |
| S79 | 63.8 | 1.29 | 0.062 | 0.031 | Balance | 0.00 | 0.00 | 0.00 | 0.29 | 0.17 | 0.00 | 0.00 | 0.00 | 0.00 | 0.00 | 57.9 |
| S80 | 64.9 | 1.10 | 0.083 | 0.055 | Balance | 0.00 | 0.00 | 0.00 | 0.00 | 0.00 | 0.00 | 0.00 | 0.00 | 0.00 | 0.00 | 59.9 |
| S81 | 64.9 | 1.21 | 0.065 | 0.009 | Balance | 0.01 | 0.00 | 0.00 | 0.00 | 0.00 | 0.00 | 0.00 | 0.00 | 0.00 | 0.00 | 59.4 |
| S82 | 58.8 | 0.10 | 0.010 | 0.198 | Balance | 0.00 | 0.00 | 0.00 | 0.00 | 0.00 | 0.00 | 0.00 | 0.00 | 0.00 | 0.00 | 58.4 |
| S83 | 63.9 | 1.04 | 0.012 | 0.015 | Balance | 0.00 | 0.00 | 0.00 | 0.00 | 0.00 | 0.00 | 0.00 | 0.00 | 0.00 | 0.00 | 59.2 |
| S84 | 59.2 | 0.34 | 0.055 | 0.078 | Balance | 0.05 | 0.00 | 0.00 | 0.00 | 0.01 | 0.00 | 0.00 | 0.00 | 0.00 | 0.00 | 57.7 |
| H | 58.8 | 0.00 | 0.001 | 2.100 | Balance | 0.23 | 0.01 | 0.02 | 0.00 | 0.29 | 0.00 | 0.01 | 0.03 | 0.01 | 0.00 | 59.8 |

TABLE 13

Step A: Production step with the facility used for manufacturing products for sale (direct extrusion)

| | Hot Extrusion | | | Cold Drawing and Straightness Correction Working | Low-Temperature Annealing | | | |
|---|---|---|---|---|---|---|---|---|
| Step No. | Diameter of Extruded Material (mm) | Temperature (° C.) | Cooling Rate* (° C/min) | Ratio (%) | Temperature (° C.) | Time (min) | f8 | Note |
| A0 | 25.6 | 590 | 25 | 0 | — | — | — | |
| A1 | 25.6 | 590 | 25 | 4.7 | — | — | — | |
| A2 | 25.6 | 590 | 45 | 4.7 | — | — | — | |
| A3 | 25.6 | 635 | 25 | 4.7 | — | — | — | |
| AH1 | 25.6 | 680 | 25 | 4.7 | — | — | — | |
| AH2 | 25.6 | 590 | 65 | 4.7 | — | — | — | |
| A4 | 25.6 | 590 | 25 | 8.4 | — | — | — | |
| A5 | 25.6 | 590 | 25 | 4.7 | 275 | 100 | 750 | |
| A6 | 25.6 | 590 | 25 | 4.7 | 410 | 50 | 1485 | |
| A10 | 45.0 | 575 | 20 | — | — | — | — | To Step F (forging material) |

*Cooling rate from 530° C. to 450° C.

TABLE 14

Step B: Production step with the facility used for manufacturing products for sale (indirect extrusion)

| | Hot Extrusion | | | Combined Drawing and Straightness Correction Working | Low-Temperature Annealing | | | |
|---|---|---|---|---|---|---|---|---|
| Step No. | Diameter of Extruded Material (mm) | Temperature (° C.) | Cooling Rate* (° C./min) | Ratio (%) | Temperature (° C.) | Time (min) | f8 | Note |
| B1 | 20.0 | 610 | 38 | 9.5 | — | — | — | |
| B2 | 20.0 | 610 | 0.2 | 9.5 | — | — | — | |
| B3 | 20.0 | 580 | 38 | 9.5 | — | — | — | |
| B4 | 20.0 | 640 | 38 | 9.5 | — | — | — | |
| BH1 | 20.0 | 680 | 38 | 9.5 | — | — | — | |
| BH2 | 20.0 | 580 | 55 | 9.5 | — | — | — | |

TABLE 14-continued

Step B: Production step with the facility used for manufacturing products for sale (indirect extrusion)

| | Hot Extrusion | | | Combined Drawing and Straightness Correction Working | Low-Temperature Annealing | | | |
|---|---|---|---|---|---|---|---|---|
| Step No. | Diameter of Extruded Material (mm) | Temperature (° C.) | Cooling Rate* (° C./min) | Ratio (%) | Temperature (° C.) | Time (min) | f8 | Note |
| B5 | 20.0 | 610 | 38 | 14.4 | — | — | — | |
| B6 | 20.0 | 610 | 38 | 9.5 | 310 | 100 | 1100 | Low-temperature annealing was performed on the material of B1 |
| B7 | 20.0 | 610 | 38 | — | — | — | — | To Step E |

*Cooling rate from 530° C. to 450° C.

TABLE 15

Step C: Extrusion in the Laboratory

| | Hot Extrusion | | | Cold Working | Low-Temperature Annealing | | | |
|---|---|---|---|---|---|---|---|---|
| Step No. | Diameter of Extruded Material (mm) | Temperature (° C.) | Cooling Rate* (° C./min) | Ratio (%) | Temperature (° C.) | Time (min) | f8 | Note |
| C1 | 22.0 | 595 | 30 | 0 | — | — | — | Partially to Step E |
| C2 | 22.0 | 635 | 30 | 0 | — | — | — | |
| C3 | 22.0 | 595 | 30 | 0 | 320 | 60 | 930 | Low-temperature annealing was performed on the material of C1 |
| CH1 | 22.0 | 675 | 30 | 0 | — | — | — | |
| CH2 | 22.0 | 595 | 72 | 0 | — | — | — | |
| C10 | 45.0 | 575 | 20 | — | — | — | — | To Step F (forging material) |

*Cooling rate from 530° C. to 450° C.

TABLE 16

Step D: Casting (Production of castings as a forging material)

| Step No. | Diameter (mm) | Cooling Rate* (° C./min) |
|---|---|---|
| D1 | 45.0 | 40 |

*Cooling rate from 530° C. to 450° C.

TABLE 17

Step E: Laboratory

| | | Cold Drawing 1 | | | Annealing | | Cold Drawing 2 | |
|---|---|---|---|---|---|---|---|---|
| Step No. | Material (preceding step) | Diameter of Extruded Material (mm) | Diameter of Drawn Material (mm) | Working Ratio (%) | Temperature (° C.) | Time (min) | Diameter of Drawn Material (mm) | Working Ratio (%) |
| E1 | B7 | 20.0 | 16.7 | 30.3 | 480 | 60 | 16.0 | 8.2 |
| E2 | C1 | 22.0 | 18.4 | 30.0 | 450 | 90 | 17.7 | 7.5 |

TABLE 18

| | | Step F: Hot Forging | | | | | | |
|---|---|---|---|---|---|---|---|---|
| | | Hot Forging | | Cold Working | | | | |
| | Material | | Cooling | Working | Low-Temperature Annealing | | | |
| Step No. | (preceding step) | Temperature (° C.) | Rate* (° C./min) | Ratio (%) | Temperature (° C.) | Time (min) | f8 | Note |
| F1 | A10, C10 | 660 | 28 | 0 | — | — | — | |
| F2 | A10, C10 | 640 | 28 | 0 | — | — | — | |
| F3 | A10, C10 | 615 | 28 | 0 | — | — | — | |
| F4 | A10, C10 | 615 | 28 | 0 | 290 | 100 | 900 | Low-temperature annealing was performed on the material of F3 |
| FH1 | A10, C10 | 685 | 28 | 0 | — | — | — | |
| FH2 | A10, C10 | 615 | 63 | 0 | — | — | — | |
| F5 | D1 | 620 | 28 | 0 | — | — | — | |

*Cooling rate from 530° C. to 450° C.

TABLE 19

| | Step R: Rolling in the Laboratory | | | | | | | | |
|---|---|---|---|---|---|---|---|---|---|
| | Hot Rolling | | | Cold Rolling 1 | | | | Cold Rolling 2 | |
| | Thickness of Hot-Rolled | Final | Cooling | Thickness of Cold-Rolled | Working | Annealing | | Thickness of Cold-Rolled | Working |
| Step No. | Material (mm) | Temperature (° C.) | Rate* (° C./min) | Material (mm) | Ratio (%) | Temperature (° C.) | Time (min) | Material (mm) | Ratio (%) |
| R1 | 15.0 | 560 | 20 | 10.0 | 33.3 | 480 | 60 | 9.0 | 10.0 |

*Cooling rate from 530° C. to 450° C.

TABLE 20

| | | | Metallographic Structure | | | | | | | | |
|---|---|---|---|---|---|---|---|---|---|---|---|
| Test No. | Alloy No. | Step No. | f2 | f3 | f4 | f5 | f6 | f6A | P Compound | Shape of α phase | Si Concentration in β phase (mass %) |
| T01 | S01 | A0 | 52 | 48 | 0 | 0 | 51 | 59 | ○ | ○ | 1.4 |
| T02 | | A1 | 52 | 48 | 0 | 0 | 51 | 59 | ○ | ○ | 1.4 |
| T03 | | A2 | 50 | 50 | 0 | 0 | 53 | 61 | ○ | ○ | — |
| T04 | | A3 | 49 | 51 | 0 | 0 | 54 | 62 | ○ | Δ | 1.4 |
| T05 | | AH1 | 46 | 54 | 0 | 0 | 58 | 65 | ○ | X | — |
| T06 | | AH2 | 49 | 51 | 0 | 0 | 54 | 62 | Δ | ○ | — |
| T07 | | A4 | 52 | 48 | 0 | 0 | 51 | 59 | ○ | ○ | — |
| T08 | | A5 | 53 | 46 | 0.7 | 0.3 | 52 | 59 | ○ | ○ | — |
| T09 | | A6 | 54 | 44 | 1.6 | 0.7 | 51 | 58 | ○ | ○ | 1.4 |
| T10 | | A10 | 54 | 46 | 0 | 0 | 49 | 56 | ○ | ○ | — |
| T11 | | B1 | 48 | 52 | 0 | 0 | 56 | 63 | ○ | ○ | — |
| T12 | | B2 | 53 | 47 | 0 | 0 | 50 | 58 | ○ | ○ | — |
| T13 | | B3 | 49 | 51 | 0 | 0 | 54 | 62 | ○ | ○ | 1.4 |
| T14 | | B4 | 44 | 56 | 0 | 0 | 60 | 67 | ○ | Δ | — |
| T15 | | BH1 | 42 | 58 | 0 | 0 | 62 | 69 | ○ | X | — |
| T16 | | BH2 | 45 | 55 | 0 | 0 | 59 | 66 | Δ | ○ | — |
| T17 | | B5 | 49 | 51 | 0 | 0 | 54 | 62 | ○ | ○ | — |
| T18 | | B6 | 52 | 46 | 1.3 | 0.5 | 53 | 60 | ○ | ○ | — |
| T21 | | F1 | 46 | 54 | 0 | 0 | 58 | 65 | ○ | Δ | — |
| T22 | | F2 | 50 | 50 | 0 | 0 | 53 | 61 | ○ | ○ | 1.4 |
| T23 | | F3 | 51 | 49 | 0 | 0 | 52 | 60 | ○ | ○ | — |
| T24 | | F4 | 52 | 47 | 0.9 | 0.3 | 53 | 60 | ○ | ○ | — |
| T25 | | FH1 | 43 | 57 | 0 | 0 | 61 | 68 | ○ | X | 1.3 |
| T26 | | FH2 | 48 | 52 | 0 | 0 | 56 | 63 | Δ | ○ | — |

TABLE 20-continued

| | | | Metallographic Structure | | | | | | | |
|---|---|---|---|---|---|---|---|---|---|---|
| Test No. | Alloy No. | Step No. | f2 | f3 | f4 | f5 | f6 | f6A | P Compound | Shape of α phase | Si Concentration in β phase (mass %) |
| T27 | | F5 | 50 | 50 | 0 | 0 | 53 | 61 | ○ | ○ | — |
| T101 | S11 | C1 | 52 | 48 | 0 | 0 | 51 | 59 | ○ | ○ | 1.4 |
| T102 | S12 | C1 | 54 | 46 | 0 | 0 | 49 | 56 | ○ | ○ | 1.3 |
| T103 | S13 | C1 | 58 | 42 | 0 | 0 | 45 | 52 | ○ | ○ | — |
| T104 | S14 | C1 | 53 | 46 | 0.9 | 0.4 | 52 | 59 | ○ | ○ | 1.4 |
| T105 | S15 | C1 | 58 | 39 | 3.5 | 1.6 | 47 | 55 | ○ | ○ | — |
| T106 | S16 | E1 | 59 | 41 | 0 | 0 | 44 | 51 | ○ | ○ | 1.5 |
| T107 | S17 | R1 | 57 | 43 | 0 | 0 | 46 | 53 | ○ | ○ | 1.4 |

TABLE 21

| | | | Property | | | |
|---|---|---|---|---|---|---|
| Test No. | Alloy No. | Step No. | Electrical Conductivity (% IACS) | Tensile Strength (N/mm²) | Elongation (%) | f7 |
| T01 | S01 | A0 | 15.7 | 536 | 33 | 713 |
| T02 | | A1 | 15.7 | 573 | 26 | 722 |
| T03 | | A2 | 15.7 | 585 | 25 | 731 |
| T04 | | A3 | 15.8 | 559 | 25 | 699 |
| T05 | | AH1 | 15.9 | 535 | 25 | 669 |
| T06 | | AH2 | 15.3 | 570 | 27 | 724 |
| T07 | | A4 | 15.6 | 627 | 22 | 765 |
| T08 | | A5 | 16.0 | 586 | 24 | 727 |
| T09 | | A6 | 16.1 | 563 | 23 | 692 |
| T10 | | A10 | 15.9 | 520 | 37 | 712 |
| T11 | | B1 | 15.7 | 660 | 19 | 785 |
| T12 | | B2 | 15.4 | 638 | 20 | 766 |
| T13 | | B3 | 15.6 | 684 | 18 | 807 |
| T14 | | B4 | 15.7 | 642 | 18 | 758 |
| T15 | | BH1 | 15.9 | 621 | 19 | 739 |
| T16 | | BH2 | 15.3 | 676 | 18 | 798 |
| T17 | | B5 | 15.6 | 702 | 14 | 800 |
| T18 | | B6 | 16.0 | 675 | 17 | 790 |
| T21 | | F1 | 15.8 | 505 | 29 | 651 |
| T22 | | F2 | 15.7 | 530 | 31 | 694 |
| T23 | | F3 | 15.7 | 547 | 30 | 711 |
| T24 | | F4 | 15.9 | 534 | 27 | 678 |
| T25 | | FH1 | 15.8 | 496 | 27 | 630 |
| T26 | | FH2 | 15.4 | 540 | 32 | 713 |
| T27 | | F5 | 15.6 | 528 | 29 | 681 |
| T101 | S11 | C1 | 15.8 | 532 | 34 | 713 |
| T102 | S12 | C1 | 15.4 | 533 | 31 | 698 |
| T103 | S13 | C1 | 15.2 | 538 | 25 | 673 |
| T104 | S14 | C1 | 15.5 | 527 | 28 | 675 |
| T105 | S15 | C1 | 15.6 | 490 | 18 | 578 |
| T106 | S16 | E1 | 15.6 | 602 | 21 | 728 |
| T107 | S17 | R1 | 15.5 | — | — | — |

TABLE 22

| | | | Lathe | | Drill | | |
|---|---|---|---|---|---|---|---|
| Test No. | Alloy No. | Step No. | Chips | Three Force Components | Chips | Torque Index | Thrust Index | Drill Index |
| T01 | S01 | A0 | ○ | 87 | ○ | 75 | 76 | 76 |
| T02 | | A1 | ○ | 86 | ○ | 76 | 75 | 76 |
| T03 | | A2 | ○ | 86 | ○ | 75 | 75 | 75 |
| T04 | | A3 | ○ | 84 | ○ | 73 | 76 | 75 |
| T05 | | AH1 | ○ | 83 | ○ | 72 | 74 | 73 |
| T06 | | AH2 | Δ | 80 | Δ | 70 | 75 | 73 |
| T07 | | A4 | ○ | 85 | ○ | 77 | 73 | 75 |
| T08 | | A5 | ○ | 88 | ○ | 79 | 71 | 75 |
| T09 | | A6 | ○ | 85 | ○ | 78 | 71 | 75 |
| T10 | | A10 | ○ | 85 | ○ | 73 | 76 | 75 |
| T11 | | B1 | ○ | 87 | ○ | 76 | 73 | 75 |
| T12 | | B2 | ○ | 85 | ○ | 73 | 75 | 74 |
| T13 | | B3 | ○ | 88 | ○ | 77 | 72 | 75 |
| T14 | | B4 | ○ | 85 | ○ | 75 | 74 | 75 |
| T15 | | BH1 | ○ | 84 | ○ | 73 | 74 | 74 |
| T16 | | BH2 | ○ | 82 | ○ | 73 | 75 | 74 |
| T17 | | B5 | ○ | 87 | ○ | 78 | 71 | 75 |
| T18 | | B6 | ○ | 86 | ○ | 80 | 71 | 76 |
| T21 | | F1 | ○ | 84 | ○ | 74 | 77 | 76 |
| T22 | | F2 | ○ | 86 | ○ | 75 | 77 | 76 |
| T23 | | F3 | ○ | 88 | ○ | 76 | 75 | 76 |
| T24 | | F4 | ○ | 87 | ○ | 78 | 74 | 76 |
| T25 | | FH1 | ○ | 83 | ○ | 73 | 77 | 75 |
| T26 | | FH2 | ○ | 82 | Δ | 71 | 76 | 74 |
| T27 | | F5 | ○ | 86 | ○ | 74 | 78 | 76 |
| T101 | S11 | C1 | ○ | 86 | ○ | 75 | 75 | 75 |
| T102 | S12 | C1 | ○ | 84 | ○ | 73 | 74 | 74 |
| T103 | S13 | C1 | Δ | 75 | Δ | 67 | 71 | 69 |
| T104 | S14 | C1 | ○ | 85 | ○ | 75 | 72 | 74 |
| T105 | S15 | C1 | Δ | 77 | ○ | 73 | 64 | 69 |
| T106 | S16 | E1 | ○ | 82 | ○ | 72 | 74 | 73 |
| T107 | S17 | R1 | — | — | ○ | 71 | 77 | 74 |

TABLE 23

| Test No. | Alloy No. | Step No. | f2 | f3 | f4 | f5 | f6 | f6A | P Compound | Shape of α phase | Si Concentration in β phase (mass %) |
|---|---|---|---|---|---|---|---|---|---|---|---|
| T31 | S02 | A0 | 63 | 37 | 0 | 0 | 41 | 51 | ○ | ○ | — |
| T32 |  | A1 | 64 | 36 | 0 | 0 | 40 | 50 | ○ | ○ | — |
| T33 |  | A2 | 62 | 38 | 0 | 0 | 42 | 52 | ○ | ○ | — |
| T34 |  | A3 | 60 | 40 | 0 | 0 | 44 | 54 | ○ | ○ | — |
| T35 |  | AH1 | 56 | 44 | 0 | 0 | 48 | 59 | ○ | X | — |
| T36 |  | AH2 | 59 | 41 | 0 | 0 | 45 | 56 | X | ○ | — |
| T37 |  | A4 | 62 | 38 | 0 | 0 | 42 | 52 | ○ | ○ | — |
| T38 |  | A5 | 66 | 32 | 1.9 | 1.1 | 39 | 50 | ○ | ○ | — |
| T39 |  | A6 | 67 | 29 | 3.4 | 2.1 | 37 | 48 | ○ | ○ | 1.5 |
| T40 |  | A10 | 64 | 36 | 0 | 0 | 40 | 50 | ○ | ○ | — |
| T41 |  | F1 | 57 | 43 | 0 | 0 | 47 | 58 | ○ | ○ | — |
| T42 |  | F2 | 59 | 41 | 0 | 0 | 45 | 56 | ○ | ○ | 1.5 |
| T43 |  | F3 | 61 | 39 | 0 | 0 | 43 | 53 | ○ | ○ | — |
| T44 |  | F4 | 63 | 34 | 2.4 | 1.3 | 42 | 53 | ○ | ○ | — |
| T45 |  | FH1 | 55 | 45 | 0 | 0 | 50 | 60 | ○ | X | — |
| T46 |  | FH2 | 58 | 42 | 0 | 0 | 46 | 57 | Δ | ○ | — |
| T47 |  | F5 | 60 | 40 | 0 | 0 | 44 | 54 | ○ | ○ | — |
| T111 | S21 | C1 | 64 | 36 | 0 | 0 | 39 | 50 | ○ | ○ | 1.5 |
| T112 | S22 | C1 | 69 | 31 | 0 | 0 | 34 | 44 | ○ | ○ | — |
| T113 | S23 | C1 | 64 | 35 | 0.9 | 0.5 | 41 | 52 | ○ | ○ | 1.5 |
| T114 | S24 | C1 | 69 | 26 | 4.1 | 2.8 | 35 | 45 | ○ | ○ | — |
| T115 | S25 | E1 | 69 | 31 | 0 | 0 | 34 | 44 | ○ | ○ | 1.6 |
| T116 | S26 | R1 | 67 | 33 | 0 | 0 | 36 | 46 | ○ | ○ | — |

TABLE 24

| Test No. | Alloy No. | Step No. | Electrical Conductivity (% IACS) | Tensile Strength (N/mm²) | Elongation (%) | f7 |
|---|---|---|---|---|---|---|
| T31 | S02 | A0 | 15.1 | 516 | 36 | 702 |
| T32 |  | A1 | 15.0 | 557 | 30 | 724 |
| T33 |  | A2 | 15.2 | 563 | 29 | 726 |
| T34 |  | A3 | 15.2 | 551 | 28 | 705 |
| T35 |  | AH1 | 15.3 | 535 | 28 | 685 |
| T36 |  | AH2 | 15.0 | 567 | 29 | 731 |
| T37 |  | A4 | 15.2 | 602 | 21 | 728 |
| T38 |  | A5 | 15.5 | 571 | 24 | 708 |
| T39 |  | A6 | 15.4 | 566 | 21 | 685 |
| T40 |  | A10 | 15.1 | 505 | 39 | 702 |
| T41 |  | F1 | 15.3 | 500 | 33 | 665 |
| T42 |  | F2 | 15.2 | 522 | 35 | 705 |
| T43 |  | F3 | 15.2 | 536 | 34 | 718 |
| T44 |  | F4 | 15.3 | 530 | 25 | 663 |
| T45 |  | FH1 | 15.2 | 482 | 33 | 641 |
| T46 |  | FH2 | 15.1 | 541 | 35 | 730 |
| T47 |  | F5 | 15.4 | 523 | 32 | 690 |
| T111 | S21 | C1 | 14.9 | 512 | 36 | 696 |
| T112 | S22 | C1 | 14.6 | 508 | 29 | 655 |
| T113 | S23 | C1 | 15.1 | 500 | 35 | 675 |
| T114 | S24 | C1 | 14.9 | 468 | 20 | 562 |
| T115 | S25 | E1 | 15.1 | 585 | 22 | 714 |
| T116 | S26 | R1 | 15.0 | — | — | — |

TABLE 25

| Test No. | Alloy No. | Step No. | Lathe Three Force Chips | Components | Drill Chips | Torque Index | Thrust Index | Drill Index |
|---|---|---|---|---|---|---|---|---|
| T31 | S02 | A0 | ○ | 83 | ○ | 74 | 75 | 75 |
| T32 |  | A1 | ○ | 84 | ○ | 75 | 74 | 75 |
| T33 |  | A2 | ○ | 83 | ○ | 73 | 73 | 73 |
| T34 |  | A3 | ○ | 82 | ○ | 71 | 74 | 73 |
| T35 |  | AH1 | ○ | 80 | Δ | 70 | 73 | 72 |
| T36 |  | AH2 | Δ | 77 | X | 69 | 73 | 71 |
| T37 |  | A4 | ○ | 82 | ○ | 74 | 73 | 74 |
| T38 |  | A5 | ○ | 83 | ○ | 75 | 70 | 73 |
| T39 |  | A6 | ○ | 80 | ○ | 74 | 68 | 71 |
| T40 |  | A10 | ○ | 81 | ○ | 73 | 74 | 74 |
| T41 |  | F1 | ○ | 83 | ○ | 72 | 75 | 74 |
| T42 |  | F2 | ○ | 85 | ○ | 75 | 76 | 76 |
| T43 |  | F3 | ○ | 85 | ○ | 76 | 77 | 77 |
| T44 |  | F4 | ○ | 84 | ○ | 77 | 71 | 74 |
| T45 |  | FH1 | ○ | 82 | ○ | 71 | 74 | 73 |
| T46 |  | FH2 | Δ | 80 | Δ | 70 | 76 | 73 |
| T47 |  | F5 | ○ | 83 | ○ | 72 | 77 | 75 |
| T111 | S21 | C1 | ○ | 82 | ○ | 71 | 73 | 72 |
| T112 | S22 | C1 | X | 70 | Δ | 65 | 70 | 68 |
| T113 | S23 | C1 | ○ | 83 | ○ | 75 | 70 | 73 |
| T114 | S24 | C1 | X | 71 | Δ | 72 | 65 | 69 |
| T115 | S25 | E1 | ○ | 77 | ○ | 69 | 72 | 71 |
| T116 | S26 | R1 | — | — | ○ | 70 | 73 | 72 |

TABLE 26

| Test No. | Alloy No. | Step No. | f2 | f3 | f4 | f5 | f6 | f6A | P Compound | Shape of α phase | Si Concentration in β phase (mass %) |
|---|---|---|---|---|---|---|---|---|---|---|---|
| T201 | S51 | C1 | 53 | 47 | 0 | 0 | 52 | 60 | ○ | ○ | 1.5 |
| T202 | | C3 | 54 | 43 | 2.8 | 1.2 | 53 | 60 | ○ | ○ | 1.5 |
| T203 | | F2 | 50 | 50 | 0 | 0 | 55 | 63 | ○ | ○ | — |
| T204 | | F3 | 52 | 48 | 0 | 0 | 53 | 61 | ○ | ○ | — |
| T205 | S52 | C1 | 39 | 61 | 0 | 0 | 62 | 69 | ○ | ○ | 1.2 |
| T206 | S53 | C1 | 72 | 23 | 4.8 | 3.8 | 34 | 41 | ○ | ○ | — |
| T207 | | C3 | 76 | 15 | 8.2 | 9.8 | 26 | 34 | ○ | ○ | — |
| T208 | | F3 | 69 | 28 | 2.9 | 1.9 | 38 | 46 | ○ | ○ | 1.7 |
| T209 | S54 | C1 | 56 | 44 | 0 | 0 | 49 | 59 | ○ | ○ | — |
| T210 | | C2 | 53 | 47 | 0 | 0 | 53 | 63 | ○ | ○ | — |
| T211 | | CH1 | 51 | 49 | 0 | 0 | 55 | 65 | ○ | X | — |
| T212 | | F2 | 52 | 48 | 0 | 0 | 54 | 64 | ○ | ○ | — |
| T213 | | F3 | 55 | 45 | 0 | 0 | 51 | 60 | ○ | ○ | 1.5 |
| T214 | S55 | C1 | 66 | 34 | 0 | 0 | 36 | 46 | ○ | ○ | — |
| T215 | | C2 | 64 | 36 | 0 | 0 | 38 | 48 | ○ | ○ | — |
| T216 | | CH2 | 62 | 38 | 0 | 0 | 40 | 50 | X | ○ | — |
| T217 | | E2 | 70 | 30 | 0 | 0 | 31 | 42 | ○ | ○ | 1.5 |
| T218 | | F1 | 62 | 38 | 0 | 0 | 40 | 50 | ○ | ○ | — |
| T219 | | F2 | 64 | 36 | 0 | 0 | 38 | 48 | ○ | ○ | 1.4 |
| T220 | | FH2 | 61 | 39 | 0 | 0 | 41 | 51 | X | ○ | — |
| T221 | S56 | C1 | 46 | 54 | 0 | 0 | 56 | 69 | ○ | ○ | 1.3 |
| T222 | | F5 | 44 | 56 | 0 | 0 | 58 | 71 | ○ | ○ | 1.3 |
| T223 | S57 | C1 | 61 | 38 | 0.8 | 0.4 | 46 | 55 | ○ | ○ | 1.6 |
| T224 | S58 | C1 | 26 | 74 | 0 | 0 | 79 | 86 | ○ | Δ | 1.3 |
| T225 | S59 | C1 | 77 | 21 | 1.8 | 1.5 | 28 | 37 | ○ | ○ | — |
| T226 | | C3 | 83 | 11 | 5.6 | 9.2 | 19 | 29 | ○ | ○ | — |
| T227 | S60 | C1 | 70 | 30 | 0 | 0 | 31 | 49 | ○ | ○ | 1.3 |
| T228 | S61 | C1 | 64 | 36 | 0 | 0 | 39 | 53 | ○ | ○ | 1.5 |
| T229 | S62 | C1 | 50 | 50 | 0 | 0 | 51 | 63 | ○ | ○ | 1.3 |
| T230 | S63 | C1 | 61 | 39 | 0 | 0 | 41 | 51 | ○ | ○ | 1.4 |
| T231 | | F2 | 61 | 39 | 0 | 0 | 41 | 51 | Δ | ○ | — |
| T232 | | FH2 | 58 | 42 | 0 | 0 | 43 | 53 | X | ○ | — |
| T233 | S64 | C1 | 46 | 54 | 0 | 0 | 56 | 72 | ○ | ○ | 1.3 |
| T234 | S65 | C1 | 46 | 54 | 0 | 0 | 55 | 61 | ○ | ○ | 1.3 |
| T235 | S66 | C1 | 52 | 48 | 0 | 0 | 49 | 64 | ○ | ○ | 1.3 |

TABLE 27

| Test No. | Alloy No. | Step No. | Electrical Conductivity (% IACS) | Tensile Strength (N/mm²) | Elongation (%) | f7 |
|---|---|---|---|---|---|---|
| T201 | S51 | C1 | 15.4 | 542 | 33 | 721 |
| T202 | | C3 | 15.6 | 518 | 26 | 653 |
| T203 | | F2 | 15.5 | 535 | 30 | 696 |
| T204 | | F3 | 15.4 | 554 | 30 | 720 |
| T205 | S52 | C1 | 16.6 | 563 | 24 | 698 |
| T206 | S53 | C1 | 13.6 | 539 | 23 | 663 |
| T207 | | C3 | 13.8 | 506 | 17 | 592 |
| T208 | | F3 | 13.6 | 545 | 26 | 687 |
| T209 | S54 | C1 | 15.2 | 539 | 35 | 728 |
| T210 | | C2 | 15.2 | 526 | 35 | 710 |
| T211 | | CH1 | 15.3 | 487 | 36 | 662 |
| T212 | | F2 | 15.2 | 530 | 32 | 700 |
| T213 | | F3 | 15.2 | 549 | 31 | 719 |
| T214 | S55 | C1 | 15.6 | 507 | 39 | 705 |
| T215 | | C2 | 15.7 | 490 | 38 | 676 |
| T216 | | CH2 | 15.9 | 500 | 40 | 700 |
| T217 | | E2 | 15.5 | 592 | 24 | 734 |
| T218 | | F1 | 15.9 | 498 | 37 | 682 |
| T219 | | F2 | 15.6 | 511 | 36 | 695 |
| T220 | | FH2 | 16.1 | 518 | 36 | 704 |
| T221 | S56 | C1 | 16.5 | 547 | 28 | 700 |
| T222 | | F5 | 16.6 | 538 | 26 | 678 |
| T223 | S57 | C1 | 14.4 | 545 | 28 | 698 |
| T224 | S58 | C1 | 16.6 | 583 | 20 | 700 |
| T225 | S59 | C1 | 14.8 | 517 | 27 | 657 |
| T226 | | C3 | 15.2 | 496 | 21 | 600 |
| T227 | S60 | C1 | 16.0 | 498 | 40 | 697 |
| T228 | S61 | C1 | 15.1 | 498 | 38 | 687 |
| T229 | S62 | C1 | 16.3 | 533 | 29 | 688 |
| T230 | S63 | C1 | 15.9 | 514 | 38 | 709 |
| T231 | | F2 | 15.9 | 518 | 37 | 710 |
| T232 | | FH2 | 15.8 | 522 | 37 | 715 |
| T233 | S64 | C1 | 16.3 | 545 | 28 | 698 |
| T234 | S65 | C1 | 16.6 | 547 | 29 | 706 |
| T235 | S66 | C1 | 16.7 | 532 | 31 | 697 |

TABLE 28

| Test No. | Alloy No. | Step No. | Lathe Three Force Components Chips | Lathe Three Force Components | Drill Chips | Drill Torque Index | Drill Thrust Index | Drill Index |
|---|---|---|---|---|---|---|---|---|
| T201 | S51 | C1 | ○ | 84 | ○ | 74 | 75 | 75 |
| T202 | | C3 | ○ | 85 | ○ | 77 | 71 | 74 |
| T203 | | F2 | ○ | 84 | ○ | 73 | 75 | 74 |
| T204 | | F3 | ○ | 87 | ○ | 76 | 76 | 76 |

TABLE 28-continued

| | | | Lathe | | Drill | | |
| | | | | Three Force | | | |
| Test No. | Alloy No. | Step No. | Chips | Components | Chips | Torque Index | Thrust Index | Drill Index |
|---|---|---|---|---|---|---|---|---|
| T205 | S52 | C1 | ○ | 86 | ○ | 76 | 75 | 76 |
| T206 | S53 | C1 | ○ | 79 | ○ | 74 | 69 | 72 |
| T207 | | C3 | Δ | 72 | ○ | 71 | 65 | 68 |
| T208 | | F3 | ○ | 83 | ○ | 75 | 72 | 74 |
| T209 | S54 | C1 | ○ | 87 | ○ | 76 | 75 | 76 |
| T210 | | C2 | ○ | 86 | ○ | 73 | 75 | 74 |
| T211 | | CH1 | ○ | 83 | ○ | 71 | 74 | 73 |
| T212 | | F2 | ○ | 87 | ○ | 74 | 76 | 75 |
| T213 | | F3 | ○ | 87 | ○ | 76 | 77 | 77 |
| T214 | S55 | C1 | ○ | 81 | ○ | 73 | 74 | 74 |
| T215 | | C2 | ○ | 80 | ○ | 71 | 75 | 73 |
| T216 | | CH2 | X | 72 | Δ | 68 | 72 | 70 |
| T217 | | E2 | Δ | 76 | ○ | 69 | 74 | 72 |
| T218 | | F1 | ○ | 81 | ○ | 71 | 76 | 74 |
| T219 | | F2 | ○ | 82 | ○ | 73 | 75 | 74 |
| T220 | | FH2 | X | 73 | Δ | 69 | 73 | 71 |
| T221 | S56 | C1 | ○ | 90 | ○ | 78 | 76 | 77 |
| T222 | | F5 | ○ | 89 | ○ | 77 | 76 | 77 |
| T223 | S57 | C1 | ○ | 87 | ○ | 76 | 73 | 75 |
| T224 | S58 | C1 | ○ | 90 | ○ | 76 | 78 | 77 |
| T225 | S59 | C1 | Δ | 75 | ○ | 72 | 68 | 70 |
| T226 | | C3 | X | 71 | Δ | 68 | 64 | 66 |
| T227 | S60 | C1 | ○ | 83 | ○ | 74 | 75 | 75 |
| T228 | S61 | C1 | ○ | 85 | ○ | 74 | 76 | 75 |
| T229 | S62 | C1 | ○ | 88 | ○ | 76 | 75 | 76 |
| T230 | S63 | C1 | Δ | 76 | Δ | 70 | 74 | 72 |
| T231 | | F2 | Δ | 77 | ○ | 71 | 74 | 73 |
| T232 | | FH2 | X | 71 | X | 67 | 73 | 70 |
| T233 | S64 | C1 | ○ | 91 | ○ | 78 | 78 | 78 |
| T234 | S65 | C1 | ○ | 87 | ○ | 74 | 75 | 75 |
| T235 | S66 | C1 | ○ | 89 | ○ | 76 | 78 | 77 |

TABLE 29

| | | | Metallographic Structure | | | | | | | | Si Concentration in β phase (mass %) |
|---|---|---|---|---|---|---|---|---|---|---|---|
| Test No. | Alloy No. | Step No. | f2 | f3 | f4 | f5 | f6 | f6A | P Compound | Shape of α phase | |
| T301 | F | C1 | 0 | 100 | 0 | 0 | — | — | ○ | — | — |
| T302 | S70 | C1 | 17 | 83 | 0 | 0 | 90 | 101 | ○ | X | — |
| T303 | S71 | C1 | 55 | 45 | 0 | 0 | 46 | 51 | X | ○ | — |
| T304 | | C3 | 57 | 43 | 0.5 | 0.2 | 46 | 51 | X | ○ | — |
| T305 | | F2 | 52 | 48 | 0 | 0 | 49 | 54 | X | ○ | — |
| T306 | | F4 | 56 | 44 | 0.5 | 0.2 | 47 | 52 | X | ○ | — |
| T307 | S72 | C1 | 60 | 40 | 0 | 0 | 43 | 49 | X | ○ | — |
| T308 | | C3 | 63 | 35 | 1.8 | 0.9 | 42 | 47 | X | ○ | — |
| T309 | S73 | C1 | 70 | 19 | 10.8 | 10.2 | 34 | 44 | ○ | ○ | — |
| T310 | S74 | C1 | 74 | 17 | 8.8 | 9.3 | 30 | 40 | ○ | ○ | — |
| T311 | S75 | C1 | 78 | 9 | 12.7 | 25.4 | 22 | 30 | ○ | ○ | — |
| T312 | S76 | C1 | 77 | 23 | 0 | 0 | 21 | 30 | ○ | ○ | — |
| T313 | S77 | C1 | 71 | 29 | 0 | 0 | 30 | 34 | ○ | ○ | — |
| T314 | S78 | C1 | 68 | 32 | 0 | 0 | 33 | 42 | ○ | ○ | — |
| T315 | S79 | C1 | 68 | 27 | 4.8 | 3.2 | 37 | 47 | ○ | ○ | — |
| T316 | S80 | C1 | 83 | 16 | 0.3 | 0.3 | 18 | 31 | ○ | ○ | — |
| T317 | S81 | C1 | 81 | 17 | 1.8 | 1.9 | 23 | 30 | ○ | ○ | — |
| T318 | S82 | C1 | 57 | 43 | 0 | 0 | 14 | 31 | — | — | 0.1 |
| T319 | S83 | C1 | 75 | 25 | 0 | 0 | 25 | 31 | Δ | ○ | — |
| T320 | S84 | C1 | 53 | 47 | 0 | 0 | 27 | 41 | ○ | ○ | 0.4 |
| T321 | H | C1 | — | — | — | — | — | — | — | — | — |

TABLE 30

| Test No. | Alloy No. | Step No. | Electrical Conductivity (% IACS) | Tensile Strength (N/mm²) | Elongation (%) | f7 |
|---|---|---|---|---|---|---|
| T301 | F | C1 | 16.9 | — | — | — |
| T302 | S70 | C1 | 16.9 | 570 | 15 | 656 |
| T303 | S71 | C1 | 17.1 | 522 | 36 | 710 |
| T304 |  | C3 | 16.9 | 527 | 35 | 711 |
| T305 |  | F2 | 17.1 | 530 | 36 | 721 |
| T306 |  | F4 | 16.9 | 536 | 34 | 718 |
| T307 | S72 | C1 | 15.7 | 518 | 33 | 689 |
| T308 |  | C3 | 15.7 | 511 | 26 | 644 |
| T309 | S73 | C1 | 12.8 | 519 | 14 | 592 |
| T310 | S74 | C1 | 13.2 | 508 | 15 | 584 |
| T311 | S75 | C1 | 12.0 | 467 | 12 | 523 |
| T312 | S76 | C1 | 17.9 | 452 | 38 | 624 |
| T313 | S77 | C1 | 16.1 | 474 | 39 | 659 |
| T314 | S78 | C1 | 15.9 | 500 | 31 | 655 |
| T315 | S79 | C1 | 14.5 | 490 | 16 | 568 |
| T316 | S80 | C1 | 15.6 | 455 | 39 | 632 |
| T317 | S81 | C1 | 15.9 | 498 | 28 | 637 |
| T318 | S82 | C1 | — | 416 | 42 | 591 |
| T319 | S83 | C1 | 15.9 | 478 | 38 | 660 |
| T320 | S84 | C1 | 23.1 | 450 | 32 | 594 |
| T321 | H | C1 | — | — | — | — |

TABLE 31

| Test No. | Alloy No. | Step No. | Lathe Three Force Components Chips | Lathe Three Force Components | Drill Chips | Drill Torque Index | Drill Thrust Index | Drill Index |
|---|---|---|---|---|---|---|---|---|
| T301 | F | C1 | ○ | 93 | ○ | 74 | 77 | 76 |
| T302 | S70 | C1 | ○ | 92 | ○ | 75 | 77 | 76 |
| T303 | S71 | C1 | X | 69 | X | 67 | 74 | 71 |
| T304 |  | C3 | X | 68 | Δ | 69 | 71 | 70 |
| T305 |  | F2 | X | 69 | X | 68 | 74 | 71 |
| T306 |  | F4 | X | 70 | Δ | 70 | 70 | 70 |
| T307 | S72 | C1 | Δ | 73 | X | 67 | 73 | 70 |
| T308 |  | C3 | X | 70 | Δ | 68 | 71 | 70 |
| T309 | S73 | C1 | Δ | 73 | ○ | 74 | 66 | 70 |
| T310 | S74 | C1 | Δ | 72 | ○ | 73 | 68 | 71 |
| T311 | S75 | C1 | X | 58 | X | 61 | 57 | 59 |
| T312 | S76 | C1 | X | 69 | Δ | 66 | 69 | 68 |
| T313 | S77 | C1 | X | 70 | Δ | 68 | 71 | 70 |
| T314 | S78 | C1 | X | 70 | X | 64 | 71 | 68 |
| T315 | S79 | C1 | X | 73 | Δ | 74 | 65 | 70 |
| T316 | S80 | C1 | X | 64 | X | 66 | 68 | 67 |
| T317 | S81 | C1 | X | 69 | Δ | 69 | 66 | 68 |
| T318 | S82 | C1 | X | 52 | X | 55 | 61 | 58 |
| T319 | S83 | C1 | X | 68 | X | 67 | 71 | 69 |
| T320 | S84 | C1 | X | 61 | X | 63 | 68 | 66 |
| T321 | H | C1 | — | — | — | — | — | — |

TABLE 32

| Test No. | Alloy No. | Step No. | Hot Workability |
|---|---|---|---|
| T01 | S01 | A0 | ○ |
| T102 | S12 | C1 | ○ |
| T104 | S14 | C1 | ○ |
| T31 | S02 | A0 | ○ |
| T111 | S21 | C1 | ○ |
| T113 | S23 | C1 | ○ |
| T201 | S51 | C1 | ○ |
| T205 | S52 | C1 | ○ |
| T206 | S53 | C1 | ○ |
| T209 | S54 | C1 | ○ |
| T214 | S55 | C1 | ○ |
| T221 | S56 | C1 | ○ |
| T223 | S57 | C1 | ○ |
| T224 | S58 | C1 | ○ |
| T225 | S59 | C1 | ○ |
| T227 | S60 | C1 | ○ |
| T228 | S61 | C1 | ○ |
| T229 | S62 | C1 | ○ |
| T230 | S63 | C1 | ○ |
| T233 | S64 | C1 | ○ |
| T234 | S65 | C1 | ○ |
| T301 | F | C1 | Δ |
| T302 | S70 | C1 | Δ |
| T303 | S71 | C1 | ○ |
| T307 | S72 | C1 | ○ |
| T309 | S73 | C1 | ○ |
| T310 | S74 | C1 | ○ |
| T311 | S75 | C1 | ○ |
| T312 | S76 | C1 | ○ |
| T313 | S77 | C1 | ○ |
| T316 | S80 | C1 | Δ |
| T320 | S84 | C1 | ○ |
| T321 | H | C1 | X |

From the above-described measurement results, the following findings were obtained.

1) By satisfying the composition according to the embodiment, the composition relational expression f1, the requirements regarding the metallographic structure, the metallographic structure relational expressions f2 to f6, and the metallographic structure and composition relational expression f6A, excellent machinability can be obtained even if the content of Pb is small, and a hot extruded material, a hot forged material, or a hot rolled material having good hot workability at about 600° C., high electrical conductivity of 13% IACS or higher, high strength, good ductility, and superb balance between strength and ductility (characteristic relational expression f7) can be obtained (Alloys Nos. S01, S02, S11, S12, S14, S16, S17, S21, S23, S25, and S51 to S66).

2) By including P in excess of 0.003 mass % and causing P-containing compounds to be present in β phase, chip breakability was improved and cutting resistance was reduced. When the P content was 0.02 mass % or higher, machinability further improved. Even when the amount of γ phase was 0%, excellent machinability was able to be maintained (for example, Alloys Nos. S01 and S02).

3) When the Cu content was low, the amount of β phase increased, and the elongation decreased. When the Cu content was high, the amount of β phase decreased, the amount of γ phase increased, the elongation value lowered, the balance between strength and ductility deteriorated, and machinability was not good (Alloys Nos. S70, S73, and S74).

4) When the Si content was low, machinability deteriorated. When the Si content was high, the amount of γ phase increased, the elongation value lowered, the balance between strength and ductility deteriorated, the electrical conductivity was low, and machinability was not good (Alloys Nos. S73, S75, S76, and S84).

5) When the Si content in β phase was in a range of 1.2 mass % or higher and 1.7 mass % or lower, excellent machinability was obtained (Alloys Nos. S01, S02, S56, and S57).

6) When the P content was 0.003 mass % or lower, chip breakability deteriorated and cutting resistance increased in both lathing and drilling (Alloys Nos. S71 and S72). When P content was about 0.01 mass %, P-containing compounds could not be observed with a metallographic microscope but could be observed with an electron microscope. When the P content was about 0.02 mass % or higher, P-containing compounds began to be observed with a metallographic microscope at a magnification of 500-fold or 1000-fold, and machinability further improved (Alloys Nos. S63, S51, and S55). When P-containing compounds were unable to be observed with an electron microscope but were able to be observed with a metallographic microscope, the effect of P-containing compounds on machinability was slightly reduced (for example, Alloys Nos. S63 and S72). When etching was performed, even if the etching conditions were the same, if the P content in the metallographic structure was higher than about 0.01 mass % to 0.02 mass %, the boundaries between α phase and β phase became clear. It is presumed that this phenomenon relates to solid-solubilization of P in β phase, whether or not any P-containing compounds are present, and the form of P-containing compounds that are present.

7) When the Pb content was lower than 0.003 mass %, machinability was poor (Alloy No. S77). When the Pb content was 0.005 mass % or higher, machinability improved, and when it was 0.01 mass % or higher, machinability further improved. When the Pb content was higher than 0.05 mass %, machinability improved still further (Alloys Nos. S60, S65, and S66). Even when the Pb content was about 0.2 mass % and the amount of β phase was large, if the Si content was low, the effect of Pb on machinability was small, and the alloy's machinability was poor (Alloy No. S82).

8) It was verified that, even if inevitable impurities are included in an amount actually included in a commercially manufactured alloy, there is no significant influence on the properties (Alloys Nos. S01, S02, and S11). It is presumed that when Fe, Mn, Co, or Cr is contained in an amount exceeding the preferable range of inevitable impurities, intermetallic compounds comprising Fe, Mn, or the like and Si or P are formed. As a result, it is presumed that the machinability deteriorated due to the presence of compounds comprising Fe or the like and Si, and a decrease in the concentration of Si that was acting effectively. In addition, it is presumed that the composition of P-containing compounds may have changed (Alloys Nos. S12, S13, S21, S22, and S78). When Sn and Al were contained in an amount exceeding the preferable range of inevitable impurities, the elongation value decreased due to an increase in the amount of γ phase, and machinability deteriorated. It is presumed that γ phase or β phase includes a large amount of Sn or Al, and the characteristics of γ phase or β phase having a small amount of inevitable impurities may have changed (Alloys Nos. S14, S15, S23, S24, and S79).

9) When the composition relational expression f1 was low, the elongation value decreased. When the composition relational expression f1 was high, machinability deteriorated. When the composition relational expression f1 was higher than 59.5 or lower than 56.5, hot workability, machinability, and/or mechanical characteristics did not reach the respective target values (Alloys Nos. S70 and S80). When the value of the composition relational expression f1 was 57.0 or higher, the elongation value further improved. When the value of the composition relational expression f1 was 57.5 or higher, the elongation value further improved. On the other hand, when the value of the composition relational expression f1 was 59.0 or lower, machinability further improved. When the value of the composition relational expression f1 was 58.5 or lower, machinability improved still further (for example, Alloys Nos. S01 and S02).

10) When the area ratio of β phase was lower than 15%, even though the composition and composition relational expression f1 were satisfied, excellent machinability was not obtained. When the area ratio of β phase was higher than 80%, the elongation value was low (Alloys Nos. S70, S75, and S59).

When the proportion of β phase was 70% or higher, the cutting resistance was substantially the same as that of a β single-phase alloy including 1.3 mass % Si and 0.05 mass % P in which P-containing compounds were present (Alloys F, S58, and S70). When the proportion of β phase was about 40% or 50% or higher or when the metallographic structure relational expression f6 was about 45 or higher, and the metallographic structure and composition relational expression f6A was about 55 or higher, the machinability of the β single-phase alloy or Alloy F was maintained (for example, Alloys Nos. S54, S56, S64, and S65).

11) Even when the area ratio of γ phase was 0%, by causing an appropriate amount of β phase to be present, excellent machinability and mechanical characteristics were obtained (for example, Alloys Nos. S01 and S02).

12) When the area ratio of γ phase was 8% or higher, the elongation value decreased. When the amount of γ phase was appropriate, the torque index improved. When the metallographic structure relational expression $f5=18\times(\gamma)/(\beta) \geq 9$, the elongation value and machinability were low. When the metallographic structure relational expression $f5=18\times(\gamma)/(\beta)<2$, a decrease in ductility was small, and the torque and the turning performance improved (Alloys Nos. S73 and S74, Alloy No. S01, and Steps Nos. A5 and A6).

13) Even when the requirements regarding the composition and the metallographic structure, represented by f2 to f4, and f6, were satisfied, if the metallographic structure and composition relational expression f6A was low, machinability was poor (Alloys Nos. S81 and S83). When f6A was 44 or higher, machinability further improved. When f6A was about 55 or higher, machinability improved even further (for example, Alloys Nos. S51, S57, S62, and S66).

14) When the proportion of granular (longer side/shorter side≤4) α phase crystal grains was 75% or higher, strength and machinability further improved. It is presumed that, when the average size of α phase crystal grains was 30 μm or less and α phase crystal grains were fine and granular, α phase functioned as a cushioning material, phase boundaries between α phase and β phase functioned as stress concentration sources during machining, and chip breakability improved. Even when the proportion of granular α phase crystal grains was lower than 50%, targeted machinability and mechanical characteristics were obtained (for example, Alloys Nos. S01, S51 to S66, and Step Nos. A1 to A3, and AH1).

15) When the composition according to the embodiment and the composition relational expression f1 were satisfied, hot workability at 600° C. was excellent, and hot extrusion, hot forging, and hot rolling were able to be performed at about 600° C. When the hot working temperature was 675° C. or higher, the proportion of granular α phase was lower than 50% (for example, Alloys Nos. S01 and S02). In addition, even when a casting was used as a forging material, hot forgeability at 620° C. was excellent, and machinability and mechanical characteristics were also excellent (Step No. F5).

16) When the hot extrusion temperature was higher than about 650° C., tensile strength decreased, and machinability slightly deteriorated. When extrusion was performed at about 625° C. or lower, mechanical characteristics and machinability improved.

When the forging temperature during hot forging was higher than about 675° C., tensile strength decreased, and machinability slightly deteriorated. When forging was performed at about 650° C. or lower or about 625° C. or lower, mechanical characteristics and machinability improved.

17) When the composition and the relational expressions f1 to f6A were satisfied, the tensile strength of a hot extruded material or a forged product not having undergone cold working was high e at 470 N/mm² or higher. When the composition and the values of the relational expressions were within the preferable ranges, the tensile strength exceeded 500 N/mm². In addition, the characteristic relational expression f7=S×(100+E)/100 indicating the balance between strength and ductility was 600 or higher. When the composition and the values of the relational expressions were in the preferable ranges, the characteristic relational expression f7 was high standing at 640 or higher or 670 or higher. When the shape of α phase and the production conditions deviated from the preferable ranges, the tensile strength and the characteristic relational expression f7 decreased, but the tensile strength was 470 N/mm² or higher and f7 was 600 or higher (Alloys Nos. S01, S02, and S51 to S66 and the respective steps).

18) If the composition and the relational expressions f1 to f6A were satisfied, when the cold working ratio during cold working was represented by [R]%, the tensile strength was all (470+8×[R]) N/mm² or higher, more specifically, (500+ 8×[R]) N/mm² or higher, and the elongation E (%) was all (0.02×[R]²−1.15×[R]+18)% or higher, more specifically, all (0.02×[R]²−1.2×[R]+20)% or higher (Steps Nos. A1 to A6, B1 to B6, E1, and E2).

19) Although depending on the P content, the average cooling rate of about 50° C./min in a temperature range from 530° C. to 450° C. in the process of cooling after hot extrusion or hot forging was a boundary value at which whether or not any P-containing compounds were observed in the metallographic structure at a magnification of 500-fold or whether or not any P-containing compounds were observed with an electron microscope (Alloys Nos. S01, S02, and S51 to S66 subjected to their respective steps). When P-containing compounds were observed with a metallographic microscope, machinability was excellent. When the average cooling rate in a temperature range from 530° C. to 450° C. was 0.2° C./min, it is presumed that strength slightly decreased, and machinability slightly decreased because of a decrease in the amount of β phase and enlargement of P-containing compounds. However, both strength and machinability were at high levels (Step No. B2).

20) When P-containing compounds were not observed with a metallographic microscope but were observed with an electron microscope irrespective of the cooling rate and the P content, machinability was higher than when no P-containing compounds were observed, achieving the target of the embodiments. However, the degree of improvement in machinability was lower than when P-containing compounds were observed with a metallographic microscope (Steps Nos. A1 and AH2, Steps Nos. F3 and FH2, for example, Alloy No. S63).

21) It was found that a bar prepared by performing low-temperature annealing on a hot-worked material under the condition so that the annealing conditional expression f8 was 750 to 1485 was quite straight with a bend of 0.1 mm or less for a length of one meter (Alloys Nos. S01 and S02 and Steps Nos. A5, A6, and B6). An alloy in which γ phase precipitated by performing low-temperature annealing appeared. In an alloy in which the amount of γ phase was about 1%, torque and turning performance improved (for example, Alloys Nos. S01 and S02).

As described above, the alloys according to the embodiments in which the contents of the respective additive elements, the composition relational expressions, and the respective metallographic structure relational expressions are in the appropriate ranges have excellent hot workability (in hot extrusion, hot forging, and hot rolling), and their machinability and mechanical characteristics are also good. The excellent properties in the alloys according to the embodiments can be obtained by adjusting the production conditions in hot extrusion, hot forging, and hot rolling as well as the heat treatment conditions such that they are within the appropriate ranges.

INDUSTRIAL APPLICABILITY

The free-cutting copper alloys according to the embodiments have excellent hot workability and machinability, high strength, and excellent balance between strength and elongation although the amount of Pb contained is small. Therefore, the free-cutting copper alloys according to the embodiments are suitable for automobile components, electrical and electronic apparatus components, mechanical components, stationaries, toys, sliding components, measuring instrument components, precision mechanical components, medical components, drink-related devices and components, devices and components for water drainage, industrial plumbing components, and components relating to liquid or gas such as drinking water, industrial water, drainage water, or hydrogen.

Specifically, the free-cutting copper alloys according to the embodiments are suitably applicable as a material that constitutes the items used in the above-mentioned fields which go by the names including valve, joint, cock, faucet, gear, axle, bearing, shaft, sleeve, spindle, sensor, bolt, nut, flare nut, pen point, insert nut, cap nut, nipple, spacer, and screw.

What is claimed is:

1. A free-cutting copper alloy comprising:
higher than 61.0 mass % and lower than 65.0 mass % of Cu;
higher than 1.0 mass % and lower than 1.5 mass % of Si;
higher than or equal to 0.003 mass % and lower than 0.20 mass % of Pb; and
higher than 0.003 mass % and lower than 0.19 mass % of P,
with the balance being Zn and inevitable impurities,
wherein among the inevitable impurities, a total content of Fe, Mn, Co, and Cr is lower than 0.40 mass % and a total content of Sn and Al is lower than 0.40 mass %,
when a Cu content is represented by [Cu] mass %, a Si content is represented by [Si] mass %, a Pb content is represented by [Pb] mass %, and a P content is represented by [P] mass %, a relationship of $$56.5 \leq f1 = [Cu] - 4.5 \times [Si] + 0.5 \times [Pb] - [P] \leq 59.5$$

is satisfied,
in constituent phases of a metallographic structure excluding non-metallic inclusions, among 10 metallic phases consisting of α phase, β phase, γ phase, δ phase, ε phase, ζ phase, η phase, κ phase, μ phase, and χ phase, when an area ratio of α phase is represented by (α)%, an area ratio of γ phase is represented by (γ)%, an area ratio of β phase is represented by (β)%, an area ratio of μ phase is represented by (μ)%, an area ratio of κ phase is represented by (κ)%, an area ratio of δ phase is represented by (δ)%, an area ratio of ε phase is represented by (ε)%, an area ratio of ζ phase is represented by (ζ)%, an area ratio of η phase is represented by (η)%, and an area ratio of χ phase is represented by (χ)%, providing that (α)+(β)+(γ)+(μ)+(κ)+(δ)+(ε)+(ζ)+(η)+(χ)=100, relationships of $$20 \leq (\alpha) \leq 80,$$
$$15 \leq (\beta) \leq 80,$$
$$0 \leq (\gamma) < 8,$$
$$18 \times (\gamma)/(\beta) < 9,$$
$$20 \leq (\gamma)^{1/2} \times 3 + (\beta) \times ([Si])^{1/2} \leq 88, \text{ and}$$
$$33 \leq (\gamma)^{1/2} \times 3 + (\beta) \times ([Si])^{1/2} + ([Pb])^{1/2} \times 35 + ([P])^{1/2} \times 15$$

are satisfied, and
a P-containing compound having a grain size of 3 μm or less in diameter which can be observed at least in an examination using an electron microscope at a magnification of 2000 times is present in the β phase.

2. A free-cutting copper alloy comprising:
higher than or equal to 61.7 mass % and lower than or equal to 64.3 mass % of Cu;
higher than or equal to 1.02 mass % and lower than or equal to 1.35 mass % of Si;
higher than or equal to 0.005 mass % and lower than or equal to 0.10 mass % of Pb; and
higher than or equal to 0.02 mass % and lower than or equal to 0.14 mass % of P,
with the balance being Zn and inevitable impurities,
wherein among the inevitable impurities, a total content of Fe, Mn, Co, and Cr is lower than or equal to 0.30 mass % and a total content of Sn and Al is lower than or equal to 0.30 mass %,
when a Cu content is represented by [Cu] mass %, a Si content is represented by [Si] mass %, a Pb content is represented by [Pb] mass %, and a P content is represented by [P] mass %, a relationship of $$57.0 \leq f1 = [Cu] - 4.5 \times [Si] + 0.5 \times [Pb] - [P] \leq 59.0$$

is satisfied,
in constituent phases of a metallographic structure excluding non-metallic inclusions, among 10 metallic phases consisting of α phase, β phase, γ phase, δ phase, ε phase, ζ phase, η phase, κ phase, μ phase, and χ phase, when an area ratio of α phase is represented by (α)%, an area ratio of γ phase is represented by (γ)%, an area ratio of β phase is represented by (β)%, an area ratio of μ phase is represented by (μ)%, an area ratio of κ phase is represented by (κ)%, an area ratio of δ phase is represented by (δ)%, an area ratio of ε phase is represented by (ε)%, an area ratio of ζ phase is represented by (ζ)%, an area ratio of η phase is represented by (η)%, and an area ratio of χ phase is represented by (χ)%, providing that (α)+(β)+(γ)+(μ)+(κ)+(δ)+(ε)+(ζ)+(η)+(χ)=100, relationships of $$30 \leq (\alpha) \leq 75,$$
$$25 \leq (\beta) \leq 70,$$
$$0 \leq (\gamma) < 4,$$
$$18 \times (\gamma)/(\beta) < 2,$$
$$30 \leq (\gamma)^{1/2} \times 3 + (\beta) \times ([Si])^{1/2} \leq 77, \text{ and}$$
$$44 \leq (\gamma)^{1/2} \times 3 + (\beta) \times ([Si])^{1/2} + ([Pb])^{1/2} \times 35 + ([P])^{1/2} \times 15$$

are satisfied, and
a P-containing compound having a grain size of 3 μm or less in diameter which can be observed at least in an examination using an electron microscope at a magnification of 2000 times is present in the β phase.

3. The free-cutting copper alloy according to claim 1, wherein a proportion of a number of granular α phase crystal grains having an aspect ratio (longer side/shorter side) of lower than or equal to 4 to an entire number of α phase crystal grains is higher than or equal to 50%.

4. The free-cutting copper alloy according to claim 1, wherein a Si content in β phase is higher than or equal to 1.2 mass % and lower than or equal to 1.9 mass %.

5. The free-cutting copper alloy according to claim 1, wherein an electrical conductivity is higher than or equal to 13% IACS, and
when a tensile strength is represented by S (N/mm$^2$) and an elongation is represented by E (%), a relational expression S×(100+E)/100 indicating a balance between the strength and the elongation is higher than or equal to 600.

6. The free-cutting copper alloy according to claim 1, which is used for an automobile component, an electrical or electronic apparatus component, a mechanical component, a stationery, a toy, a sliding component, a measuring instrument component, a precision mechanical component, a medical component, a drink-related device or component, a device or component for water drainage, or an industrial plumbing component.

7. A method for producing the free-cutting copper alloy according to claim 1, the method comprising:
one or more hot working steps,
wherein in the final hot working step among the hot working steps, hot working temperature is higher than 540° C. and lower than 675° C., and an average cooling rate in a temperature range from 530° C. to 450° C. after hot working is higher than or equal to 0.1° C./min and lower than or equal to 50° C./min.

8. The method for producing a free-cutting copper alloy according to claim 7, further comprising one or more steps selected from a cold working step, a straightness correction step, and an annealing step.

9. The method for producing a free-cutting copper alloy according to claim 7, further comprising a low-temperature annealing step that is performed after the final step of processing,
wherein in the low-temperature annealing step, holding temperature is higher than or equal to 250° C. and lower than or equal to 430° C., and holding time is longer than or equal to 10 minutes and shorter than or equal to 200 minutes.

* * * * *